US011156822B2

United States Patent
Lyuboshenko

(10) Patent No.: US 11,156,822 B2
(45) Date of Patent: Oct. 26, 2021

(54) SELECTIVE PLANE ILLUMINATION MICROSCOPY WITH MULTIPLE ILLUMINATION UNITS SCANNING AN OBJECT IN SYNC WITH A DIGITAL CAMERA ROLLING SHUTTER

(71) Applicant: Igor Lyuboshenko, Le Plessis-Robinson (FR)

(72) Inventor: Igor Lyuboshenko, Le Plessis-Robinson (FR)

( * ) Notice: Subject to any disclaimer, the term of this patent is extended or adjusted under 35 U.S.C. 154(b) by 144 days.

(21) Appl. No.: 16/378,060

(22) Filed: Apr. 8, 2019

(65) Prior Publication Data

US 2019/0302439 A1 Oct. 3, 2019

Related U.S. Application Data

(63) Continuation-in-part of application No. 15/944,485, filed on Apr. 3, 2018, now Pat. No. 10,768,400,
(Continued)

(51) Int. Cl.
*G02B 21/00* (2006.01)
*G02B 21/08* (2006.01)
(Continued)

(52) U.S. Cl.
CPC .......... *G02B 21/08* (2013.01); *G02B 21/025* (2013.01); *G02B 21/16* (2013.01); *G02B 21/241* (2013.01);
(Continued)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 7,554,725 B2   6/2009   Stelzer
7,787,179 B2   8/2010   Lippert
(Continued)

FOREIGN PATENT DOCUMENTS

WO   2016166151       10/2016
WO   20160178856 W    11/2016
(Continued)

OTHER PUBLICATIONS

Chhetri et al: "Whole-animal functional and developmental imaging with isotropic spatial resolution", Nature Methods. vol. 12. No. 12. Dec. 1, 2015 (Dec. 1, 2015). pp. 1171-1178. XP055611986. New York, ISSN: 1548-7091. DOI: 10.1038/nmeth.3632.
(Continued)

*Primary Examiner* — Arnel C Lavarias
(74) *Attorney, Agent, or Firm* — Van Pelt, Yi & James LLP

(57) ABSTRACT

A system for illuminating a microscopy specimen includes illumination sources each of which is configured to emit a light that travels along an illumination path to illuminate the microscopy specimen placed on an optical detection path of an optical microscope. The system also includes optical elements in the illumination path of each of the illumination sources. The optical elements are configured to at least in part transform the light from each of the illumination sources into a light sheet illuminating the microscopy specimen and to vary a position of a waist of the light sheet from each of the illumination sources that illuminates the microscopy specimen. The optical elements for each of the illumination sources are configured such that the waist of the light sheet from each of the illumination sources are spatially aligned and illuminate a substantially coincident portion of the microscopy specimen.

18 Claims, 48 Drawing Sheets

Related U.S. Application Data which is a continuation-in-part of application No. 15/680,075, filed on Aug. 17, 2017, now Pat. No. 10,365,464.

(60) Provisional application No. 62/489,168, filed on Apr. 24, 2017, provisional application No. 62/655,610, filed on Apr. 10, 2018, provisional application No. 62/678,018, filed on May 30, 2018, provisional application No. 62/688,613, filed on Jun. 22, 2018, provisional application No. 62/819,926, filed on Mar. 18, 2019, provisional application No. 62/556,093, filed on Sep. 8, 2017.

(51) Int. Cl.

| | |
|---|---|
| *G02B 21/36* | (2006.01) |
| *G02B 21/02* | (2006.01) |
| *G02B 21/24* | (2006.01) |
| *H04N 5/235* | (2006.01) |
| *H04N 5/232* | (2006.01) |
| *G02B 21/16* | (2006.01) |

(52) U.S. Cl.
CPC ........... *G02B 21/36* (2013.01); *H04N 5/2352* (2013.01); *H04N 5/2353* (2013.01); *H04N 5/2354* (2013.01); *H04N 5/232127* (2018.08)

(58) Field of Classification Search
CPC ........... G02B 21/0036; G02B 21/0052; G02B 21/006; G02B 21/0076; G02B 21/06; G02B 21/082; G02B 21/086; G02B 21/088; G02B 21/16; G02B 21/18; G02B 21/24; G02B 21/36; G02B 21/361
USPC ....... 359/362, 363, 368, 369, 381, 385, 388, 359/390
See application file for complete search history.

(56) References Cited

U.S. PATENT DOCUMENTS

| | | | |
|---|---|---|---|
| 8,482,854 | B2 | 7/2013 | Lippert |
| 8,699,133 | B2 | 4/2014 | Lippert |
| RE45,575 | E | 6/2015 | Lippert |
| 9,316,824 | B2 | 4/2016 | Shroff |
| 9,404,869 | B2 | 8/2016 | Keller |
| 9,423,601 | B2 | 8/2016 | Toda |
| 9,587,213 | B2 | 3/2017 | Morgan |
| 10,007,100 | B2 | 6/2018 | Kikuchi |
| 10,739,266 | B2 * | 8/2020 | Keller .................. G02B 21/367 |
| 10,746,981 | B2 * | 8/2020 | Tomer .................. G02B 21/008 |
| 2012/0282667 | A1 | 11/2012 | Lippert |
| 2014/0202265 | A1 | 7/2014 | Hellmich |
| 2015/0098126 | A1 | 4/2015 | Keller |
| 2016/0214107 | A1 | 7/2016 | Viasnoff |
| 2016/0241758 | A1 | 8/2016 | Dohi |
| 2018/0164569 | A1 | 6/2018 | Brinkman |
| 2018/0275389 | A1 | 9/2018 | Shepherd |

FOREIGN PATENT DOCUMENTS

| | | |
|---|---|---|
| WO | 2017062741 A1 | 4/2017 |
| WO | 2018033581 | 2/2018 |

OTHER PUBLICATIONS

De Medeiros et al: "Confocal multiview light-sheet microscopy", Nature Communications, vol · 6. No. 1. Nov. 25, 2015 (Nov. 25, 2015). XP055587306. DOI: 10.1038/ncomms9881, p. 4.

Power et al: "A guide to light-sheet fluorescence microscopy for multiscale imaging", Nature Methods, vol. 14, No. 4, Apr. 1, 2017 (Apr. 1, 2017), pp. 360-373, XP055536560, New York, ISSN: 1548-7091, DOI: 18.1038/nmeth.4224, p. 367.

Yang et al: "Dual-slit confocal light sheet microscopy for in vivo whole-brain imaging of zebrafish", Biomedical Optics Express, vol. 6, No. 5, May 1, 2015 (May 1, 2015), p. 1797, XP055514896, United States, SSN: 2156-7085, DOI: 10.1364/BOE.6.001797.

Adams et al. "Light Sheet Fluorescence Microscopy (LSFM) in: Current Protocols in Cytometry", pp. 12.37.1-12.37.15. Jan. 2015.

Chmielewski et al., "Fast imaging of live organisms with sculpted light sheets", Scientific Reports, Apr. 20, 2015.

Dean et al., Deconvolution-Free Subcellular Imaging with Axially Swept Light Sheet Microscopy, Biophysical Journal, vol. 108, Jun. 2015, pp. 2807-2815.

Dean et al., Diagonally Scanned Light-Sheet Microscopy for Fast Volumetric Imaging of Adherent Cells, Biophysical Journal 110, Biophysical Society, Mar. 29, 2016, pp. 1456-1465.

Dean et al., Uniform and Scalable Light-Sheets Generated by Extended Focusing, Department of Cell Biology, University of Texas Southwestern Medicate Center, Optics Express, vol. 22, No. 21, Oct. 16, 2014.

Fahrbach et al., "Rapid 3D light-sheet microscopy with a tunable lens", Optics Express, vol. 21, No. 18, p. 21010-21026, Aug. 30, 2013.

Hedde et al., "sideSPIM—selective plane illumination based on a conventional inverted microscope", from Biomedical Optics Express, vol. 8, No. 9, p. 3918-3937, Aug. 1, 2017.

Hedde et al., Selective Plane Illumination Microscopy with a Light Sheet of Uniform Thickness Formed by an Electrically Tunable Lens, Microscopy Research and Technique, Jun. 24, 2016.

Jan Huisken et al., "Selective Plane Illumination Microscopy", In: "Handbook of Biological Confocal Microscopy", Jan. 1, 2006, Springer, New York, NY. pp. 672-675.

Koho et al., Image Quality Ranking Method for Microscopy, Scientific Reports, Jul. 1, 2016.

Huisken et al: "Even fluorescence excitation by multidirectional selective plane illumination microscopy (mSPIM)" Optics letters, Optical Society of America, vol. 32, No. 17, Sep. 1, 2007.

\* cited by examiner a)

b)

SELECTIVE PLANE ILLUMINATION MICROSCOPY WITH MULTIPLE ILLUMINATION UNITS SCANNING AN OBJECT IN SYNC WITH A DIGITAL CAMERA ROLLING SHUTTER

CROSS REFERENCE TO OTHER APPLICATIONS

This application is a continuation in part of co-pending U.S. patent application Ser. No. 15/944,485 entitled VARYING AN ILLUMINATION PATH OF A SELECTIVE PLANE ILLUMINATION MICROSCOPY filed Apr. 3, 2018, which is a continuation in part of co-pending U.S. patent application Ser. No. 15/680,075, entitled EXTENDING OPTICAL MICROSCOPES TO PROVIDE SELECTIVE PLANE ILLUMINATION MICROSCOPY, filed Aug. 17, 2017, which claims priority to U.S. Provisional Patent Application No. 62/489,168, entitled EXTENDING OPTICAL MICROSCOPES TO PROVIDE SELECTIVE PLANE ILLUMINATION MICROSCOPY, filed Apr. 24, 2017, all of which are incorporated herein by reference for all purposes. U.S. patent application Ser. No. 15/944,485 entitled VARYING AN ILLUMINATION PATH OF A SELECTIVE PLANE ILLUMINATION MICROSCOPY filed Apr. 3, 2018 also claims priority to U.S. Provisional Patent Application 62/556,093, entitled OPTICAL ARRANGEMENT TO EXTEND OPTICAL MICROSCOPES TO PROVIDE 3D SELECTIVE PLANE ILLUMINATION MICROSCOPY, filed on Sep. 8, 2017, which is incorporated herein by reference for all purposes.

This application claims priority to U.S. Provisional Patent Application No. 62/655,610 entitled SELECTIVE PLANE ILLUMINATION MICROSCOPY USING ILLUMINATION UNITS SCANNING AN OBJECT IN SYNC WITH A DIGITAL CAMERA ROLLING SHUTTER filed Apr. 10, 2018 which is incorporated herein by reference for all purposes. This application claims priority to U.S. Provisional Patent Application No. 62/678,018 entitled LIGHT SHEET FLUORESCENCE MICROSCOPE filed May 30, 2018 which is incorporated herein by reference for all purposes. This application claims priority to U.S. Provisional Patent Application No. 62/688,613 entitled LIGHT-SHEET MICROSCOPY WITH SYNCHRONIZED MULTIDIRECTIONAL LASER BEAM WAIST SWEEPING filed Jun. 22, 2018 which is incorporated herein by reference for all purposes. This application claims priority to U.S. Provisional Patent Application No. 62/819,926 entitled LIGHT SHEET FLUORESCENCE MICROSCOPE filed Mar. 18, 2019 which is all of which are incorporated herein by reference for all purposes

BACKGROUND OF THE INVENTION

Light sheet fluorescence microscopy or selective plane illumination microscopy (SPIM) technology typically relies on illuminating of a specimen in thin optical slices, formed from laser light, exciting the fluorophores in the specimen and acquiring light emitted by the illuminated plane inside the specimen. The direction in which the light is detected is typically perpendicular to the illuminated plane. Images from light sheet microscopes exhibit a better signal-to-noise (S/N) ratio and a higher dynamic range than images produced by confocal fluorescence microscopes. In SPIM, the excitation is restricted to the fluorophores in the volume near the focal plane. Compared to confocal fluorescence microscopy, light sheet microscopy provides optical sectioning with much smaller illuminated volume thus lower photo bleaching and photo toxicity In SPIM, the light sheet is produced both by providing a stationary beam having an extremely elongated (elliptical) cross section, and by creating a virtual light sheet by rapidly scanning the object with a light beam having a circular cross section. The stationary and virtual laser light sheets produced by SPIM systems maintain the thinnest part ("waist") of the light sheet only within a small space ("Rayleigh range") along the laser light propagation axis. Linearly reducing the waist of the light sheet using the illumination system's objectives that have higher numerical apertures linearly increases the axial resolution of the light sheet imaging. However, reducing the waist in this manner also leads to a quadratic decrease in the Rayleigh range. This results in highly non-uniform, divergent light sheets that produce images with poor axial resolution and dramatic variations of the resolution throughout the field of view. A marked loss of image quality results in a majority of applications requiring fast imaging of medium-sized slices of opaque tissues and/or in imaging of large-sized clarified or translucent specimens. Therefore, there is a need for an illumination system that produces the thinnest possible light sheet waist while maintaining image quality.

BRIEF DESCRIPTION OF THE DRAWINGS

Various embodiments of the invention are disclosed in the following detailed description and the accompanying drawings.

FIG. 30A is a schematic depicting an embodiment of the projections, onto the XZ-plane when the focus sweeping mode was switched on.

DETAILED DESCRIPTION

Figure 1A:
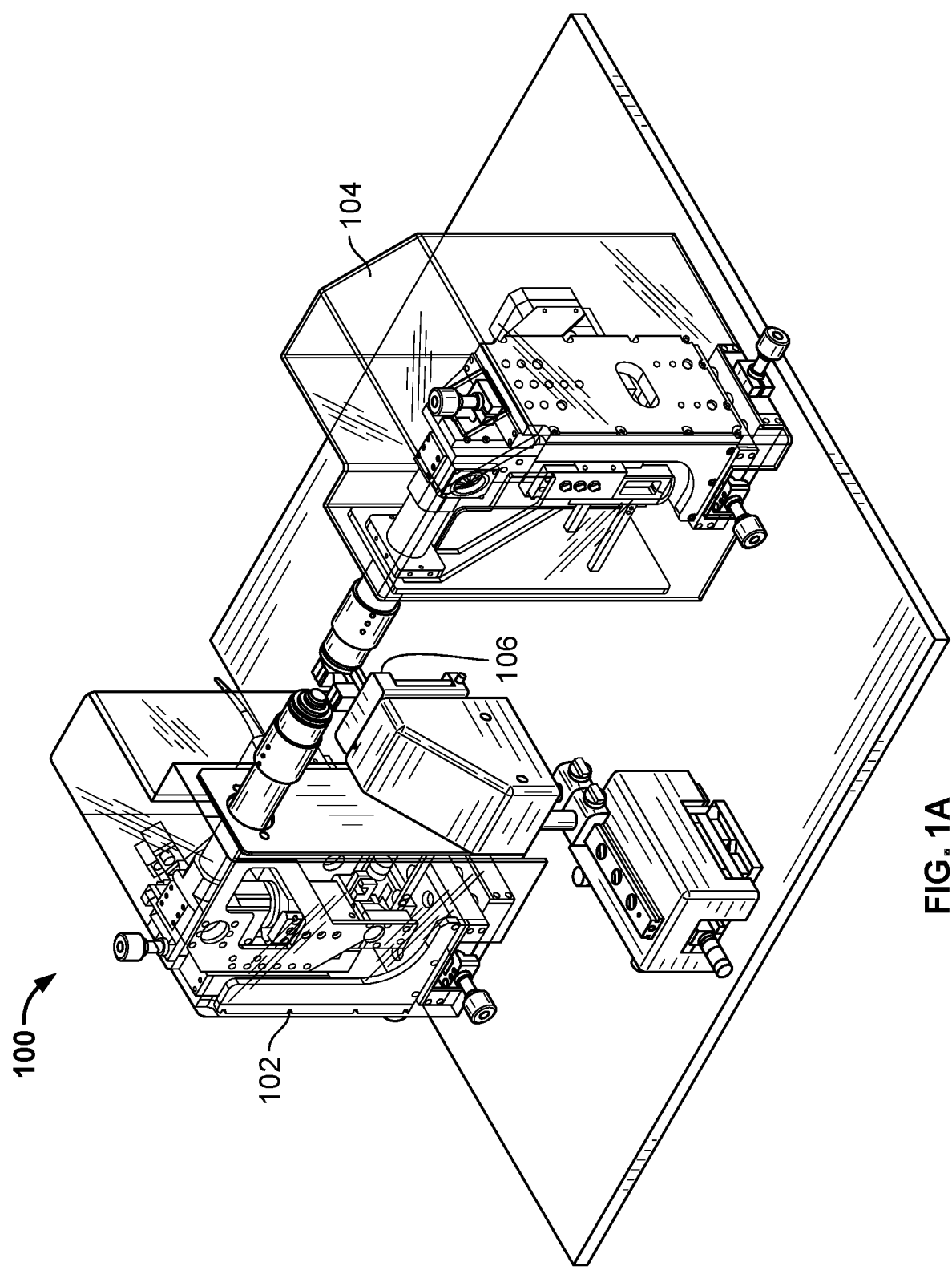
FIG. 1A is a diagram illustrating an embodiment of components of a system that can be coupled to a microscope to convert the microscope to perform SPIM.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions. As used herein, the term "a" includes at least one. For example, "a lens" includes one or more lenses and "an" optical component includes at least one optical component.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

High spatial and temporal resolution for three-dimensional light sheet imaging is critical for the understanding of physiological processes of living specimens while keeping them in their natural state without perturbation. The typical methods based on mechanical motion control for volume acquisition introduce vibrations during the acquisition and limit the scanning speed. As water-dipping objectives are customarily used for observation of biologic specimens in the specimens' natural medium, perturbations from a moving detection objective may influence the specimen behavior under observation and restrain the scope of application for dynamic studies. Larger specimens can also exceed the laser waist (focus) area and reduce the optical sectioning power of the light sheet assembly.

Optical arrangements (e.g., serving as add-on attachments to various interfaces of an optical microscope) providing illumination for a three-dimensional selective plane light-sheet microscopy (SPIM) are disclosed. In some embodiments, these optical arrangements can dynamically vary: a cross section of a light sheet, a position of a waist of the light sheet along an axis of illumination, a position of the plane of the light sheet illumination, and/or a direction in which beam components extending within the light sheet are directed to the specimen. Additionally, a focus distance of a detection lens in an optical detection path of a microscope can also be dynamically and/or automatically varied and synchronized with the dynamic variance of the light sheet illumination to increase the resolution of a detected image of the SPIM specimen.

Typical SPIM solutions are offered as stand-alone digital systems with a far different operating approach than conventional optical microscopy. Using traditional SPIM microscopes requires special training and imposes new behaviors upon the users, thus minimizing their productivity and limiting the market penetration and scientific community's awareness of advantages offered by the light sheet technology. In some embodiments, a vertical optical microscope (e.g., upright or inverted microscope) is converted to provide selective plane illumination microscopy. For example, by adding components to a traditional vertical optical microscope to convert it to provide selective plane illumination microscopy, cost savings and reduced physical size footprint are achieved as compared to using a traditional dedicated standalone SPIM microscope. For example, a typical lab setting already includes a traditional vertical optical microscope and allowing the traditional vertical optical microscope to be converted to an SPIM microscope saves costs and space. An illumination source is configured to generate a light sheet along a longitudinal axis to illuminate a specimen placed in a vertical optical detection axis of the vertical optical microscope. The illumination source is configured to generate a light sheet along a longitudinal axis that is substantially perpendicular to a vertical optical detection axis of the vertical optical microscope and the illumination source is configured to produce an excitation at a plane in the specimen that generates fluorescent emissions. A detection sensor is placed in the detection optical path of the vertical optical detection axis of the vertical optical microscope. The detection sensor is configured to detect the fluorescent emissions to provide selective plane illumination microscopy.

Typical standalone SPIM microscopes are configured in a horizontal orientation. For example, both the illumination path and the detection path are oriented horizontally (e.g., in the horizontal plane substantially perpendicular to the direction of gravity). For example, typical solutions include an excitation illumination source objective having the excitation illumination axis and the detection objective having the detection optical axis that are both engaged to the same mount body, where the two axes are oriented in a perpendicular relation to each other in the horizontal plane. This often is due to limitations in traditional specimen holding solutions. For example, SPIM is often utilized to observe biological specimens suspended in a fluid and limitations of how the specimen can be contained and rotated using traditional specimen holding solutions require the specimen to be illuminated and detected in the horizontal plane. However, the detection optical path of traditional vertical optical microscopes is in the vertical direction. Solutions described herein allow SPIM detection to be achieved using the vertical optical microscope's optical arrangement in the vertical direction.

In some embodiments, both observation and acquisition modes are added to the microscope detection objective's optical arrangement of vertical optical microscopes. By using the microscope stand of the vertical optical microscope as an integral part of the detection unit, it takes advantage of quality optical elements already present in the detection path (e.g., including objective turret, filter wheel, binoculars, and video port), thereby reducing complexity of building a selective plane illumination microscopy system. As no alterations to the detection path's optics of the vertical optical microscope are introduced, all other functionalities that could be necessary for other observation modes (e.g., transmission, wide field fluorescence, etc.) are kept unaltered, including convenient means for specific applications such as electrophysiology. Therefore it serves as an upgrade on existing microscopy platforms by adding light sheet imaging capabilities providing a cost effective solution or as a whole system by integrating a functional fluorescence microscope.

FIG. 1A is a diagram illustrating an embodiment of components of a system that can be coupled to a microscope to convert the microscope to perform SPIM. System 100 includes illumination units 102 and 104, and stepper stage 106.

Illumination units 102 and 104 are designed to work with a laser source (e.g., fiber laser source) to produce a light sheet using a cylindrical lens. This allows direct imaging of an optical section with a single frame at full camera resolution. For better illumination plane homogeneity across the specimen, two illumination units are used on both sides of a specimen to compensate the absorption effects with a thick specimen. In some embodiments, the light sheet is projected using an objective, which can be adapted according to specimen size and detection magnification. The illumination units are designed to compensate chromatic shift for the visible spectrum, thus allowing the simultaneous illumination at several wavelengths using a laser combiner for multi-fluorescence imaging. Although two illumination units are shown, a single or any other number of illumination units may be utilized in various other embodiments. In some embodiments, illumination units 102 and/or 104 produce a pencil beam rather than or in addition to a light sheet.

Optical arrangements of illumination units 102 and/or 104 provide illumination for a three-dimensional selective plane light-sheet microscopy. In some embodiments, these optical arrangements can dynamically vary: a cross section of a light sheet, a position of a waist of the light sheet along an axis of illumination, a position of the plane of the light sheet illumination, and/or a direction in which beam components extending within the light sheet are directed to the specimen.

Stepper stage 106 includes a motorized translation stage to move the specimen through the illumination plane of illumination units 102 and 104. Thus, using stepper stage 106, the illumination sheet and the detection plane may remain in fixed positions while detecting various slices as the translation stage is moved in steps. The shown stepper stage 106 includes a support for a specimen chamber, a z-stage that is moveable in the vertical z-direction via a motor, a slider, and controls for x and y position adjustments of the stage in the horizontal plane. In some embodiments, a base configured to engage a specimen stage for supporting and orienting the specimen holder in an x-y direction is utilized. In some embodiments, a translational stage configured to engage the specimen holder in the z-direction is utilized.

Figure 1B:
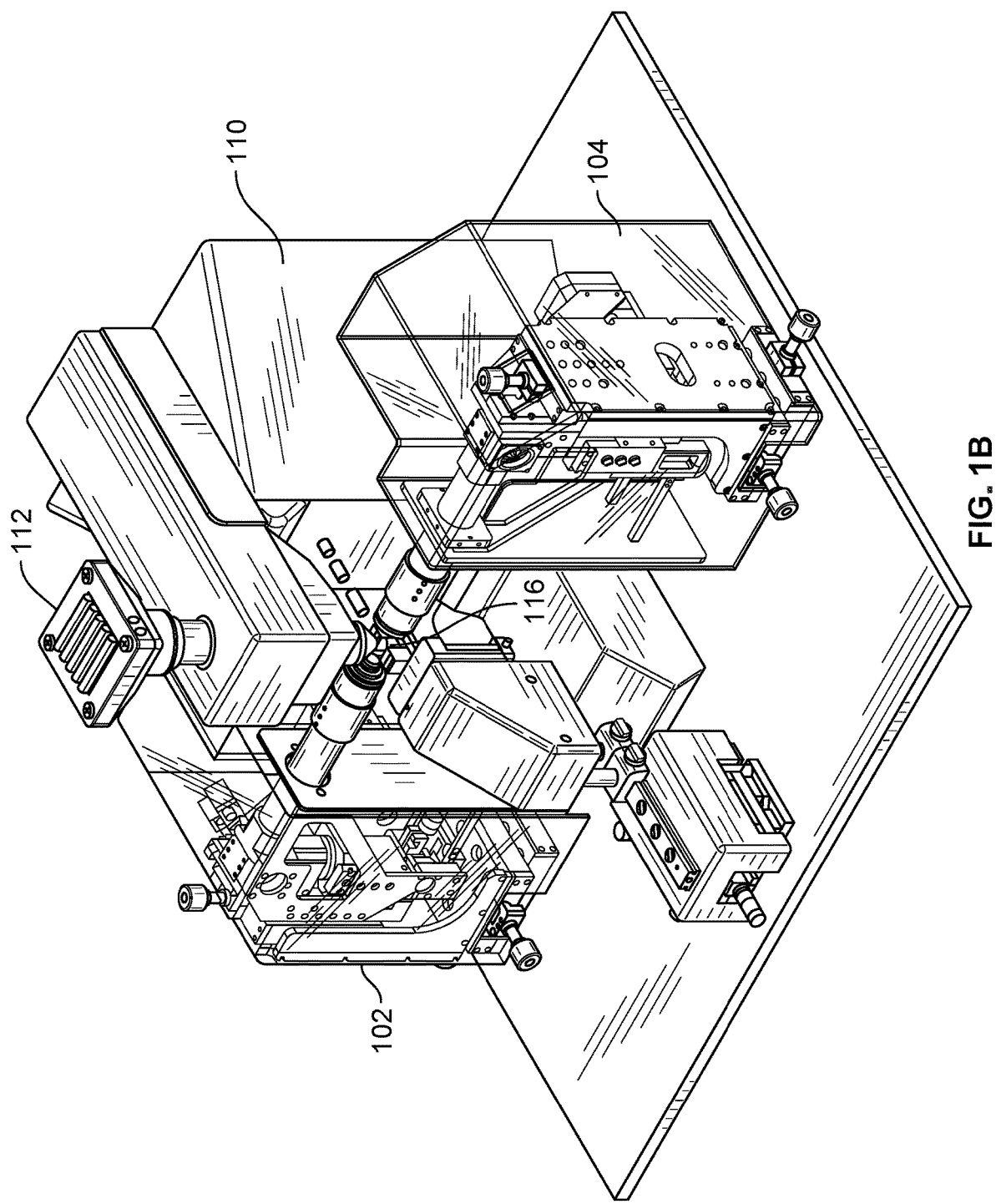
FIG. 1B is a diagram illustrating an embodiment showing an add-on system added to a vertical microscope to convert the vertical microscope to perform SPIM.

FIG. 1B is a diagram illustrating an embodiment showing an add-on system added to a vertical microscope to convert the vertical microscope to perform SPIM. For example, system 100 of FIG. 1A is shown engaged with vertical optical microscope 110. Vertical optical microscope 110 shown in this example is a trinocular fluorescence microscope equipped with a filter wheel and an objective turret with a water dipping/immersion detection lens. However in various other embodiments, other types of optical microscopes may be utilized. The optical detection path utilized to perform SPIM may utilize standard components of microscope 110, including its components in the optical detection path (e.g., objective lenses, arm, filter in filter wheel, etc.). An output port of optical microscope 110 is coupled to detection unit 112 that is utilized to acquire the SPIM image detected using the optical detection path of microscope 110. For example, detection unit 112 includes a digital camera. In some embodiments, a focus distance of the optical detection path can be dynamically varied and synchronized with the dynamic variance of the light sheet illumination to increase the resolution of a detected image of the SPIM specimen.

Specimen chamber and holder assembly 116 has been configured to handle SPIM using a vertical optical detection path configuration as compared to traditional holders that have been designed to be utilized for horizontal optical SPIM detection paths. Specimen chamber and holder assembly 116 allows a specimen to be rotated about a substantially horizontal rotational axis and substantially perpendicular to the optical axis of the detection objective using a rotational drive or knob. For example, specimen chamber and holder assembly 116 embeds a specimen in a substantially rigid substantially transparent embedding compound maintained in an immersion liquid and placed in the holder, allowing the specimen to be rotated about the substantially horizontal rotational axis that is substantially perpendicular to the optical axis of the detection objective. In some embodiments, specimen chamber and holder assembly 116 is supported by a specimen stage for supporting and orienting assembly 116 in an x-y direction and/or a translational stage configured to engage the assembly 116 in the z-direction.

Figure 2:
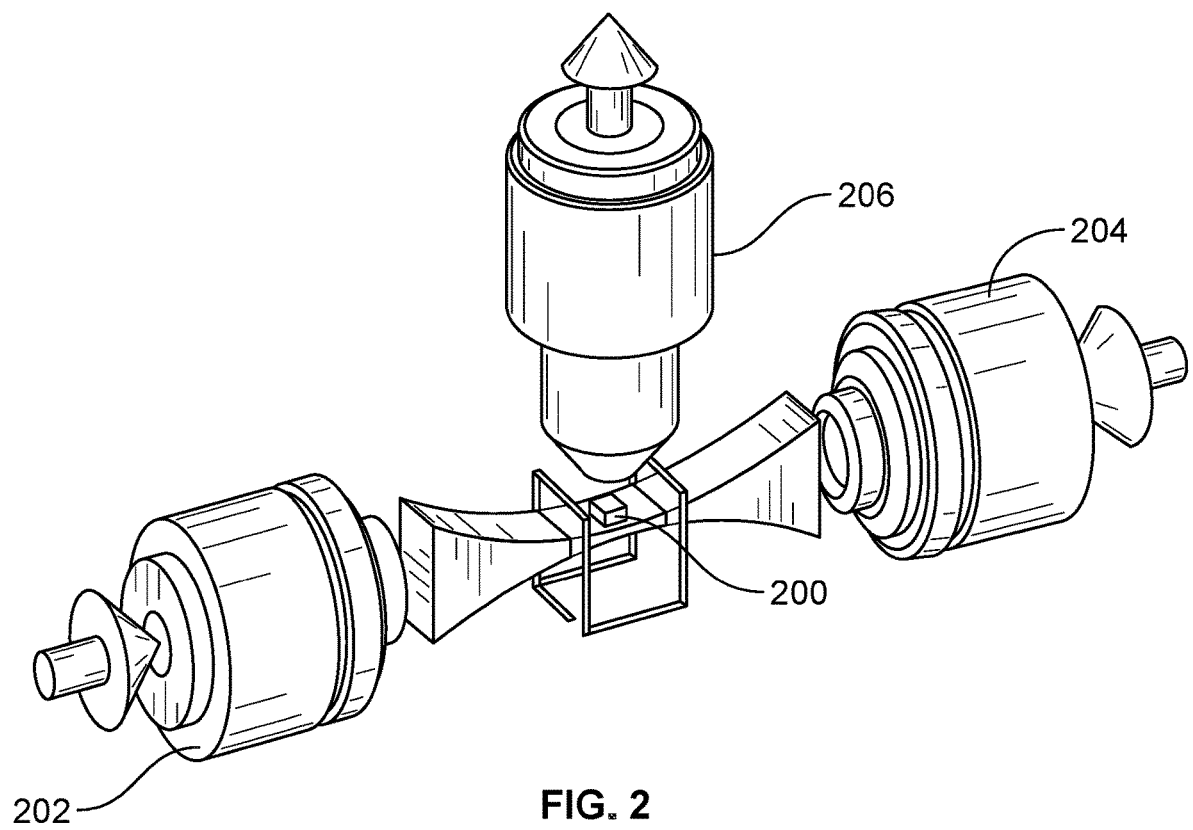
FIG. 2 is a diagram illustrating an example of illumination of a specimen.

FIG. 2 is a diagram illustrating an example of illumination of a specimen. In some embodiments, a light-sheet microscopy system uses a standard upright or inverted microscope, capable of illuminating a set of planes within a specimen, to detect the fluorescent emission coming from the illuminated plane, while at the same time producing the finest axial resolution at the largest region of interest. Specimen 200 is being illuminated by illumination objective 202 and illumination objective 204. The illuminated specimen is observed via optical detection objective 206. In some embodiments, detection objective 206 is a part of microscope 110, illumination objective 202 is a part of illumination unit 102, and illumination objective 204 is a part of illumination unit 104 of system 100 of FIGS. 1A and 1B. For example, the illumination units are designed to work with fibered laser sources to produce a light sheet using cylindrical lenses of the objectives. This allows direct imaging of an optical section with a single frame at full camera resolution. For better illumination plane homogeneity across the specimen, two illumination units are used on both sides of the specimen to compensate for the absorption effects of a thick specimen sample. In an alternative embodiment, a single illumination unit is utilized. In some embodiments, the light sheet is projected using finite-infinite objectives, which can be adapted according to specimen size and detection magnification. In some embodiments, the illumination output of the objectives has a cross section of an elongated ellipse due to an assembly of optical elements in which the thin sheet of light is generated from one or many laser light sources. In another embodiment, the illumination output of the objectives has a cross section of an elongated rectangle. Lenses of objectives 202 and 204 are designed to optically compensate chromatic shift for the visible spectrum, thus allowing the simultaneous illumination at several wavelengths using a laser combiner for multi-fluorescence imaging.

Illumination objectives 202 and 204 focus the laser light source to create a light sheet. However, as shown in FIG. 2, due to the focusing of the light source by the lens of the objective, the light sheet is thinner at the focal point area (i.e., at the "waist") and becomes thicker away from the focal point area. A thinner light sheet allows for better image resolution and thus a uniformly thin light sheet is desired. Given the effects of the shown divergence, a light sheet within a limited range of thickness can be utilized in order to maintain a desired image resolution, thus limiting the field of view to the area of the light sheet within the thickness limit. However in some cases it may be desirable to capture a specimen that is larger than the limited field of view. In some embodiments, a variable focus lens is utilized in illumination units to sweep the focal point across the specimen to create a thinner light sheet over a larger area of the light sheet. For example, focus distance of the illumination is automatically adjusted to move and sweep the focus across the specimen during image capture to automatically sweep the thinnest point of the light sheet across the specimen. By using a lens of variable focal distance in the illumination path of the optical arrangement, sweeping of the light sheet waist is made possible along the illumination direction. The lens of variable focal distance can vary between both negative and positive optical powers. This allows the acquisition of light sheet images of both the finest axial resolution and the largest field of view in one and the same frame.

By synchronizing lines of a rolling shutter of a detector (e.g., digital camera) with the sweeping position of the waist of the light sheet, a detected image of the specimen with a larger field of view can be generated without physically moving the specimen within the plane of the light sheet. The focus distance of the illumination may be adjusted electronically (i.e. electrically) and/or mechanically. For example, rather than relying on the mechanical motor mechanism that may introduce vibrations, the focal distance of an electronically or electrically tunable lens may be changed electrically (e.g., via electromagnets, piezoelectric element, current through a solution, etc.) without a use of a motor.

In some embodiments, a lens of variable focal distance is utilized in the detection path of the microscope. This optical device, allowing for fast remote focusing, is inserted into the detection path between the microscope's video output port and the digital camera, or between the microscope's detection objective and the microscope's tube lens. The specimen, in its chamber, is set in a fixed position when the illumination plane and the detection plane move simultaneously through the specimen. As the specimen remains in a steady position, vibrations and perturbation issues are alleviated. Incidentally specimen mounting and holding becomes much easier. Three dimensional acquisition can be achieved at camera frame rate without being limited by mechanical constraints (e.g., 100 fps at 4 Mpixels using a sensitive sCMOS camera).

In some embodiments, if required, a means for influencing the light sheet direction is utilized. Together with the sweeping of the light sheet waist, this means helps reduce or remove altogether shadows occurring within the observed specimen's plane. By integrating these scanning means, the light sheet system not only provides optical sectioning with optimal spatial resolution and signal to noise ratio, but also delivers unprecedented temporal resolution for 3D acquisition, addressing the needs for dynamic imaging of rapid biophysical processes.

Figure 3A:
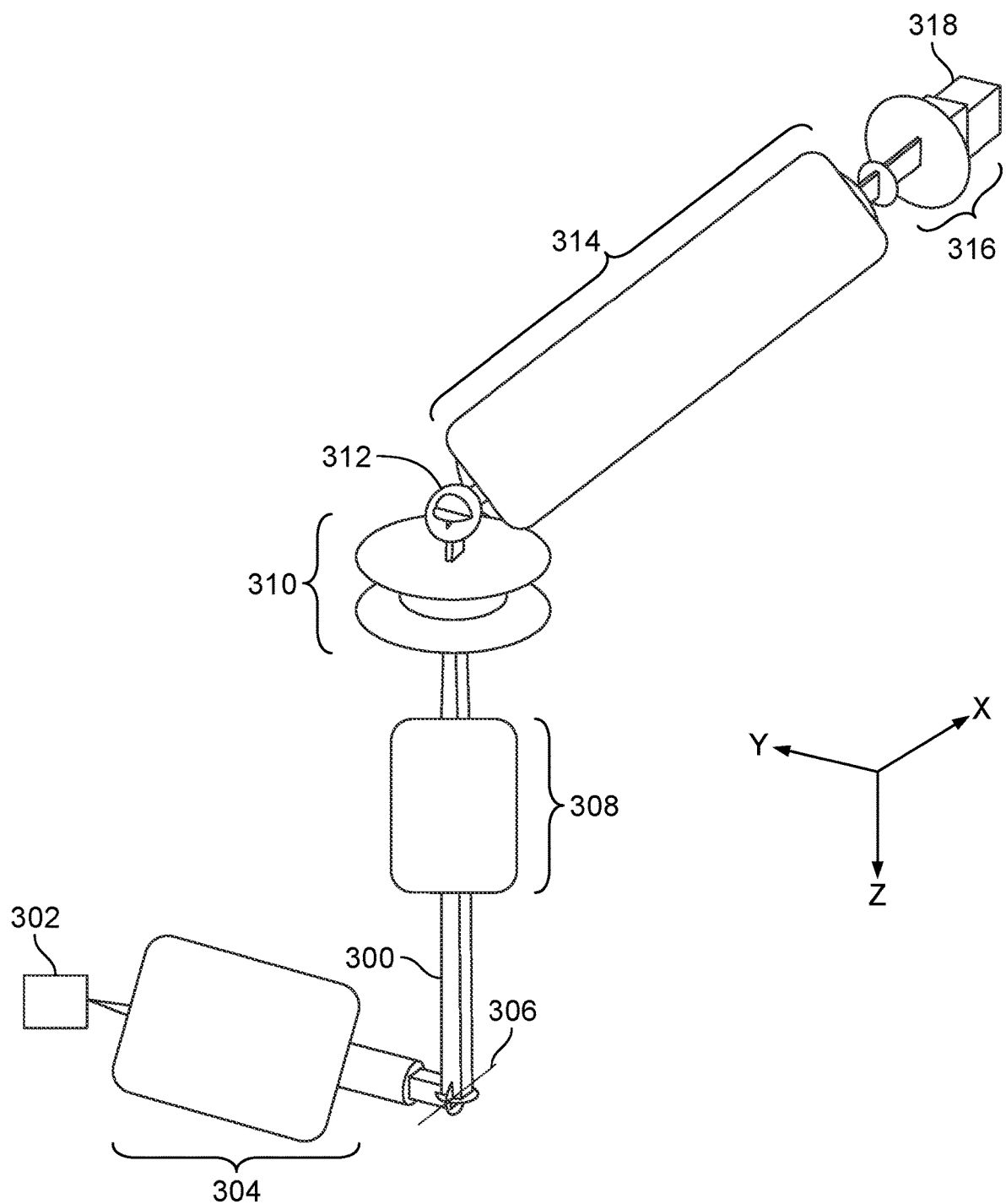
FIG. 3A-FIG. 3D are diagrams illustrating different views of a first embodiment of an illumination path and optical components of an illumination unit.
Figure 3B:
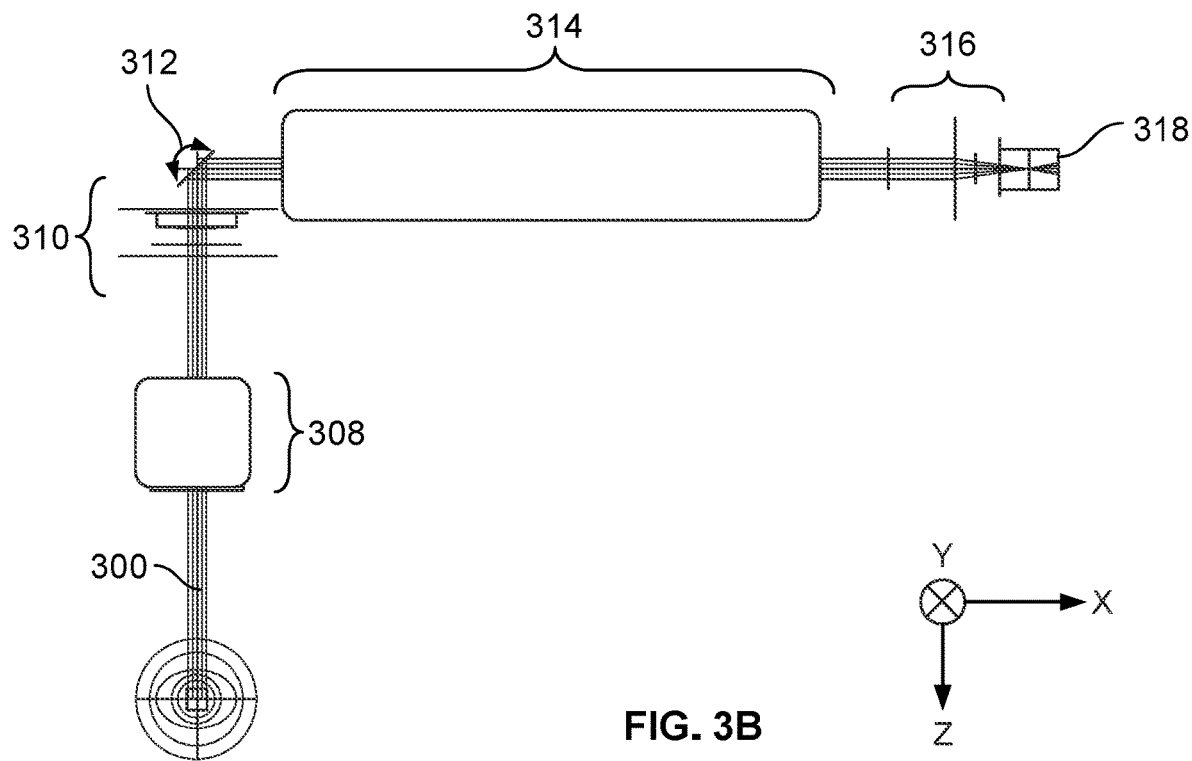
Figure 3C:
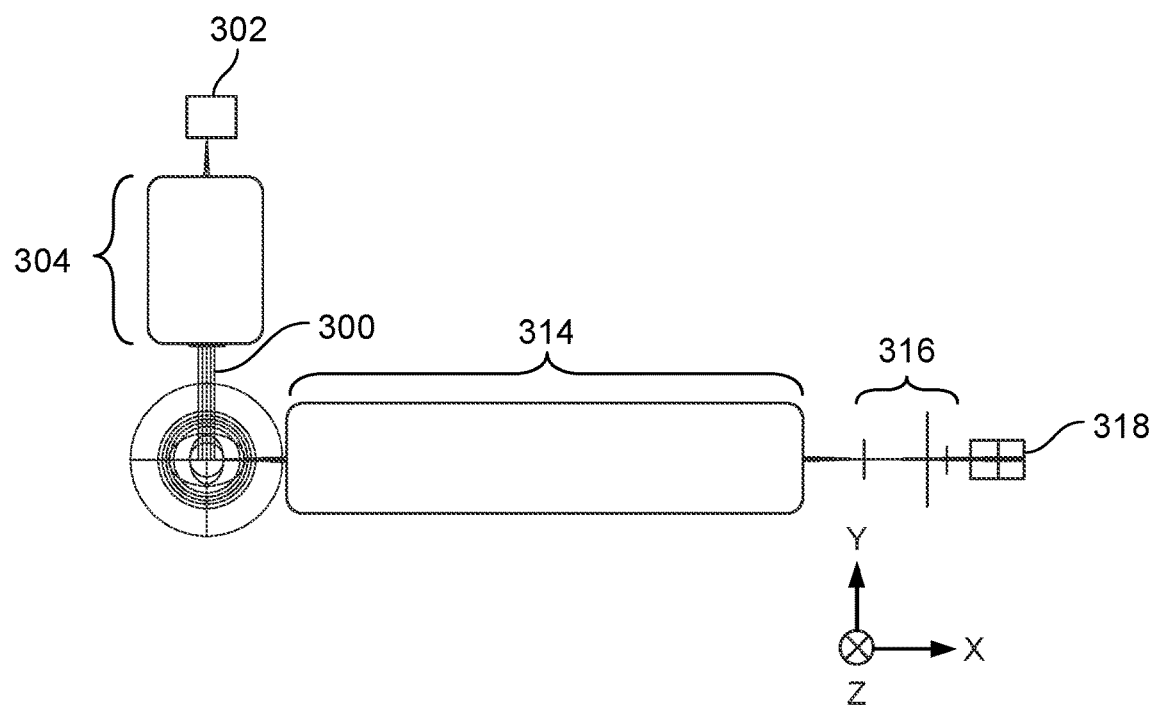
Figure 3D:
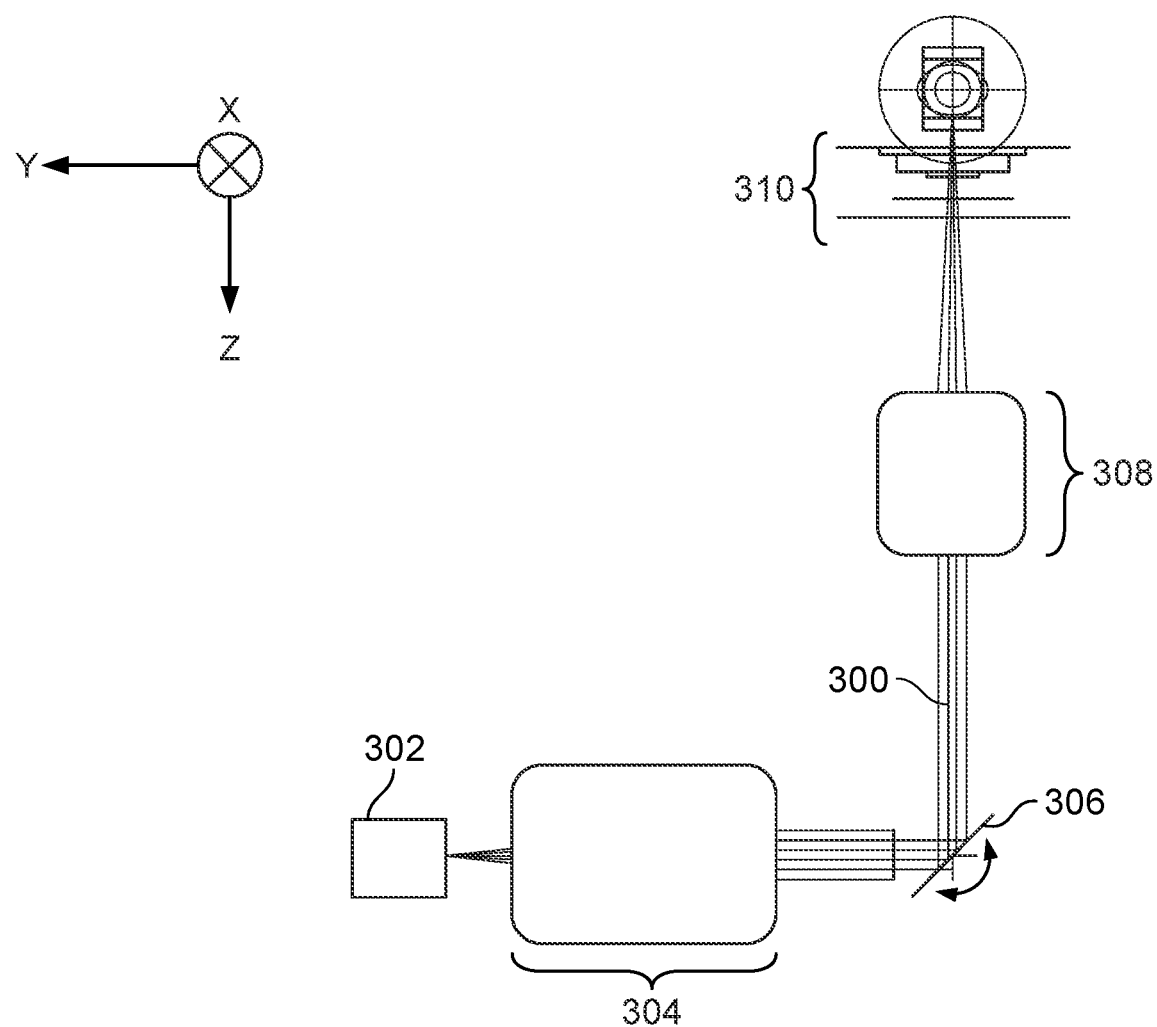

FIG. 3A-FIG. 3D are diagrams illustrating different views of a first embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 3A shows a profile view. FIG. 3B shows a front view. FIG. 3C shows a top view. FIG. 3D shows a side view. The Z-direction axis is the vertical axis.

Illumination path 300 shows a path of light from light source 302 to a specimen in specimen chamber 318 as the light is manipulated by optical components to produce a light sheet to illuminate the specimen. An example of light source 302 is a laser light source that produces a laser light (e.g., laser beam). The light (e.g., light bundle of coherent light) from laser source 302 passes through collimator 304 that aligns the beams of the light using one or more optical lenses. Collimator 304 includes and/or is followed by one or more components with horizontal and vertical slits with adjustable opening widths that allow adjustment of the aperture and field stops. The adjustment of the vertical opening width implements the field stop that influences the width of the light sheet, while the adjustment of the horizontal opening implements the aperture stop that influences the length of the waist (e.g., Length=2×sqrt(2)×Rayleigh length) and the height of the waist of the light sheet. One or more utilized diaphragms (e.g., included in or downstream of the collimator and realizing field and/or angular aperture stops for the light sheet) can be arranged on a changer wheel or maintained in place. The widths of apertures of the diaphragms may be set manually or automatically. A cylindrical lens, for example, can be used as an aspherical optical element.

Next, the light following illumination path 300 is deflected by horizontal optical deflection component 306. An example of horizontal optical deflection component 306 is an oscillating mirror. When optical deflection component 306 is oscillated, it generates scanning horizontal movements of the light sheet (e.g., to reduce shadows in illumination of the specimen). The oscillation of horizontal optical deflection component 306 includes a back and forth rotation (e.g., vibration) about a central rotational axis (e.g., on the x-axis). This oscillation may be achieved via a piezoelectric, mechanical, and/or other electromechanical component. Horizontal optical deflection component 306 is positioned downstream of collimator 304 and diaphragms realizing field and angular aperture stops for the light sheet. As the result of oscillating movement of horizontal optical deflection component 306, the light beam components of the light sheet strike the specimen in specimen chamber 318 at alternating directions many times so as to reduce or remove altogether the shadows caused by opaque specimen substances within the illuminated light sheet plane that might appear in the path of any individual beam component. Thus horizontal optical deflection component 306 enables scanning automatic movement of the horizontal back and forth position (e.g., y-axis direction) of the waist of the light sheet illuminating the specimen.

Then the light following illumination path 300 passes through aspherical component 308 that includes one or more aspherical (e.g., cylindrical lens) optical lens elements (e.g., generates a light bundle with an elliptic cross section).

Then the light following illumination path 300 passes through variable focus lens component 310. An example of variable focus lens component 310 includes an electronically tunable lens with an electronically variable focal distance (e.g., changes focus via electromagnets, piezoelectric element, current through a solution, etc.). Variable focus lens component 310 can be utilized to sweep the focal point across the specimen to create a thinner light sheet over a larger area of the light sheet. For example, focal distance of the illumination lens is automatically and/or continually adjusted/swept across a range of focal distance values to move the focus of the lens across the width of the specimen during image capture to sweep the thinnest point of the light sheet across the specimen. The focal distance of variable focus lens component 310 can be dynamically and automatically tuned/scanned to change the diopter of variable focus lens component 310 in a range that includes both positive and negative diopter values (e.g., between both negative and positive optical powers). For example, variable focus lens component 310 can act both as a converging and diverging lens by electronically adjusting a parameter of variable focus lens component 310. By introducing a lens of variable focal distance into the illumination path of the optical arrangement, sweeping of the light sheet waist is made possible along the illumination direction. Thus variable focus lens component 310 enables automatic movement (e.g., scan) of the horizontal side to side position (e.g., x-axis direction) of the waist of the light sheet illuminating the specimen. In some embodiments, variable focus lens component 310 is positioned at or close to planes optically conjugated with an aperture of illumination objective 316.

Then the light following illumination path 300 is deflected by a vertical optical deflection component 312. An example of vertical optical deflection component 312 is an oscillating mirror. The oscillation of vertical optical deflection component 312 includes a back and forth rotation (e.g., vibration) about a central rotational axis (e.g., on the y-axis). This oscillation may be achieved via a piezoelectric, mechanical, and/or other electromechanical component. When optical deflection component 312 is oscillated, it generates scanning vertical movements of the light sheet. For example, to achieve a scanning vertical (e.g., perpendicular to the plane of the light sheet) movement of the light sheet plane, vertical optical deflection component 312 is positioned downstream of aspherical component 308 generating a light bundle with an elliptic cross section. As the result of linear or oscillating movement of vertical optical deflection component 312, the light beam components of the light sheet strike the specimen at a series of planes thus achieving optical slicing of the specimen, allowing collection of fluorescent emission emitted in consecutive slices within the specimen, by a detector (e.g., digital camera), or to observe the slices in real time directly with an observation lens arrangement (e.g., binoculars). Thus vertical optical deflection component 312 enables automatic movement (e.g., scan) of the vertical position (e.g., z-axis direction) of the waist of the light sheet illuminating the specimen.

Then the light following illumination path 300 passes through optical relay lens component 314. Optical relay lens component 314 includes optical lenses and extends the illumination path and directs the light bundle to the back aperture of illumination objective 316. Using one or more optical lenses, illumination objective 316 emits and focuses the light sheet on the specimen in specimen chamber 318, which is set to emit fluorescent light.

As the result of movement (e.g., linear, oscillating, or other) of the focus of optical components with variable focusing distance, the position of the waist of the light sheet is altered, which results in the illuminating of the substances of the specimen with the light sheet of the thinnest cross section over the widest range along the axis of illumination. This makes it possible to maintain the as fine as possible axial resolution of the light sheet microscopy (e.g., for detection objectives with low to medium numerical aperture (NA), it is determined by the thickness of the light sheet waist) and/or discard the signals from the neighboring slices of the specimen (e.g., for detection objectives with high NA), while imaging at as large as possible a region of interest within the specimen, and, if required, to achieve reduction in shadows occurring within the observed specimen plane as a result of the light sheet illumination.

Figure 4A:
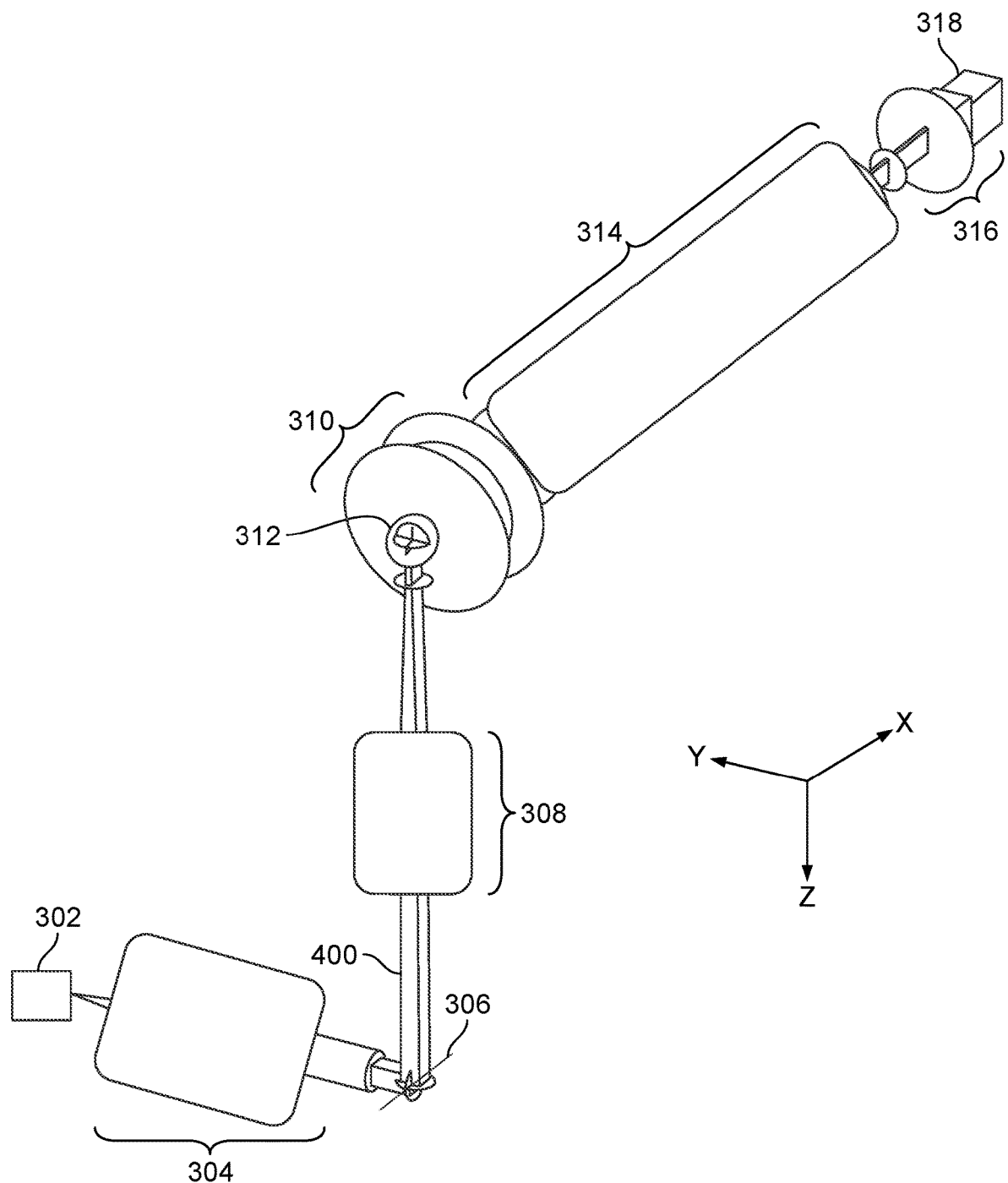
FIG. 4A-FIG. 4D are diagrams illustrating different views of a second embodiment of an illumination path and optical components of an illumination unit.
Figure 4B:
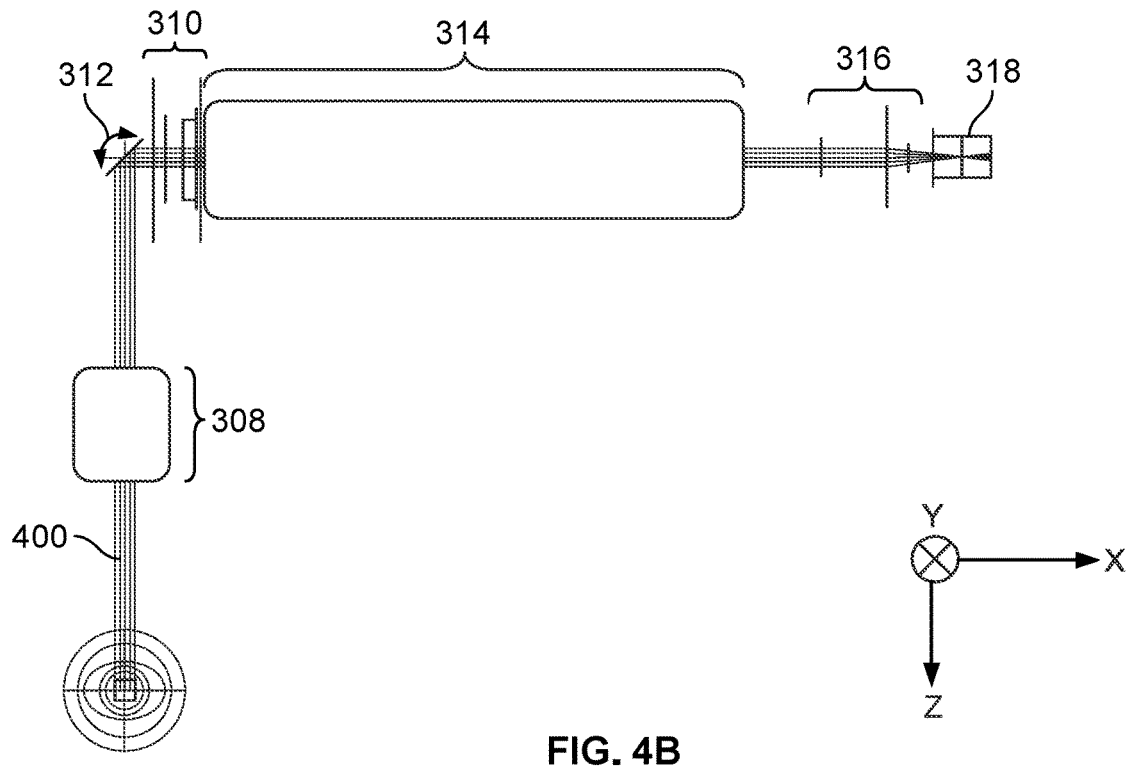
Figure 4C:
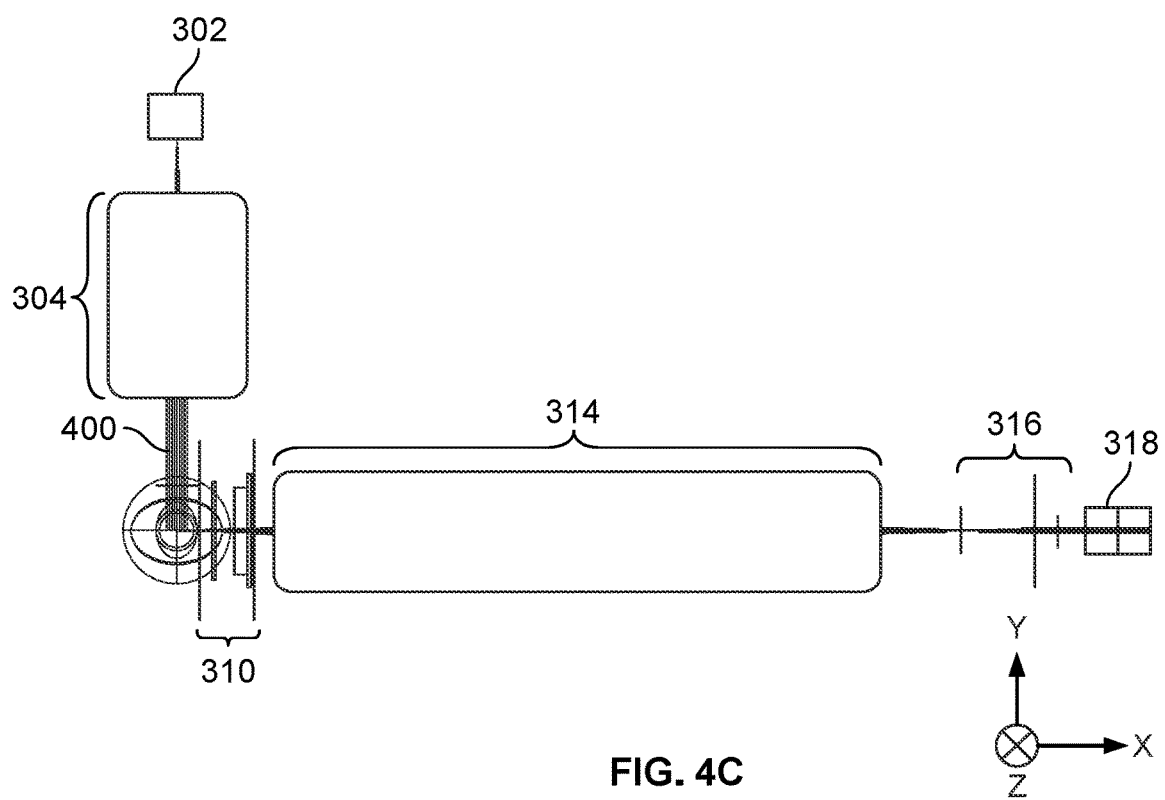
Figure 4D:
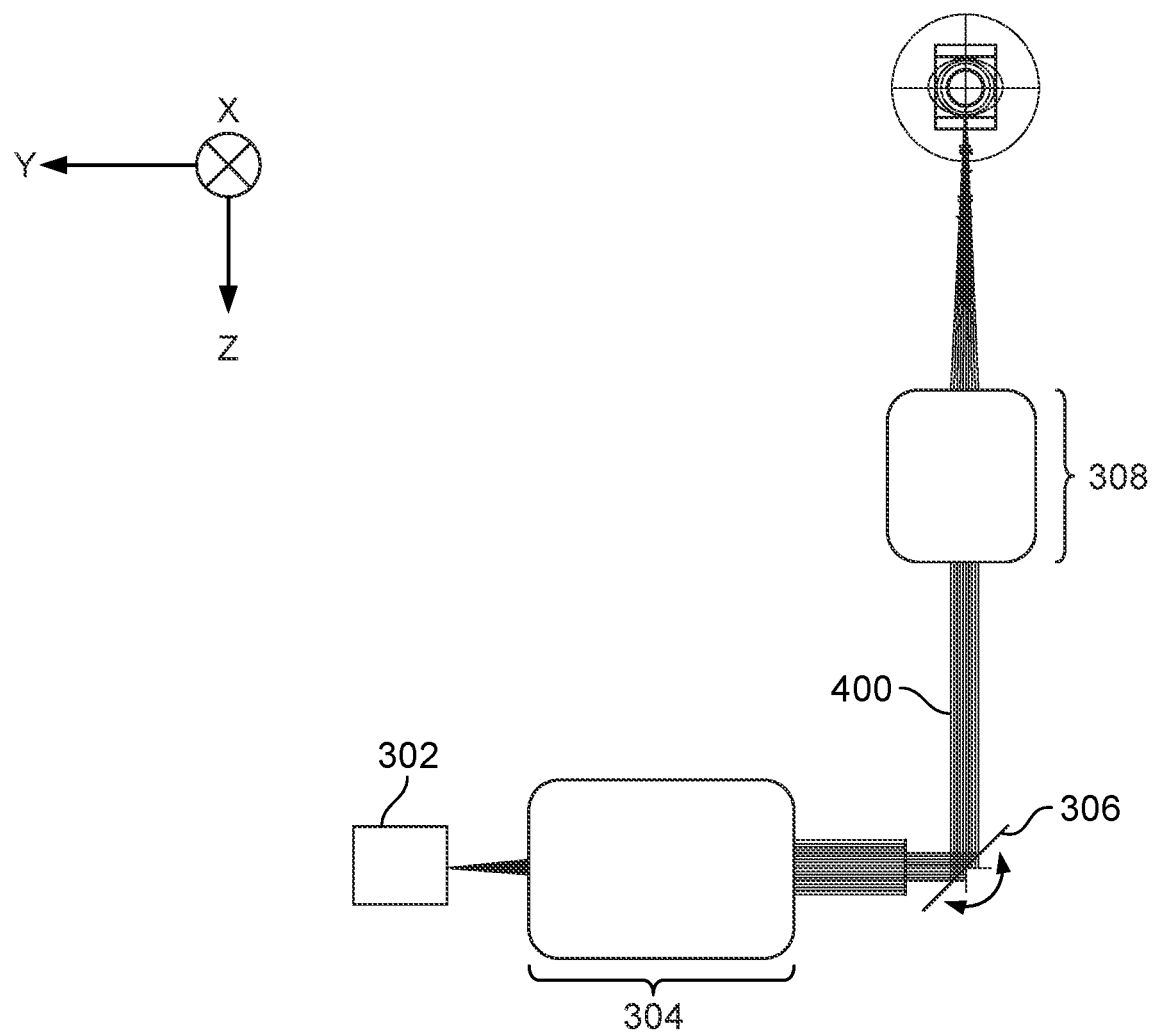

FIG. 4A-FIG. 4D are diagrams illustrating different views of a second embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 4A shows a profile view. FIG. 4B shows a front view. FIG. 4C shows a top view. FIG. 4D shows a side view. The z-direction axis is the vertical axis. A difference between illumination path 400 of FIG. 4A-FIG. 4D and illumination path 300 of FIG. 3A-FIG. 3D includes a location of variable focus lens component 310 in the illumination path relative to the other optical components. In illumination path 400, variable focus lens component 310 is positioned after vertical optical deflection component 312, in between vertical optical deflection component 312 and optical relay lens component 314. This different relative positioning of variable focus lens component 310 allows the shown components to fit in a different physical form factor that may be desired or necessary in certain configurations.

Figure 5A:
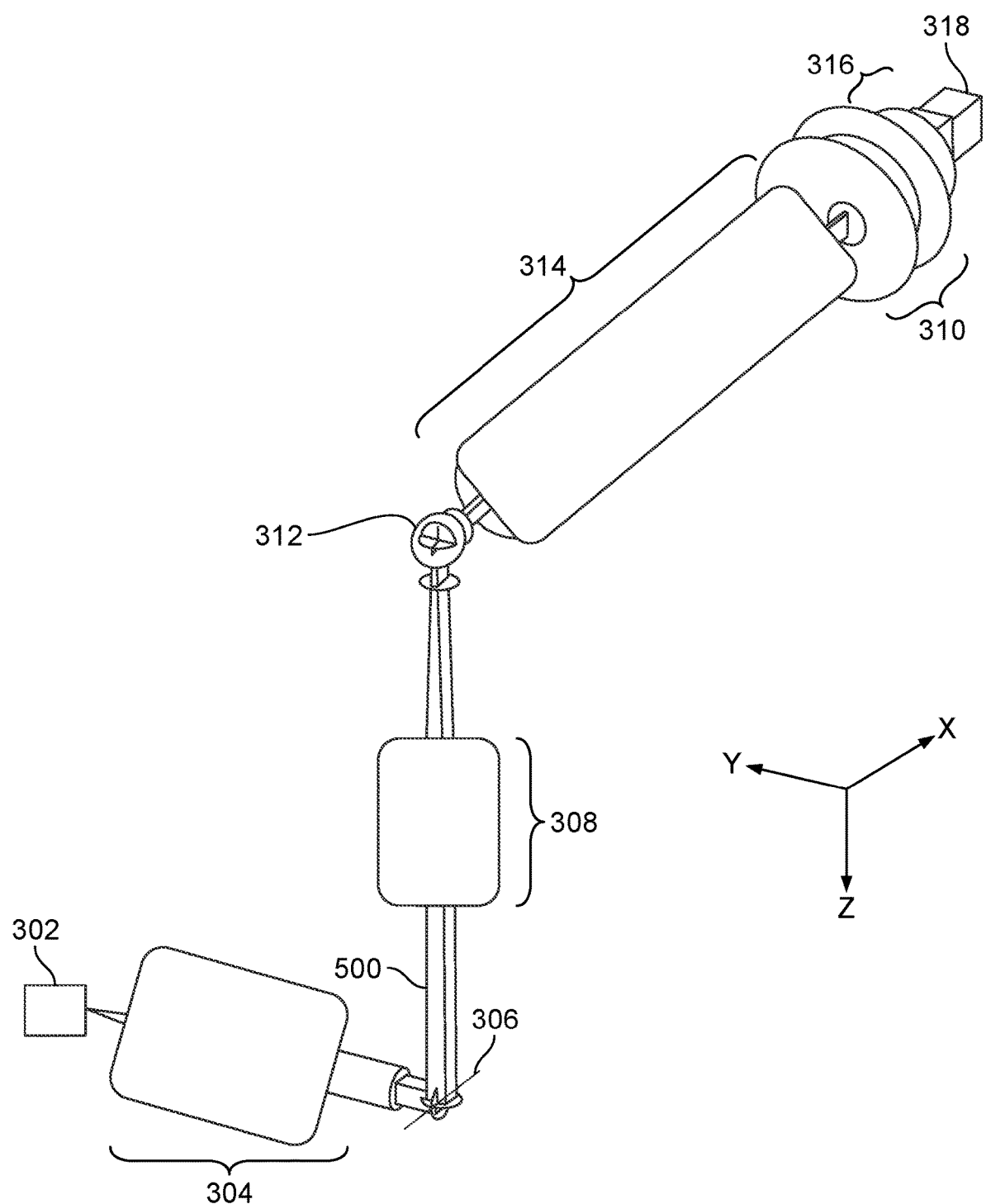
FIG. 5A-FIG. 5D are diagrams illustrating different views of a third embodiment of an illumination path and optical components of an illumination unit.
Figure 5B:
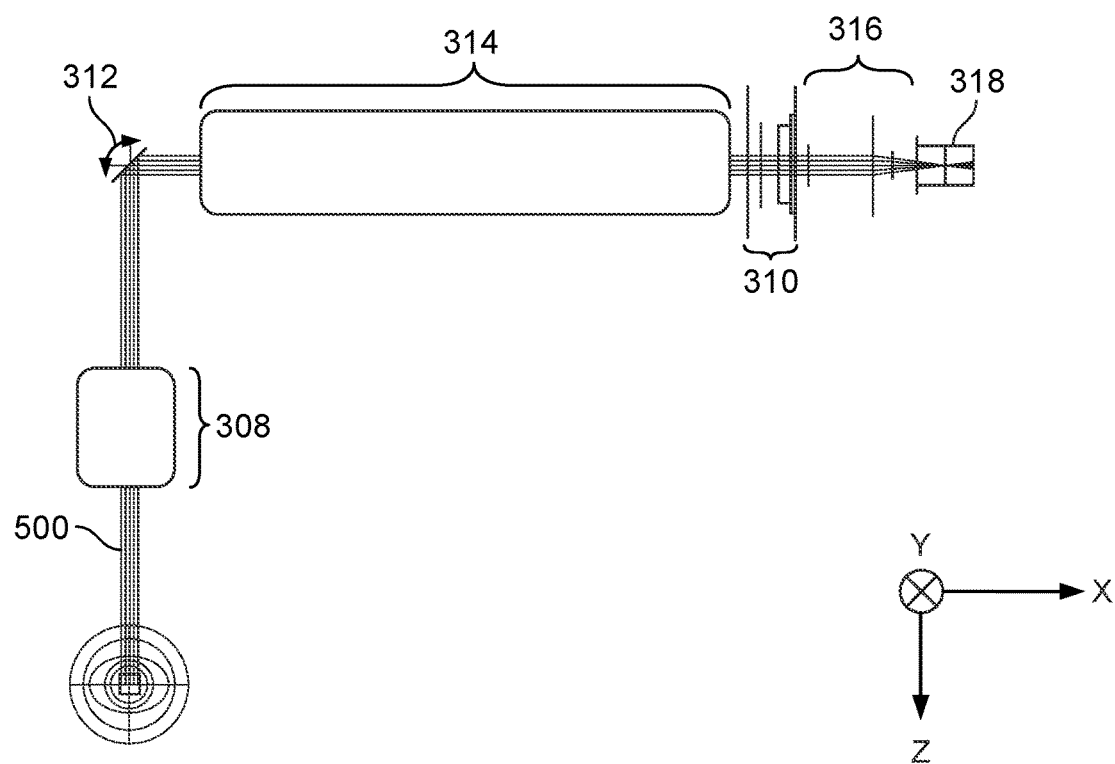
Figure 5C:
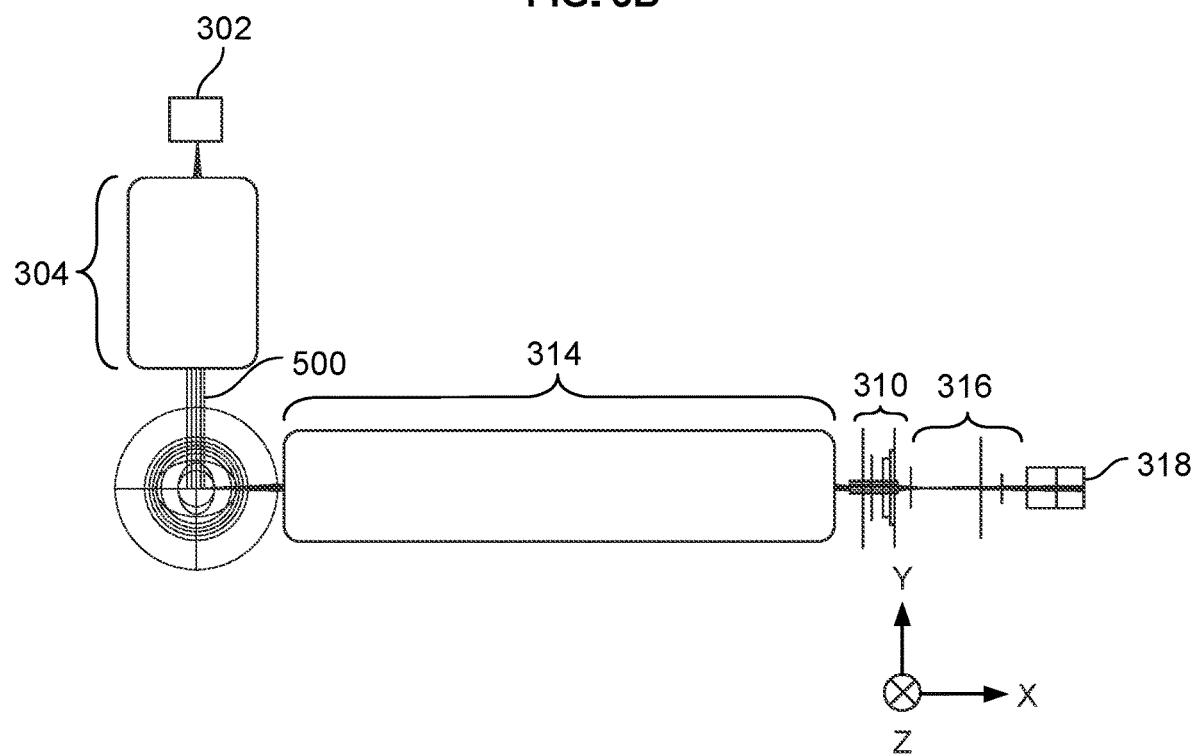
Figure 5D:
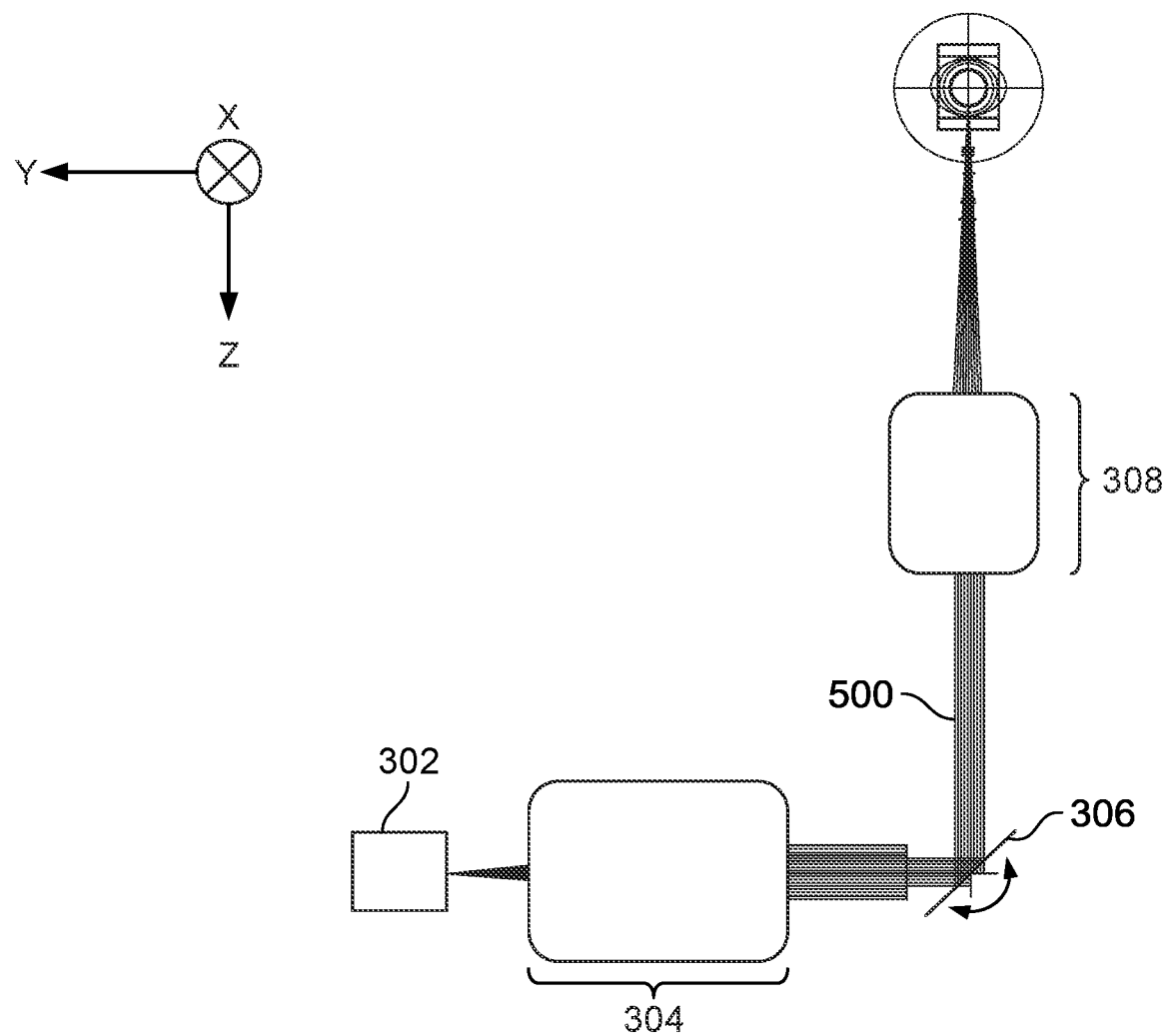

FIG. 5A-FIG. 5D are diagrams illustrating different views of a third embodiment of an illumination path and optical components of an illumination unit. For example, the shown optical components are included and arranged in the shown relative order in illumination component 102 of FIGS. 1A-1B. In some embodiments, two illumination units are utilized and the shown optical components are included and arranged in the corresponding relative order (e.g., mirrored on z-plane from shown arrangement) in illumination component 104 of FIGS. 1A-1B. Not all components of the illumination have been shown. FIG. 5A shows a profile view. FIG. 5B shows a front view. FIG. 5C shows a top view. FIG. 5D shows a side view. The z-direction axis is the vertical axis. A difference between illumination path 500 of FIG. 5A-FIG. 5D and illumination path 300 of FIG. 3A-FIG. 3D includes a location of variable focus lens component 310 in the illumination path relative to the other optical components. In illumination path 500, variable focus lens component 310 is positioned after optical relay lens component 314, in between optical relay lens component 314 and illumination objective 316. This different relative positioning of variable focus lens component 310 allows the shown components to fit in a different physical form factor that may be desired or necessary in certain configurations.

FIG. 6A-FIG. 6E are diagrams illustrating various embodiments of focusing unit add-ons to an optical microscope. High spatial and temporal resolution for a 3D light sheet imaging allows observation of physiological processes of living specimens while keeping them in their natural state without perturbation. Typical methods based on mechanical motion of the specimen for volume acquisition introduce vibrations during the acquisition and limit the scanning speed. As water-dipping objectives are customarily used for observation of biologic specimens in the specimens' natural medium, perturbations from a moving detection objective may influence the specimen behavior under observation and restrain the scope of application for dynamic studies. Larger specimens can also exceed the laser waist (focus) area and reduce the optical sectioning power of the light sheet assembly. In some embodiments, fast and vibration free 3D acquisition is performed using tunable lenses. For example, in order to generate a 3D image of a specimen using SPIM, each slice of the specimen at different depths is illuminated using a light sheet and captured using a lens focused on the slice. The image of the specimen at different depths then can be digitally processed and combined to generate a 3D rendering of the specimen. One way to capture the various slices of the specimen at different depths is to physically move the specimen up and down and/or side to side in increments. However as discussed previously, vibrations introduced in physically moving the specimen may lead to drawbacks.

In some embodiments, instead of moving the specimen for scanning the depth of the specimen, a scanning device based on the lens of dynamically variable focal distance is utilized. Video output focusing unit 602 may be inserted into the detection path between a microscope's video output port and a digital camera, and detection objective output focusing unit 620 may be inserted between the microscope's detection objective and the microscope turret and/or tube lens. One or both of focusing unit 602 and focusing unit 620 may be utilized in various embodiments. Inserting the focusing unit between the optical microscope and the digital camera provides a possibility to switch between several microscope objectives attached to the microscope turret. Inserting the focusing unit between the optical objective and the objective turret of that microscope provides for wider vertical scanning range. Inserting two focusing units, each containing at least one lens of a variable focal distance, is also possible. In that case, one lens (or a set thereof) of a variable focal distance serves as a means to select an average height of the light sheet plane within the specimen, while the other (or the set thereof) serves as a means of selecting a series of planes around the latter plane.

The specimen sample (e.g., in its chamber) is set in a fixed position when the illumination plane (e.g., light sheet is physically moved up and down) and the detection plane move simultaneously through the specimen automatically in sync. The detection plane may be moved by automatically varying the vertical focusing distance of the lens of a focusing unit. In some embodiments, rather than relying on a mechanical motor mechanism that may introduce vibrations, the focusing distance of a focusing unit may be changed electrically (e.g., via an electrically tunable lens that changes focus via electromagnets, piezoelectric element, current through a solution, etc.) without a use of a motor. As the specimen remains in a steady position, vibrations and perturbation issues are alleviated. Incidental specimen mounting and holding becomes much easier. Additionally, if a wider field of view of the specimen is desired, the horizontal sweeping of the "waist" focus of the light sheet as previously discussed may be used in conjunction with the vertical variable focus. This allows the acquisition of images in the light sheet mode where the image of the portion of the specimen being acquired is synchronized using an electronic synchronization system and is automatically focused on the thinnest area of the laser beam being swept vertically and/or horizontally. By synchronizing the detection plane and the light sheet illumination plane, it is possible to collect the fluorescent emission coming essentially only from the light sheet illumination plane. Hence, it provides the sharpest optical sectioning in the whole frame, greatly reducing shadows occurring within the observed specimen.

By setting the focal distance of this lens so as to achieve optical conjugation between the light sheet plane within the specimen and the camera plane, an image of the selected slice within the specimen can be recorded and/or observed. If required, an electronic system including a processor driven by a software program is provided to achieve an automatic optical coupling between the camera plane and the light sheet plane, thus allowing fast 3D light sheet microscopy. The light sheet scanning capability in the illumination path and associated focusing capability onto different planes within the observed specimen in the detection path ensures the optical coupling between the flat illuminated slice within the specimen and the surface of the digital camera with no mechanical movement of the specimen. Avoidance of the mechanical movement of the specimen speeds up collecting light sheet microscopy data, with associated reduction of photo bleaching. Also, this precludes its deformation by the cumulative forces exerted on it by strain related with the interface between the specimen and the water-dipping objective through the matching objective-specimen liquid.

In some embodiments, focal distance of the illumination lens is automatically adjusted to move and sweep the focus of the lens across a range covering the width of the specimen during image capture to automatically sweep the thinnest point of the light sheet across the width of the specimen, and scanning lines of a rolling shutter of the detector (e.g., digital camera) are synchronized with the sweeping position of the waist of the light sheet, allowing a sharper image and a larger field of view without physically moving the specimen within the plane of the light sheet.

By integrating these scanning means, the light sheet system not only provides optical sectioning with optimal spatial resolution and signal to noise ratio, but also delivers unprecedented temporal resolution for 3D acquisition, addressing the needs for dynamic imaging of rapid biophysical processes.

Figure 6A:
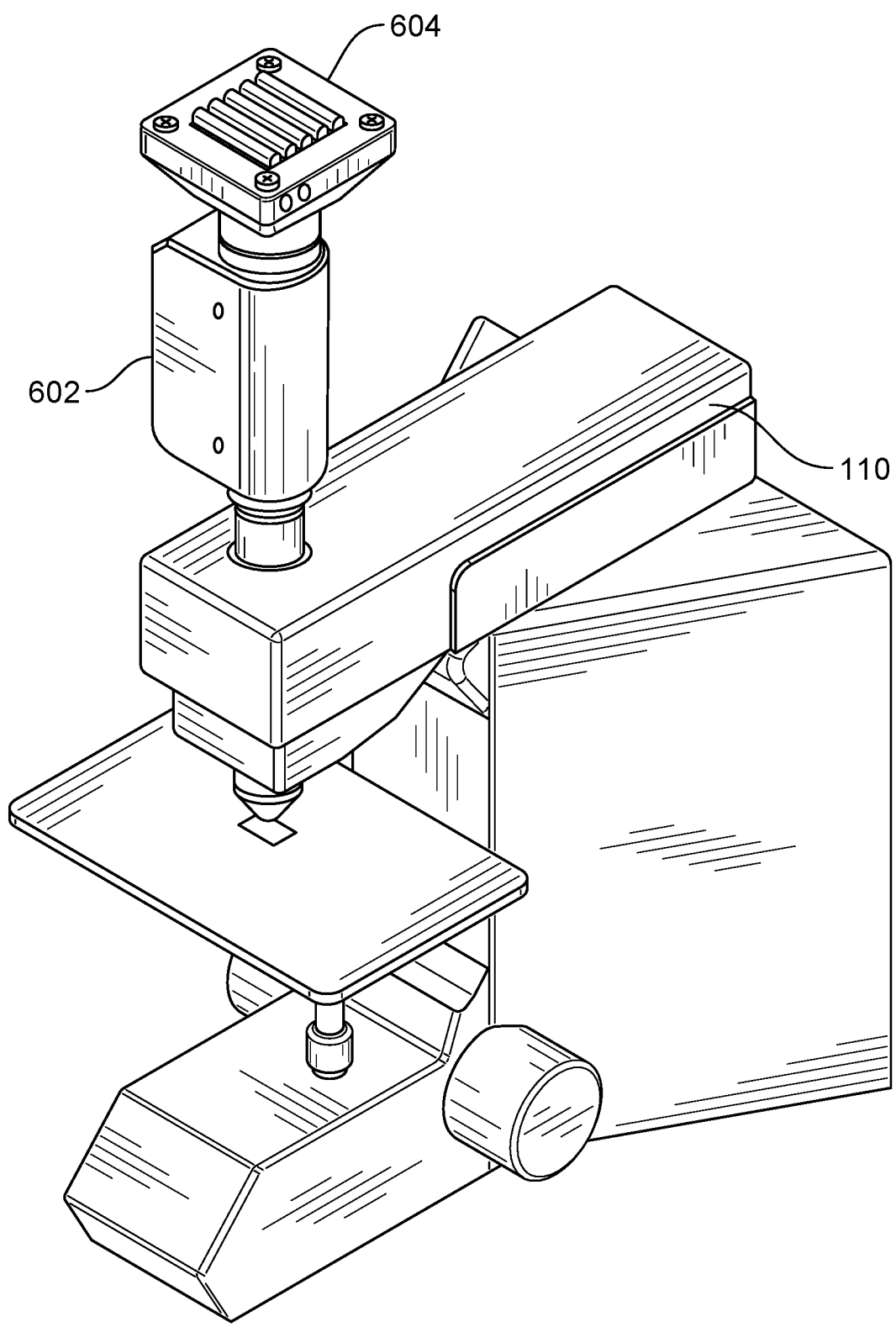
FIG. 6A-FIG. 6E are diagrams illustrating various embodiments of focusing unit add-ons to an optical microscope.
Figure 6B:
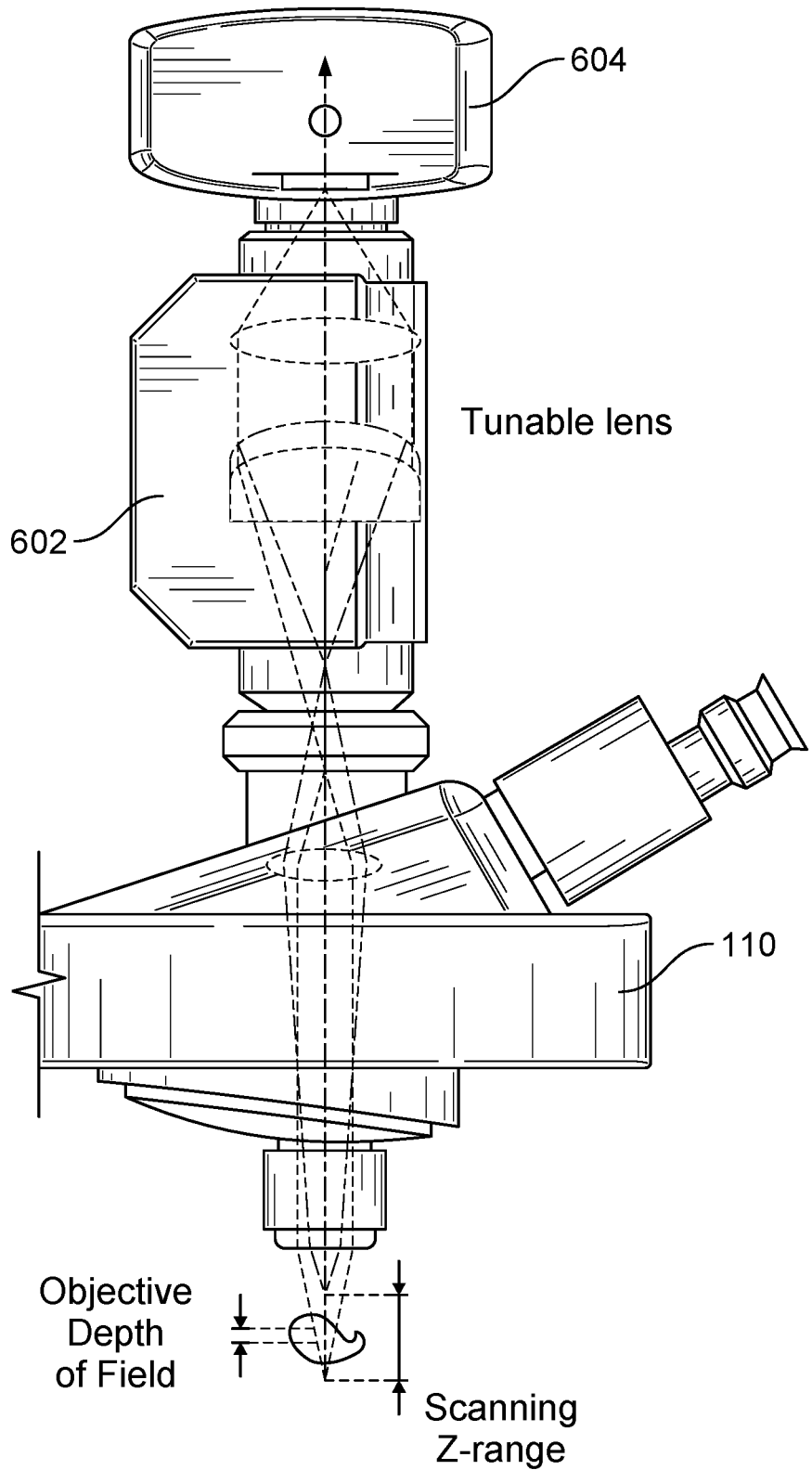
Figure 6C:
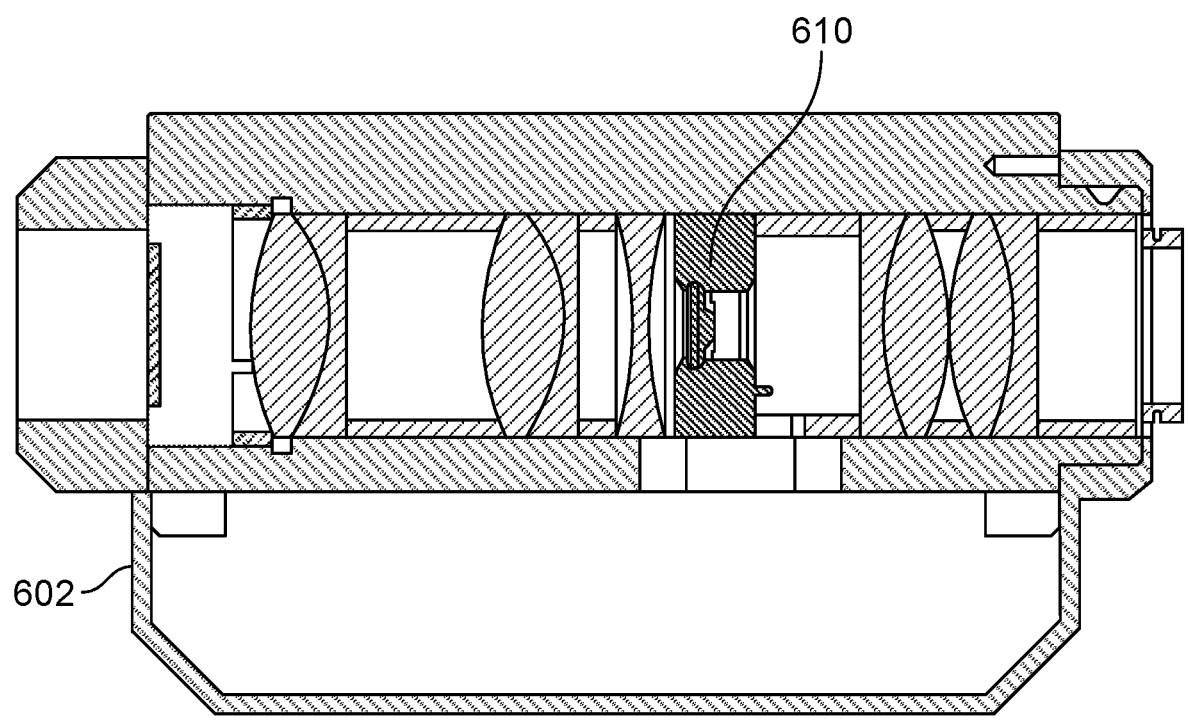

FIG. 6A-FIG. 6C are diagrams illustrating an embodiment of a video output focusing unit add-on to an optical microscope. Video output focusing unit 602 is coupled to a video output port (e.g., C-Mount interface) of optical microscope 110 and an optical input of digital camera 604 (e.g., via screw-threaded, press fit, friction, locking, bayonet, or any other types of connecting/mounting interfaces). For example, focusing unit 602 is included in and/or coupled to detection unit 112 of FIG. 1B. Digital camera 604 is coupled to focusing unit 602 and digital camera 604 captures an image of a specimen obtained via an optical path of lenses of focusing unit 602 added to the optical detection path of microscope 110. Focusing unit 602 has an optical axis that is substantially parallel to the optical axis of the detection objective of the optical microscope for manual or automatic focusing onto the same geometrical plane substantially perpendicular to the optical axis of the detection objective of the optical microscope, which is illuminated by the light generated by one or more illumination sources. Focusing unit 602 includes an arrangement of optical elements with at least one optical element that is able to dynamically change focal distance (e.g., tunable lens 610). FIG. 6C shows an internal cutaway view of focusing unit 602. Tunable lens 610 is able to change its focusing distance electrically (e.g., via electromagnets, piezoelectric element, current through a solution, etc.) without a use of a motor. In other embodiments, focusing distance of focusing unit 602 may be changed mechanically.

Figure 6D:
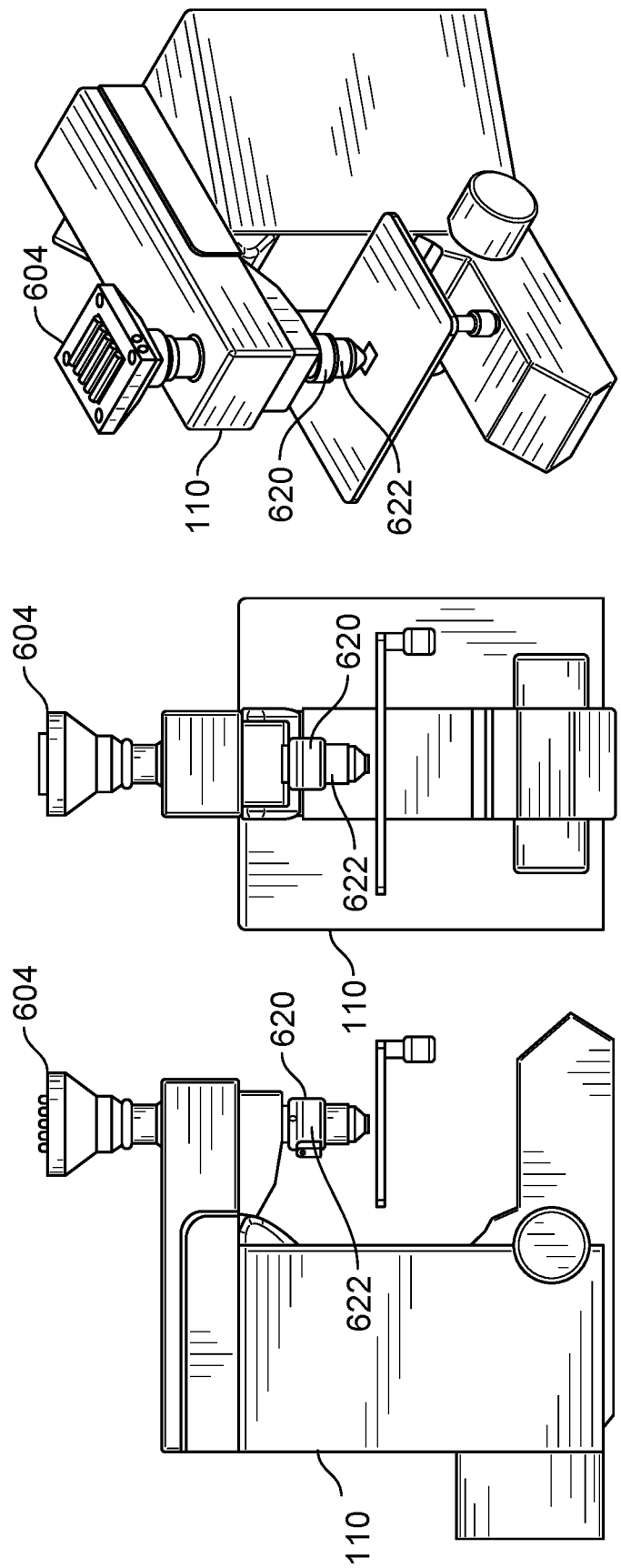
Figure 6E:
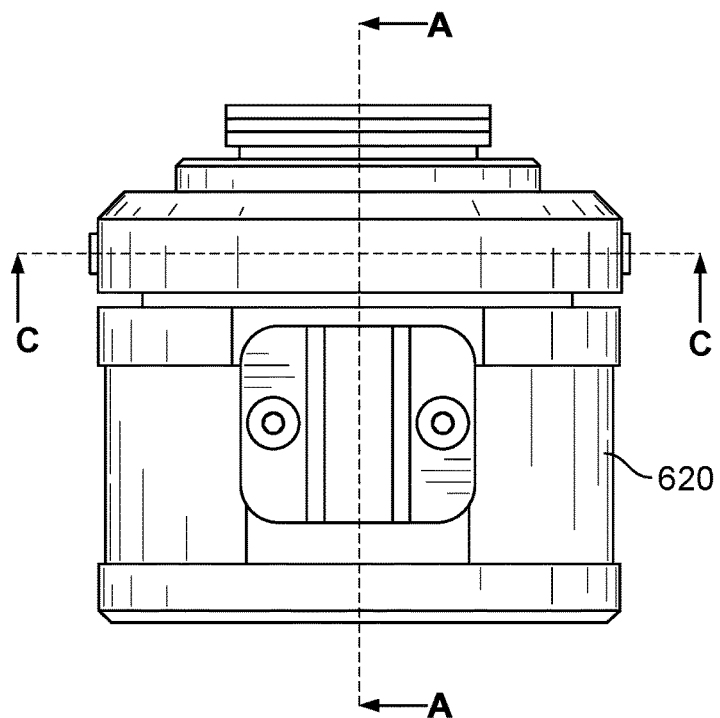
Figure 6E:
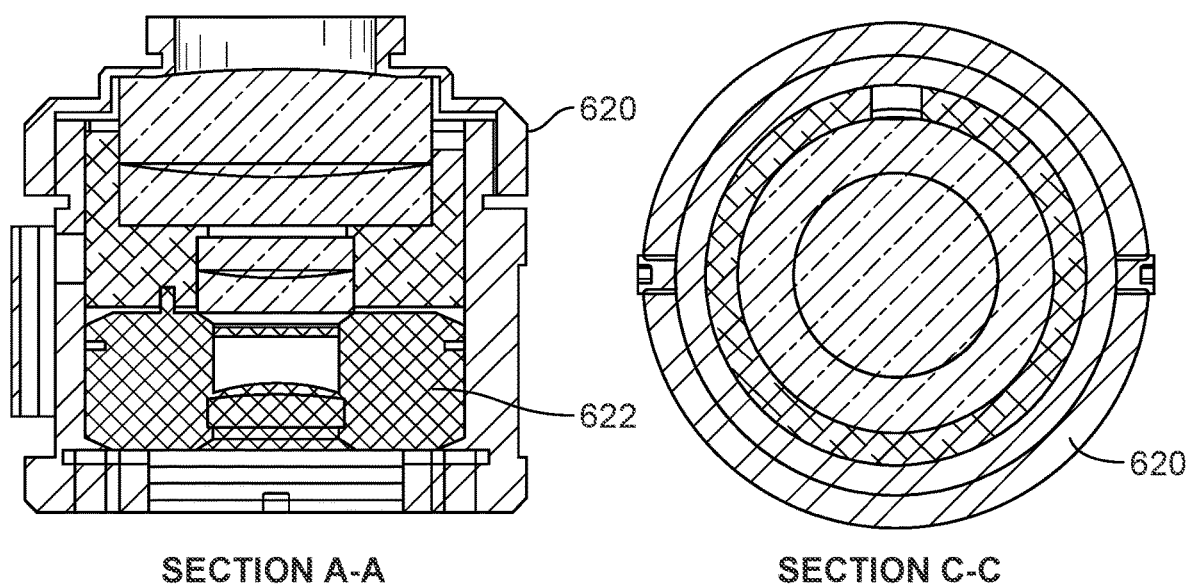

FIG. 6D-FIG. 6E are diagrams illustrating an embodiment of a detection objective output focusing unit add-on to an optical microscope. Detection objective output focusing unit 620 is directly coupled to detection objective 622 and the microscope turret and/or tube lens of optical microscope 110 (e.g., via screw-threaded, press fit, friction, locking, bayonet, or any other types of connecting/mounting interfaces). For example, focusing unit 620 functions an intermediary optical element between optical detection objective 622 and a microscope turret of optical microscope 110. Digital camera 604 is coupled to focusing unit 620 and digital camera 604 captures an image of a specimen obtained via an optical path of lenses of focusing unit 620 added to the optical detection path of microscope 110. Focusing unit 620 has an optical axis that is substantially parallel to the optical axis of the detection objective of the optical microscope for manual or automatic focusing onto the same geometrical plane substantially perpendicular to the optical axis of the detection objective of the optical microscope, which is illuminated by the light generated by one or more illumination sources. Focusing unit 620 includes an arrangement of optical elements with at least one optical element that is able to dynamically change focal distance (e.g., tunable lens 622). FIG. 6E shows an external side view and various internal cutaway views of focusing unit 620. Tunable lens 622 is able to change its focusing distance electrically (e.g., via electromagnets, piezoelectric element, current through a solution, etc.) without a use of a motor. In other embodiments, focusing distance of focusing unit 620 may be changed mechanically.

Figure 7:
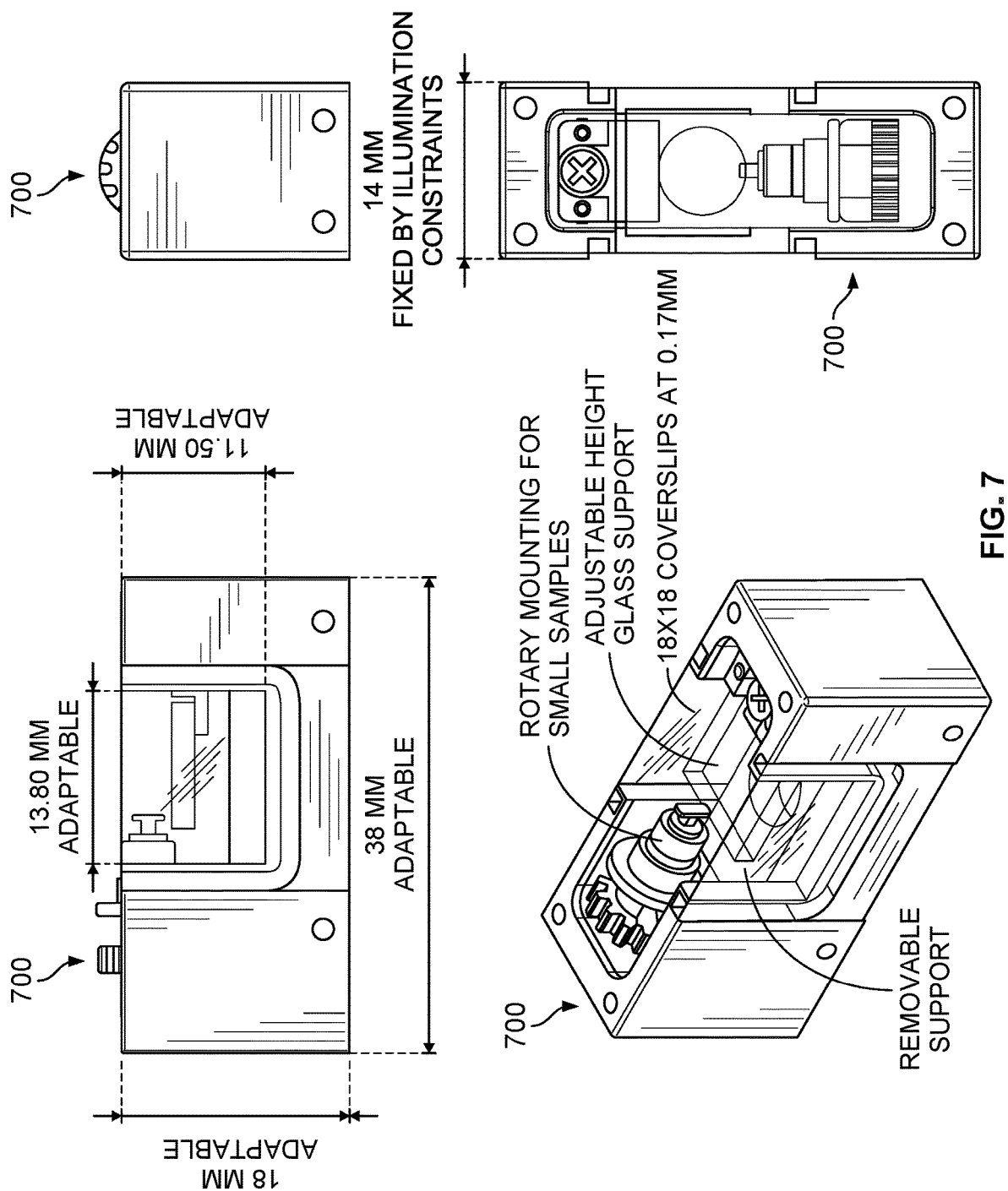
FIG. 7 is a diagram illustrating an embodiment of a specimen holding chamber assembly.

FIG. 7 is a diagram illustrating an embodiment of a specimen holding chamber assembly. FIG. 7 shows various different view angles of specimen chamber assembly 700. An example of specimen chamber assembly 700 is specimen chamber and holder assembly 116 in FIG. 1B.

In typical SPIM systems, the specimen is held in a container that is observed horizontally due to the potential deformability of the specimen embedding medium as a result of the action of gravitational force. This is because the optical axis of the detection lens of the microscope cannot extend vertically, as it does in the conventional configuration of the majority of upright or inverted optical microscopes. However, a vast majority of the conventional vertical (e.g., upright or inverted) microscopes have detection objective's optical axes extending vertically. Thus, conventional specimen holding systems for SPIM often cannot be utilized in these vertical microscopes. Therefore, there is a need both in providing chambers that are filled with immersion medium and that can be used in conventional vertical microscopes, comprising an open top yielding unhindered access to both air and immersion objectives, a substantially transparent bottom side for viewing the specimens in transmission mode, and designed to be easily removable from the microscope's stand for the microscope to retrieve its original, for example wide field, functional configuration.

Specimen chamber assembly 700 includes a chamber that is enclosed on the sides and bottom but open on the top (allowing a direct medium immersion for a detection objective). The bottom of the chamber is substantially transparent for observation in transmission mode and coarse specimen positioning. Two of the sides include substantially transparent coverslips that allow a light sheet to pass through to illuminate a specimen placed in the chamber. In some embodiments, the specimen is placed in the chamber of specimen chamber assembly 700 on a height adjustable (e.g., by turning a pin/screw/knob) glass support. The glass support may be removed from the chamber (or moved away) and a rotary mounting (e.g., T-spike holder) coupled to a cylindrical specimen holder holding a specimen may be placed in the chamber. The rotary mounting coupled to a cylindrical specimen holder can be laid horizontally in the chamber and the specimen can be rotated about a horizontal axis by rotating a knob and/or via gears that are coupled to a rotating mechanism (e.g., may be motorized). For example, a specimen is embedded in a substantially rigid cylindrical transparent embedding compound maintained in an immersion liquid and placed in a rotary mount coupled to the chamber. The rotary mount allows a rotational movement of the specimen using a rotational drive or knob about a substantially horizontal rotational axis and substantially perpendicular to the optical axis of the detection objective.

In some embodiments, the chamber of assembly 700 is filled with an immersion solution. For example, the chamber that includes a specimen (e.g., either on a glass support or in a cylindrical specimen holder) is filled with a saline solution, allowing the use of water dipping/immersion objectives. In some embodiments, to ensure better resistance against various corrosive agents such as salt water or cleaning agents and ease of cleaning/sonicating/autoclaving, non-transparent parts of chamber assembly 700 are to be made from medical grade and Polytetrafluoroethylene (e.g., Teflon) parts, suited to be used together with temperature control equipment for precise temperature control and equipped with nozzles that allow constant carbon dioxide control during experimentation by flowing carbon dioxide on the top of the chamber. For precise temperature control throughout an experiment, the baseplate of the chamber is configured for temperature control. This allows transmission of heating/cooling via contact with a liquid circulation interface for temperature control (e.g., allowing temperature control from 15° C. to 37° C.). Carbon dioxide control is achieved through nozzles that allow a desired carbon dioxide flow on the top of the chamber.

Figure 8:
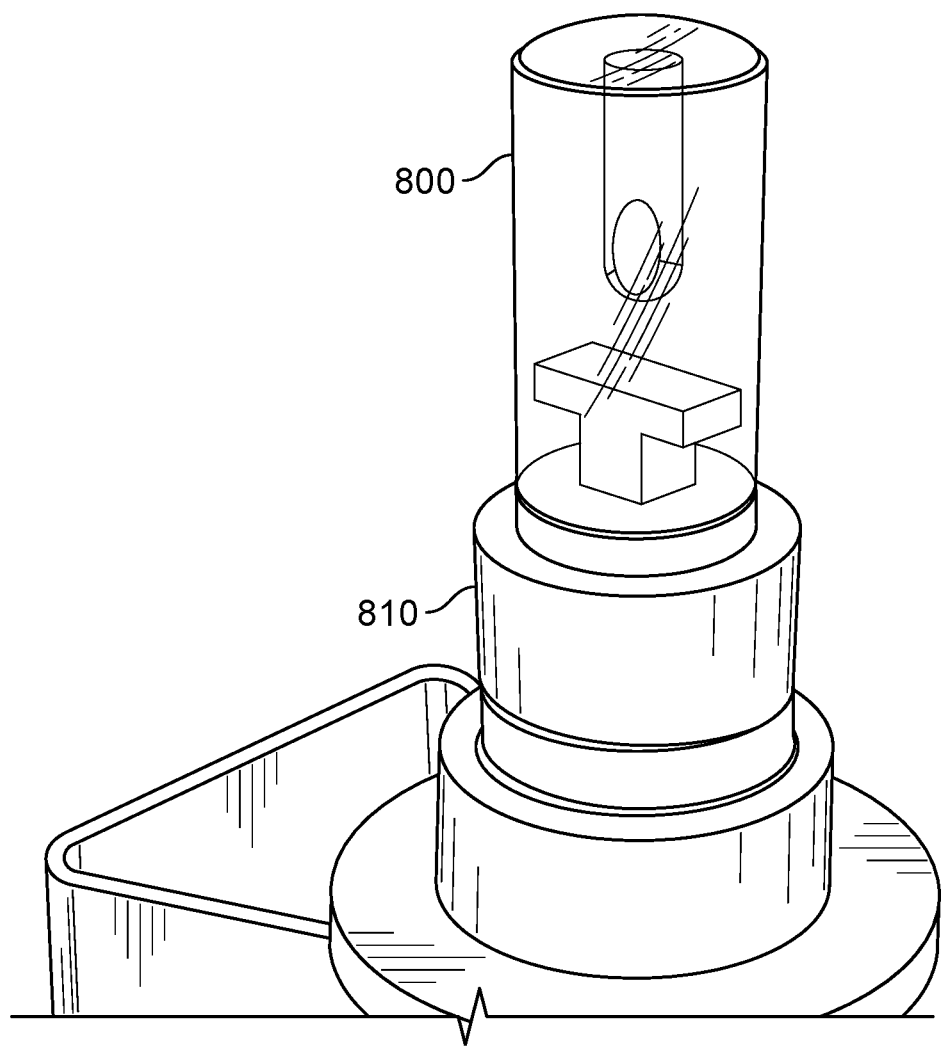
FIG. 8 is a diagram illustrating an embodiment of a mold-formed specimen holder over a T-spike rotary mounting.

FIG. 8 is a diagram illustrating an embodiment of a mold-formed specimen holder over a T-spike rotary mounting. In some embodiments, specimen holder 800 is placed horizontally in the chamber of chamber assembly 700 shown in FIG. 7 for observation of the included specimen via SPIM performed using the system shown in FIG. 1B. Using the conventional upright or inversed microscope's objective arrangement as a detection path of the selective plane light sheet system may require the specimen to be rotated about its horizontal axis. In some embodiments, a specimen is embedded in an embedding medium with an increased rigidity sufficient to withstand the actions of gravitational forces when the medium is placed horizontally. For example, the shown specimen holder allows the specimen to be embedded within the substantially transparent embedding medium in a horizontal direction, perpendicular to the substantially vertical orientation of the optical axis of the detection objective arrangement in upright and inverted microscopes, allowing imaging of transient events in living biological specimens.

Specimen holder 800 has been formed by molding a substantially transparent material in a cylindrical shape over T-spike rotary mounting 810. In some embodiments, T-spike rotary mounting 810 includes a medical grade Polytetrafluoroethylene material. A specimen is placed inside the molded substantially transparent material and sealed to contain the specimen within the substantially transparent material even if the molded holder is placed in a horizontal position. The specimen and the specimen holder may be rotated by rotating the T-spike rotary mounting (e.g., rotation by knob or gear within chamber assembly 700 of FIG. 7 placed under a microscope). Prior specimen mounting and specimen holder solutions for selective plane light sheet microscopy that exist to date have not been designed to be used with a conventional microscope stand. Unlike the embodiments described herein, prior specimen mounting methods do not offer fast, efficient, and reproducible results, neither do they guarantee stable specimen positioning for the observation and image acquisition. In some embodiments, an embedding medium is formed with sufficient rigidity to withstand manipulating it around a substantially horizontal direction with repeatable specimen positioning that greatly alleviates the need for refocusing on the specimen.

Figure 9:
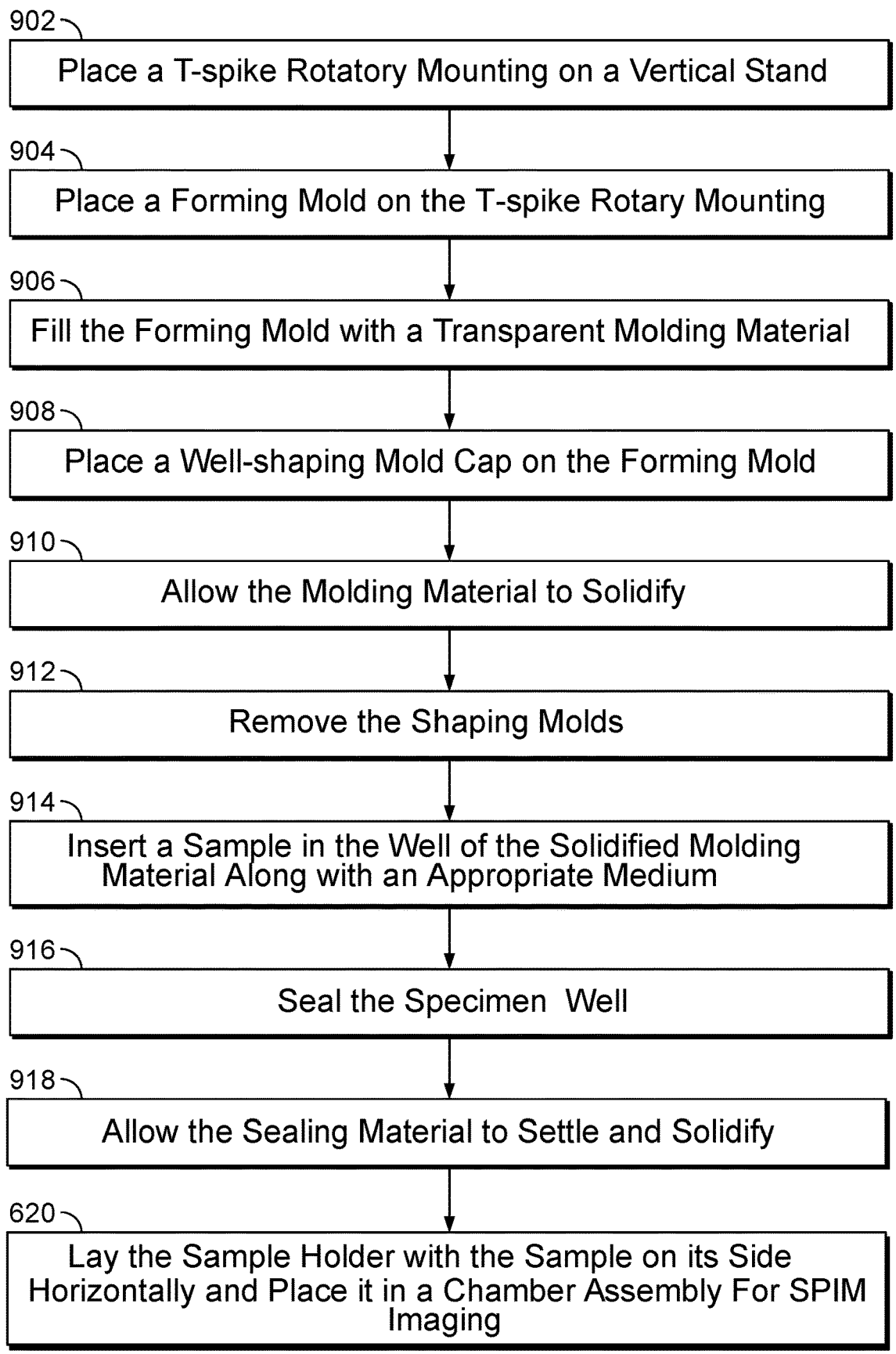
FIG. 9 is a flowchart illustrating an embodiment of a process for forming a molded specimen holder.

FIG. 9 is a flowchart illustrating an embodiment of a process for forming a molded specimen holder. For example, the process of FIG. 9 is utilized to form specimen holder 800 shown in FIG. 8. FIGS. 10A-10H illustrate an embodiment of various steps of forming a molded specimen holder.

Figure 10A:
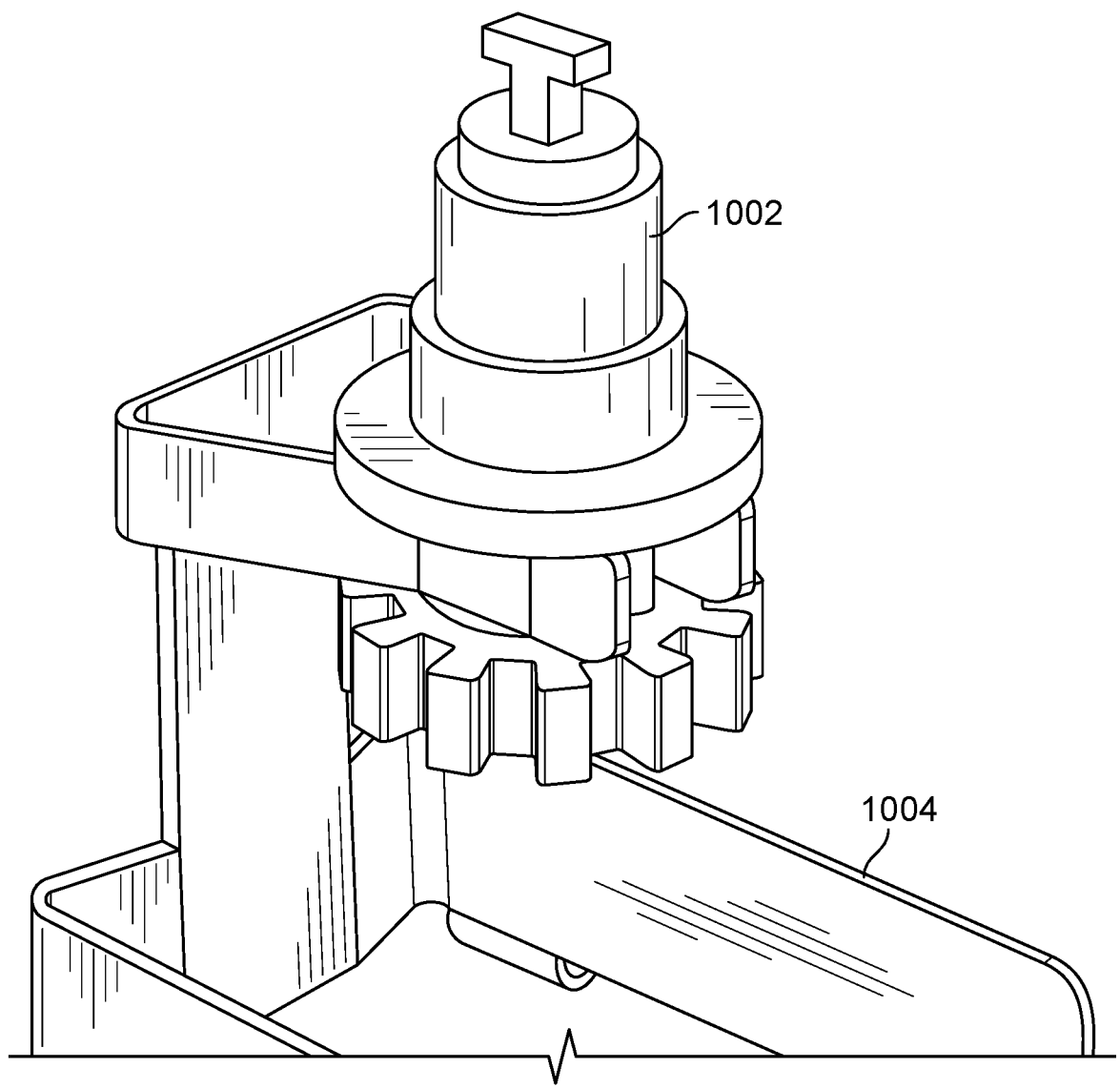
FIGS. 10A-10H illustrate an embodiment of various steps of forming a molded specimen holder.

At 902, a T-spike rotary mounting is placed on a vertical stand. In some embodiments, the T-spike rotary mounting is the rotatory mounting shown in FIG. 8. The vertical holder allows the T-spike rotary mounting to be positioned vertically for the molding process and the mounting is removed from the vertical stand after the molding process for placement inside a chamber of a chamber assembly (e.g., shown in FIG. 7). An example of the placement of the T-spike rotary mounting 1002 on the vertical stand 1004 is illustrated in FIG. 10A.

Figure 10B:
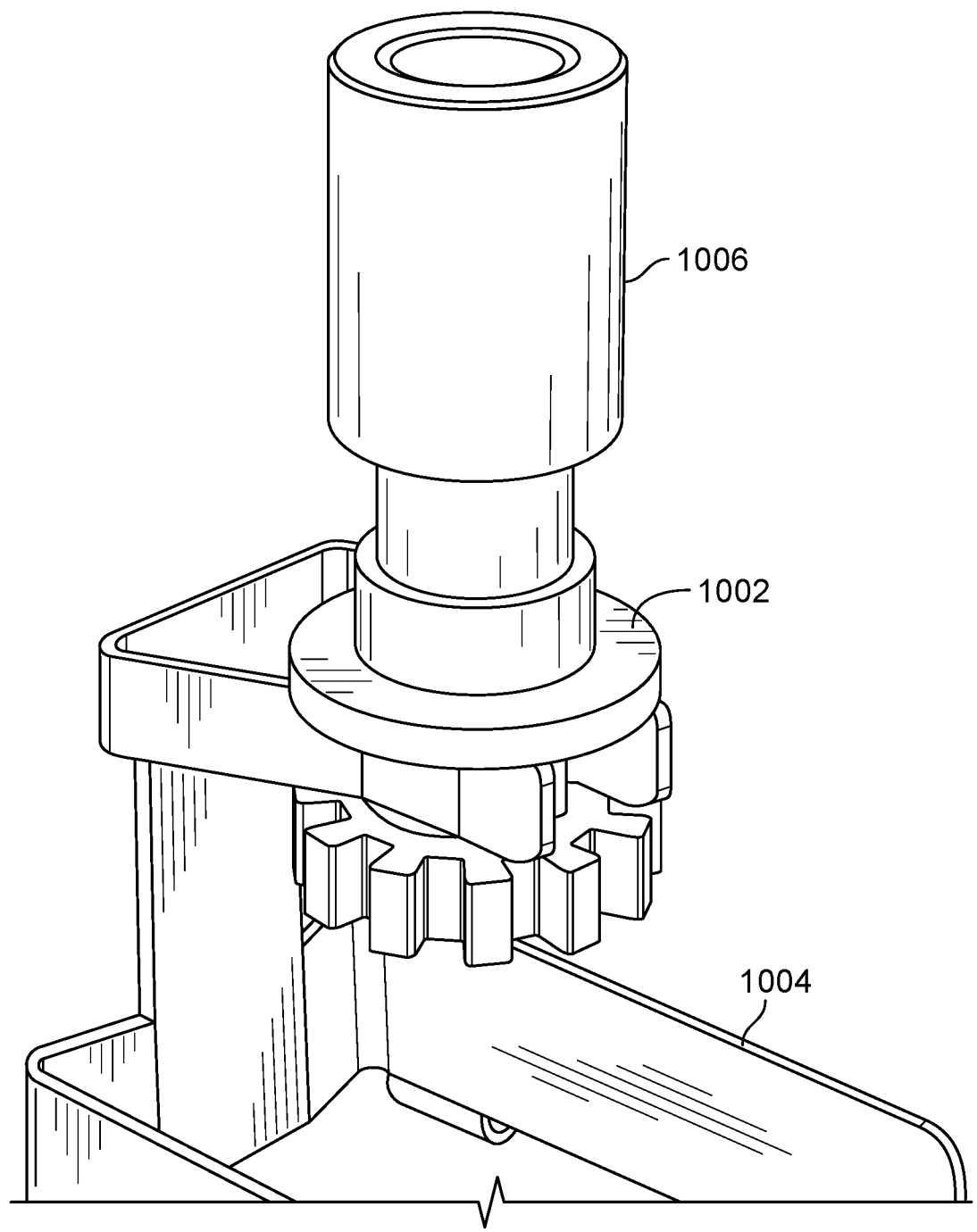

At 904, a forming mold is placed on the T-spike rotary mounting. For example, the forming mold is a hollow cylinder that can be coupled to the T-spike rotary mounting. The forming mold tightly fits onto the rotary mounting to avoid leakage of any liquid material filled in the forming mold. An example of the placement of forming mold 1006 over T-spike rotary mounting 1002 is illustrated in FIG. 10B.

Figure 10C:
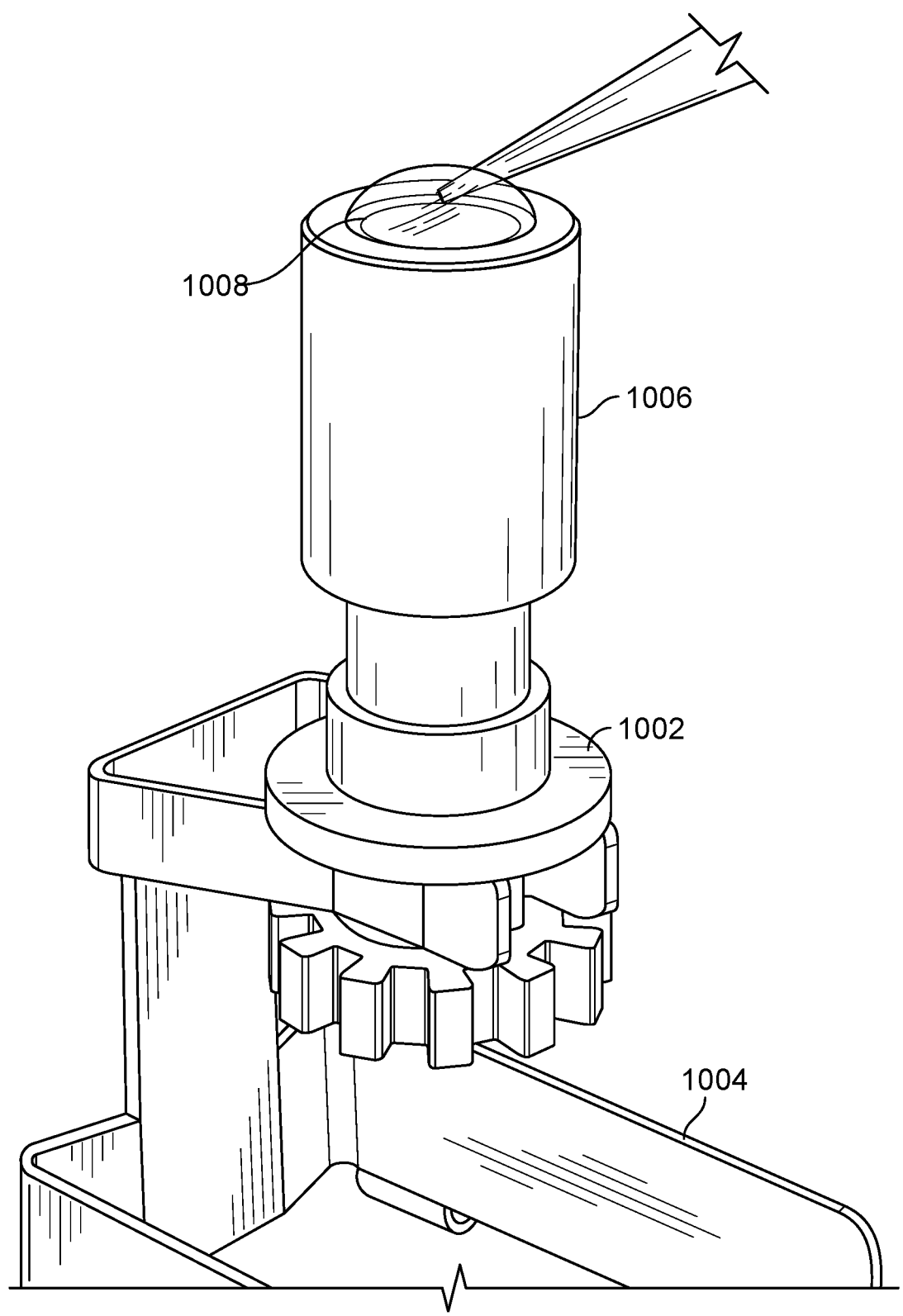

At 906, the forming mold is filled with a substantially transparent molding material. The molding material may be initially in a liquid or gel state and will solidify over a period of time to become rigid. Examples of the substantially transparent molding material include agar, agarose, gellan gum, or another gelling agent. For example, a Phytagel solution (e.g., 0.8%) is filled in the forming mold. An example of the filling of the inside cavity of the forming mold with molding material 1008 using a pipette is shown in FIG. 10C.

Figure 10D:
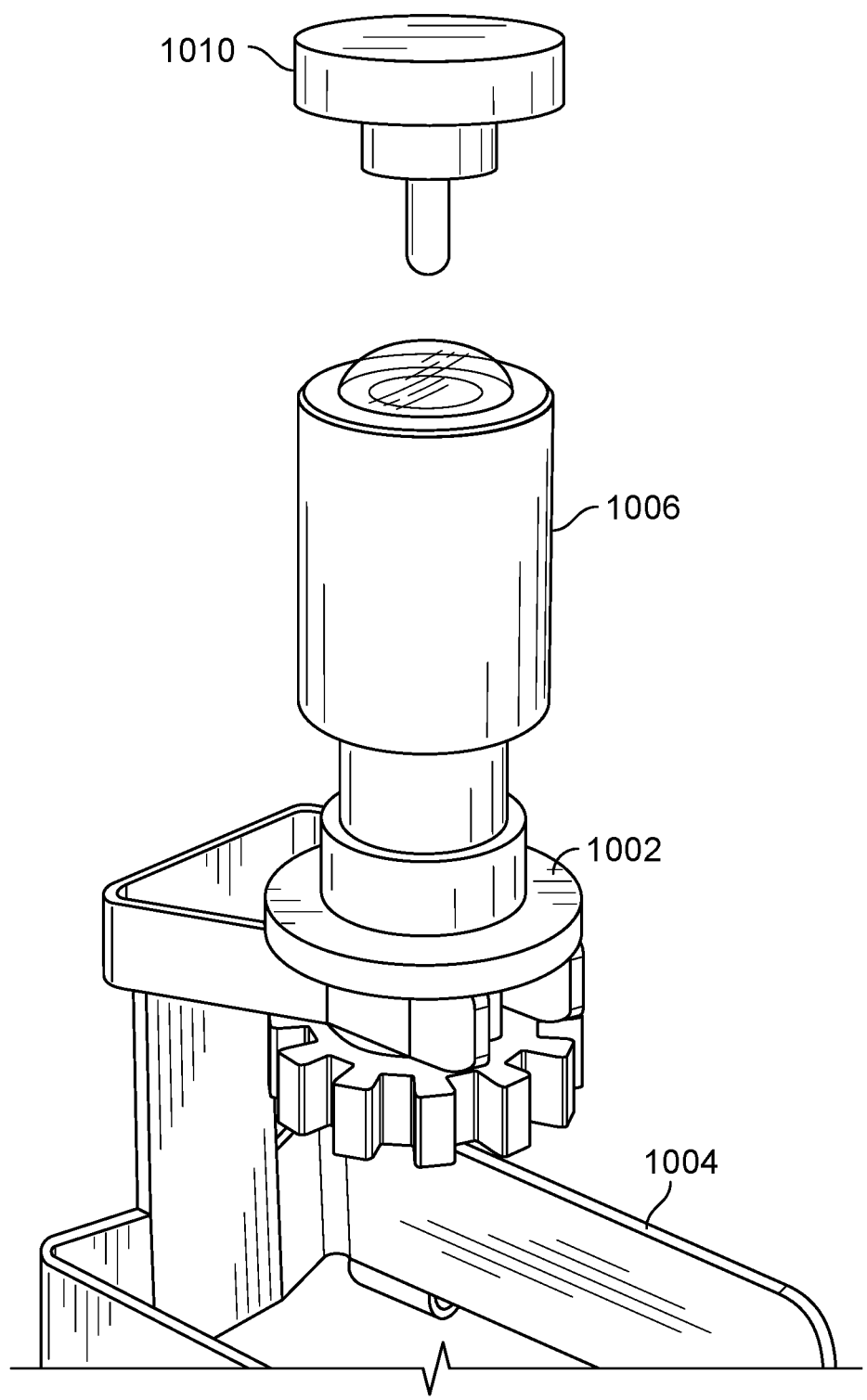
Figure 10E:
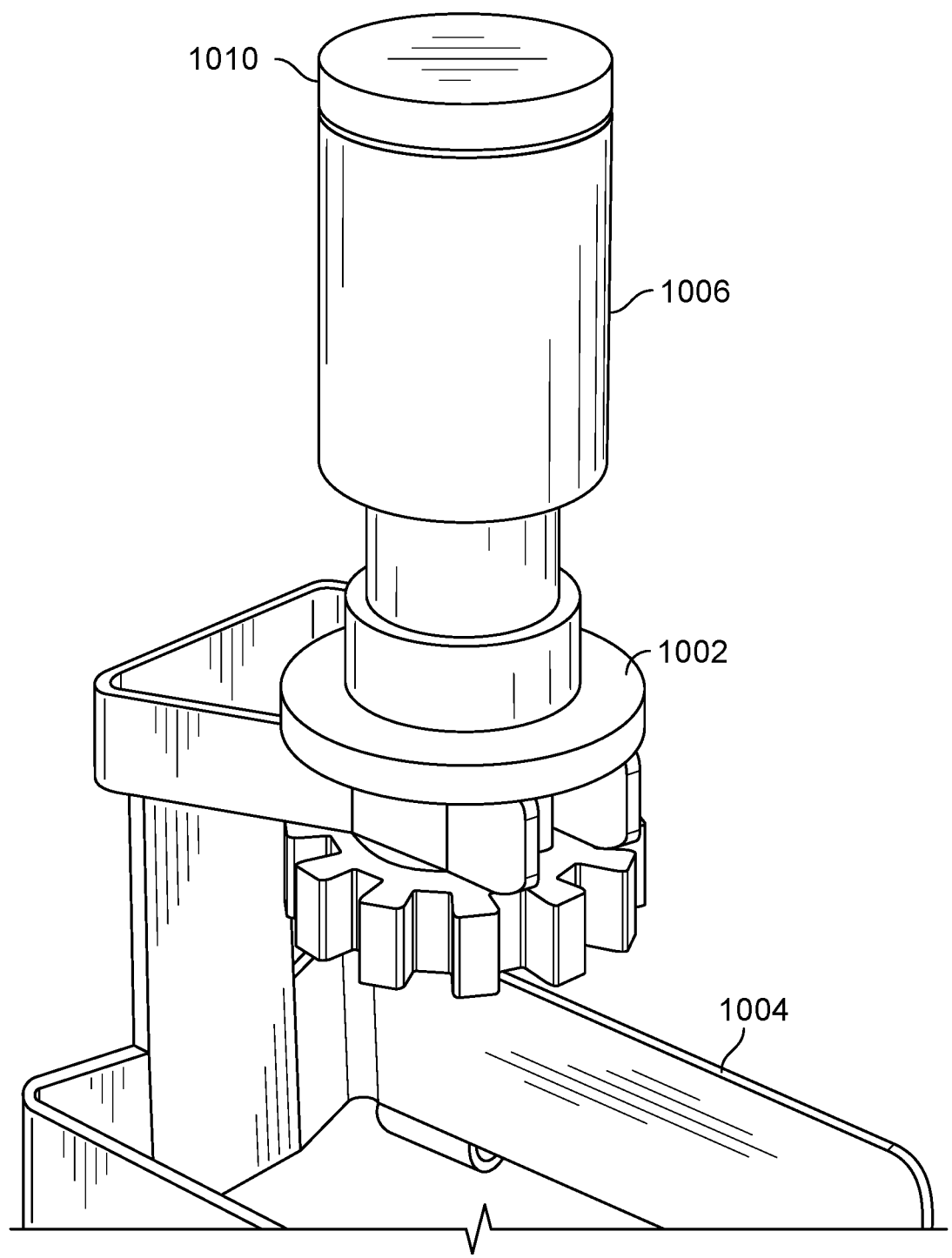

At 908, a well-shaping mold cap is placed on the forming mold. The well-shaping mold cap creates a well in the molding material where a specimen can be placed. The shown well-shaping mold cap 1010 includes a solid cylindrical extension that is smaller in diameter than the diameter of the interior of the forming mold and when the well-shaping mold cap is capped on the forming mold, the extension of the well-shaping mold cap is inserted inside the forming mold to occupy and form the space of the specimen well surrounded by the molding material. For example, the cap has a pin extension that will form a pit at the top of the molding material when the molding material solidifies around the pin. The diameter of the cylinder extension/pin is such to host a biological specimen together with the specimen's natural medium. The well-shaping mold cap is placed prior to solidification of the molding material. An example of capping the forming mold with well-shaping mold cap 1010 is shown in FIG. 10D. An example illustration after capping with well-shaping mold cap 1010 is shown in FIG. 10E.

At 910, the molding material is allowed to solidify. For example, at room temperature, a Phytagel molding material solidifies in approximately five minutes and the amount of time required for solidification is allowed to pass.

Figure 10F:
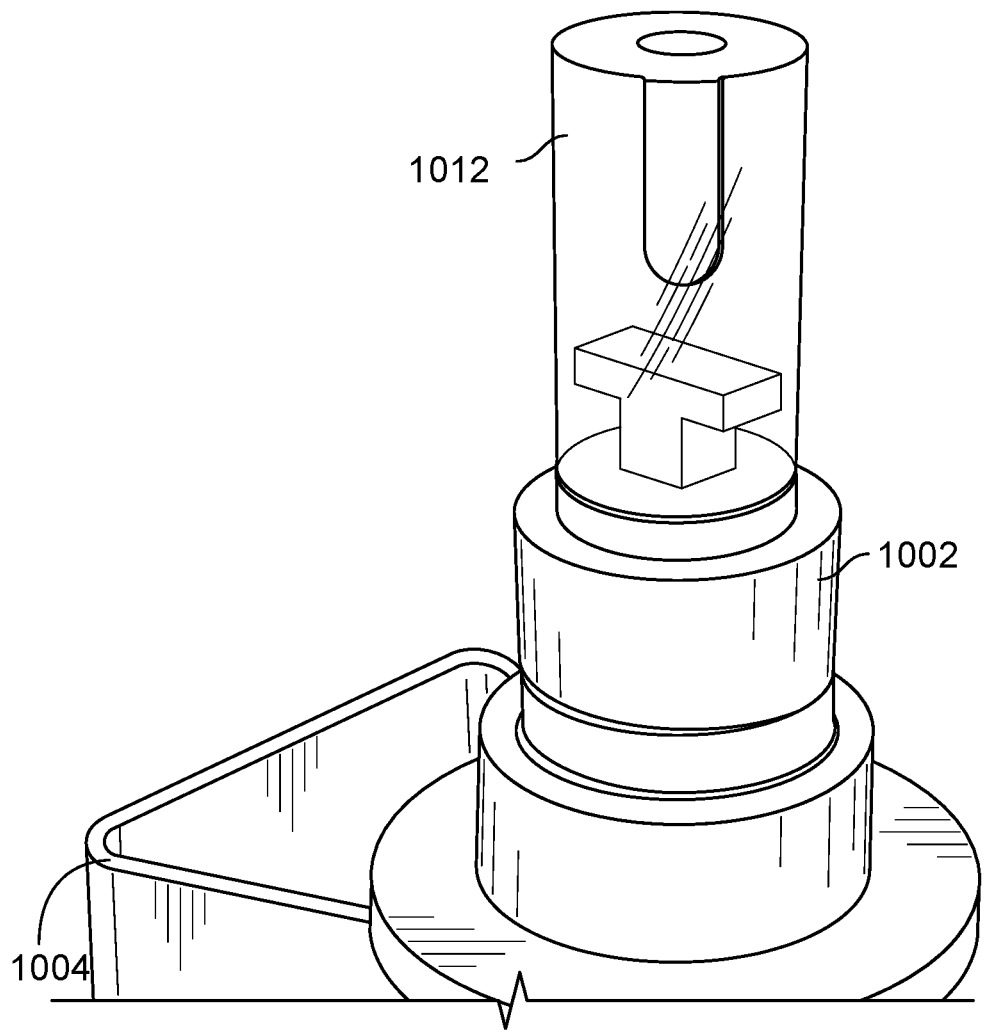

At 912, the shaping molds are removed. For example, the forming mold and the mold cap are removed. The result is a solidified molding material in the shape of a cylinder with an open top cylindrical interior well. FIG. 10F illustrates an example of the resulting solidified molding material 1012.

Figure 10G:
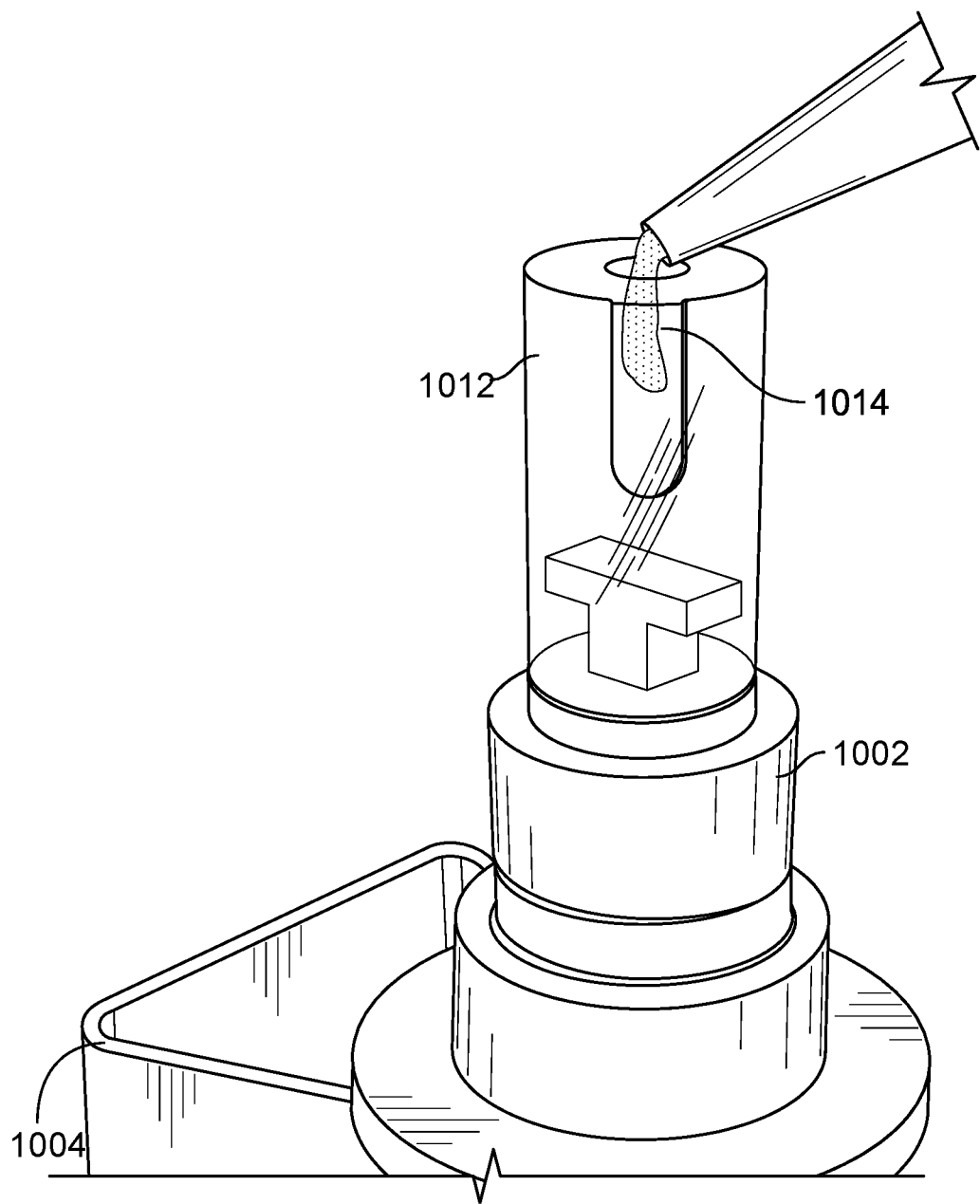

At 914, a specimen is inserted in the well of the solidified molding material along with an appropriate medium. For example, a biological specimen and solution (e.g., solution that is natural, transparent, saline, etc.) are placed inside the well. An example of the placement of specimen 1014 suspended in the medium is illustrated in FIG. 10G.

Figure 10H:
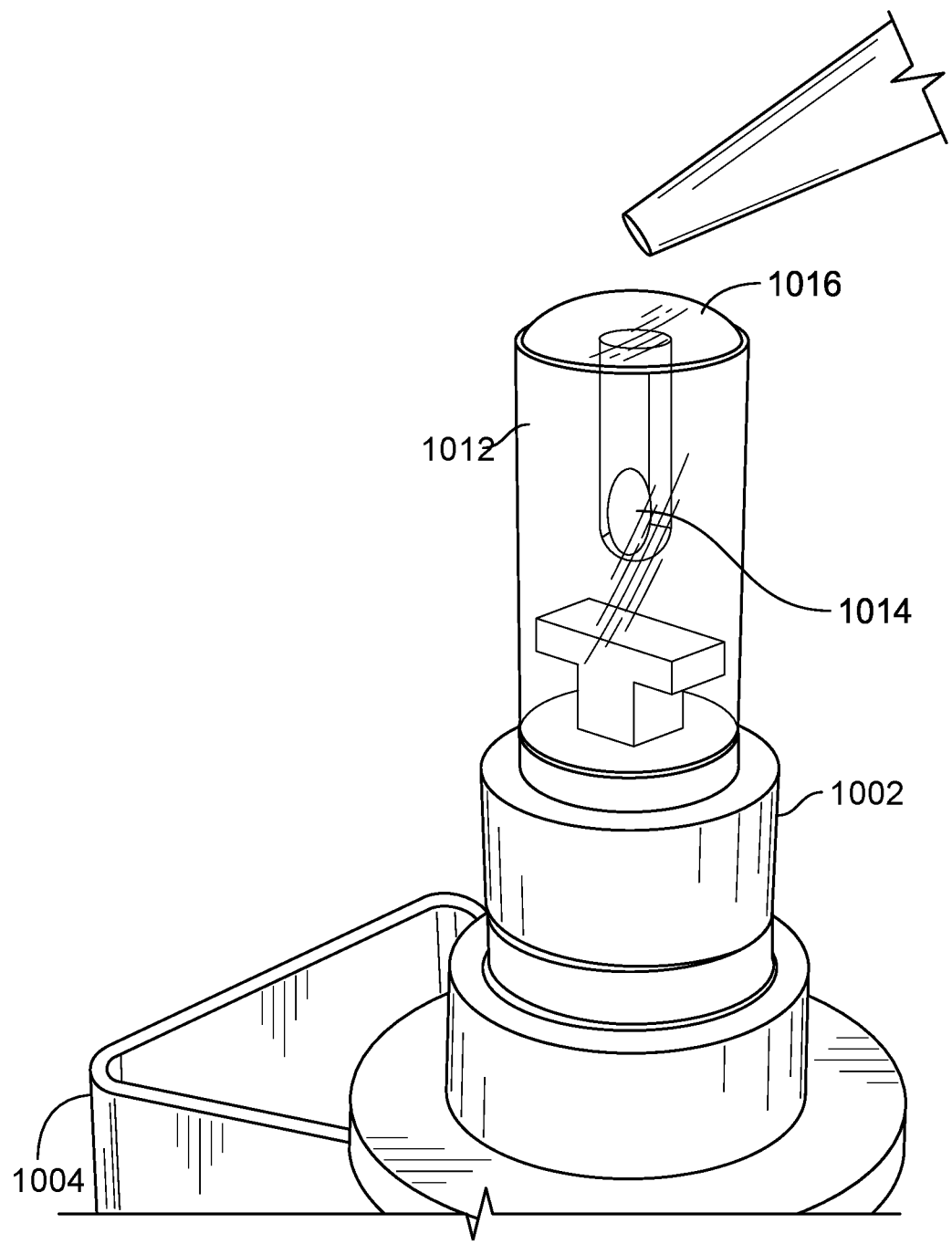

At 916, the well with the specimen is sealed. For example, the well is sealed with a substantially transparent material. The sealing material may be initially in a liquid or gel consistency that solidifies after a period of time. Examples of the sealing material include agar, agarose, gellan gum, or another gelling agent. For example, a low melting agarose gel drop (e.g., 1%) is used as the sealing material and is placed on the opening of the well with the specimen. An example of sealing the well with sealing material 1016 is illustrated in FIG. 10H.

At 918, the sealing material is allowed to settle and solidify. For example, the agarose drop is allowed to settle and solidify for approximately one minute. By sealing the well, a specimen contained in the well does not escape the well even if the well is tipped on its side.

At 920, the specimen holder with the specimen is laid on its side horizontally and placed in a chamber assembly for SPIM imaging. For example, the specimen holder and the T-spike rotary mounting is placed in the chamber of chamber assembly 700 of FIG. 7. The chamber assembly may then be placed on the translation stage of the microscope for SPIM imaging.

A system for illuminating a microscopy specimen includes multiple illumination sources, each of which is configured to emit light that travels along an illumination path to illuminate the microscopy specimen placed on an optical detection path of an optical microscope. The system also includes optical elements in the illumination path of each of the plurality of illumination sources. The optical elements are configured to at least in part transform the light from each of the plurality of the illumination sources into a light sheet illuminating the microscopy specimen and to vary a position of a waist of the light sheet from each of the plurality of illumination sources that illuminates the microscopy specimen. The optical elements for each of the plurality of illumination sources are configured to spatially align the waist of the light sheet from each of the plurality of illumination sources to illuminate a substantially coincident portion of the microscopy specimen. In some embodiments, the optical elements are also temporally synchronized to dynamically vary the position of the waist of the light sheet from each illumination source to sweep the substantially coincident portion of the microscopy specimen. The system may also include a detector in the optical detection path. The detector includes a rolling shutter. In such an embodiment, the optical elements for each illumination source and the rolling shutter may be temporally synchronized. Thus, image data incident on the rolling shutter and captured by the detector are synchronized with the substantially coincident portion of the microscopy specimen illuminated by the illumination sources. In some embodiments, the rolling shutter provides a dual light sheet mode. In such embodiments, the optical elements for each illumination source and the rolling shutter are temporally synchronized such that the image data includes first data from light incident on a first portion of the rolling shutter and second data from light incident on a second portion of the rolling shutter physically separated from the first portion of the rolling shutter.

In some embodiments, a method for aligning a microscope is disclosed. The method includes spatially aligning a light sheet provided by each of a plurality of illumination sources. Each illumination source is configured to emit a light that travels along an illumination path to illuminate the microscopy specimen placed on an optical detection path of an optical microscope. The spatially aligning includes spatially synchronizing optical elements in the illumination path of each of the illumination sources such that a waist of the light sheet from each of the illumination sources illuminates a substantially coincident portion of the microscopy specimen. The optical elements are configured to at least in part transform the light from each of the plurality of the illumination sources into the light sheet and to vary a position of the waist of the light sheet. The method also includes adjusting a focal plane of a detection objective to coincide with at least a portion of the substantially coincident portion of the microscopy specimen.

In some embodiments, the system and method described herein provide three-dimensional selective plane illumination microscopy (SPIM), or light-sheet fluorescence microscopy (LSFM), with a laser light sheet that may have increased uniformity and propagation depth along the entire field of view within a medium-sized (for example 5-10 mm by 2-5 mm) to large-sized samples. In some embodiments, the system may maintain the thinnest waist of the laser light sheet inside the object. A uniform and highest possible, for a given set of illumination objectives, axial imaging resolution may be provided throughout the image of the corresponding slice in the object, and if desired, for increasing the speed of imaging a given slice within the object.

In some embodiments, an illumination optical system is connected to an optical focusing unit that modulates the position of focus of the laser light sheet in a selected plane within the object. The digital camera may operate in the light sheet rolling shutter mode and be synchronized with the optical focusing unit. The position of focus stays conjugated to a set of rows of pixels in a digital camera attached to a detection optical system of the light sheet microscope. During one image acquisition, the entire field of view of the detection objective of the detection optical system may be covered. This may address non-uniformities in the width of the laser light sheet.

Using the method and system described, improved uniformity of illumination of the entire biological samples may be achieved. Light from the illumination sources may be spatially aligned and temporally synchronized to illuminate a common location in space and time (the substantially coincident portion of the optical specimen). Further, axial resolution and optical sectioning offered by light sheet microscopy when it is applied to imaging of mid- to large-sized translucent, opaque and/or densely-labeled specimen may be improved. In addition, the speed of imaging may be improved using the rolling shutter modes, such as dual light sheet readout mode (simultaneous light sheet mode in two halves of the digital camera). The method and system described herein may allow for better image quality (e.g. in terms of resolution, signal-to-noise ratio) by providing better light penetration into observation objects, and, in some cases, a mechanism to increase the speed of image acquisition. An image acquisition system is described. The image system illuminates the object with a stationary light sheet or virtual sheets of focused laser light with focal distances varying along the direction of propagation of the light sheets to acquire an image of the object. As discussed above, a light sheet may be produced by providing a stationary beam having an extremely elongated (elliptical) cross section and/or by creating a virtual light sheet by rapidly scanning the object with a light beam having a circular cross section. As such, the stationary light sheet and/or virtual light sheet are included in the term light sheet unless otherwise indicated. In some embodiments, the foci of the laser light sheets are controlled in sync so as to achieve better image quality.

Figure 11:
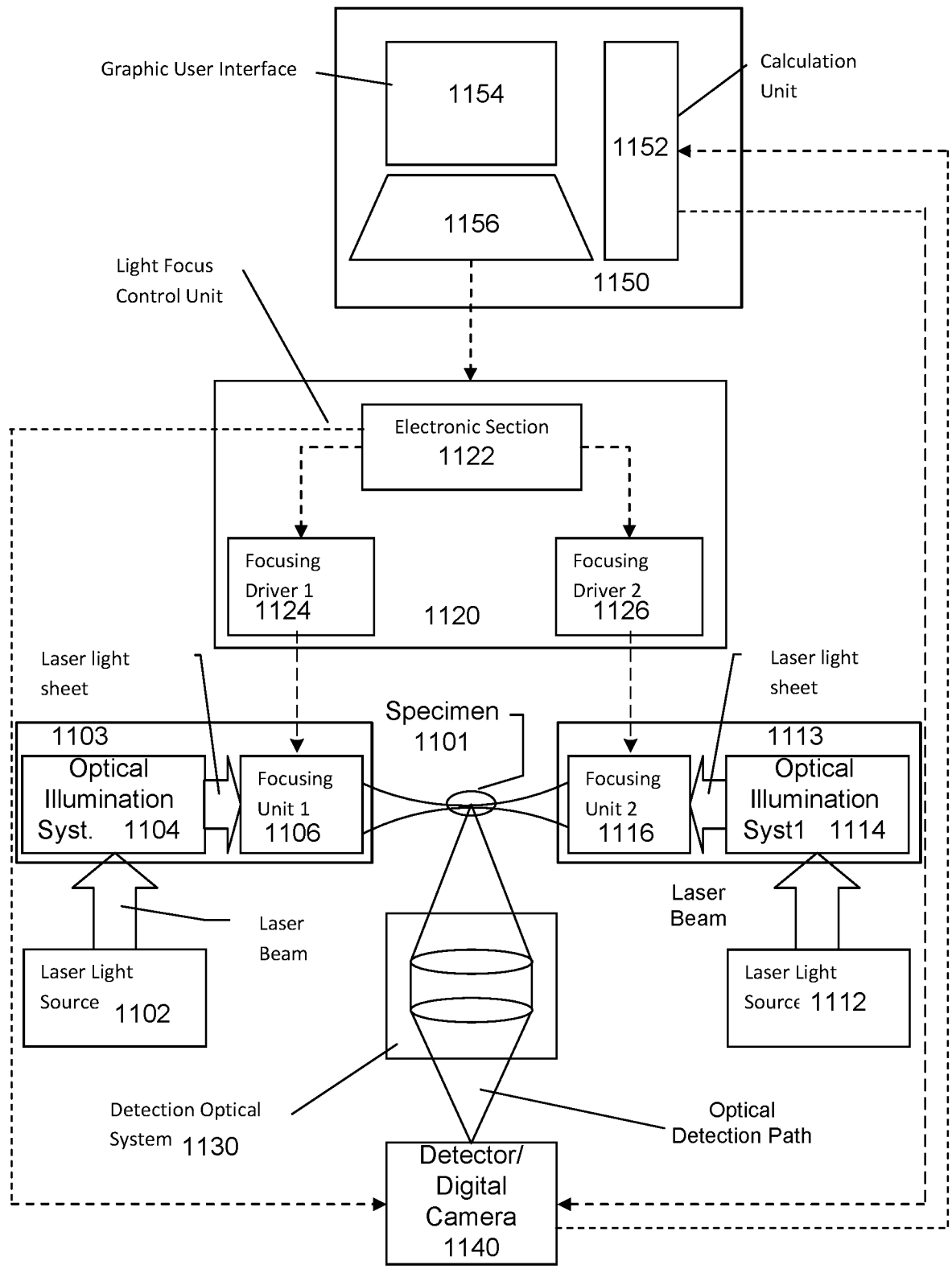
FIG. 11 is a diagram illustrating an embodiment of components of a system for performing SPIM that is capable of spatially aligning and temporally synchronizing light sheets and a rolling shutter detector.

FIG. 11 is a diagram illustrating an embodiment of components of system 1100 for performing SPIM and that is capable of spatially aligning and temporally synchronizing light sheets and a rolling shutter detector. Thus, system 1100 may be a three-dimensional selective plane illumination microscope, or light-sheet fluorescence microscope. In some embodiments, system may include components analogous to components 102, 104 and 106 that are added to an optical microscope to allow the optical microscope to be used for SPIM. For example, components 1102, 1112, 1103, 1113 and 1120, may be added to an optical microscope, which allow the optical microscope to be used for SPIM. System 100 includes illumination (light) sources 1102 and 1112, optical elements 1103 and 1113, light focus control unit 1120, detection optical system 1130, detector 1140 which may be a digital camera, and computer system 1150 used to investigate a microscopy specimen, or object, 1101. Further, although only two illumination sources 1102 and 1112 are shown and discussed, another number of illumination sources may be used. As used herein, an illumination unit may include optical elements in combination with the illumination source (e.g. illumination source 1102 combined with optical elements 1103 or illumination source 1112 combined with optical elements 1113). As used herein, "optical" includes not only purely optical (e.g. lenses) but also derived from optical such as "opto-mechanical" (for example mirrors attached to piezoelectric motors, oscillating galvanic mirrors, other combinations including electromechanical components), "opto-acoustical" (for example as tunable acoustic gradient index of refraction lens, or TAG lenses, in which the focus variation is achieved via fast refractive index change of a fluid within the mechanically sealed closing by the fluid's excitation with acoustic waves), "electro-wetting" (for example, Varioptic lenses, where the change in focus is achieved by modifying the interface of two liquids when a voltage is applied), other electrically tunable lenses, other mechanisms for varying focus (e.g. varying chemical composition, varying environmental conditions such as temperature, atmospheric pressure, etc.), other components which guide, direct or change the path of light, and/or combinations thereof. Thus, mechanical motion of a light source and/or optical component may be included in "optical". For example, a mechanism for performing mechanical motion of a stage (e.g. precision adjustment screws for manual adjustment or motors) including optical components (purely optical components such as a lens and or other optical components), which results in the redirection of light is included in "optical".

Illumination sources 1102 and 1112 are both used to illuminate microscopy specimen 1101. Although FIG. 11 depicts system 1100 as residing in a single plane, light may travel in three dimensions. For example, the illumination path (laser beam and laser light sheet depicted as arrows and light sheet incident on microscopy sample 1101) may be substantially horizontal, while the detection path, shown as through detection optical system 1130, may be substantially vertical. Each illumination source 1102 and 1112 emits light that travels along an illumination path to illuminate the microscopy specimen 1101, which is in both the illumination path and the optical detection path for SPIM. In some embodiments, each illumination source 1102 and 1112 is a laser.

Optical elements 1103 and 1113 reside in the illumination path between illumination sources 1102 and 1112, respectively, and microscopy specimen 1101. Optical elements 1103 include optical illumination system 1104 and optical focusing unit 1106. Similarly, optical elements 1113 include optical illumination system 1114 and optical focusing unit 1116. In some embodiments, optical elements 1103 and 1113 transform the illumination beams from sources 1102 and 1112 into light sheets, e.g. either into a thin stationary sheet of laser light or for scan the illumination laser beams across the object (with the direction of scan essentially perpendicular to the direction of the laser beam propagation) so as to create a thin virtual sheet of laser light. Thus, optical elements 1103 and 1113 each include one or more optical components (for example lenses, mechanisms for tuning or moving the lenses, other optical components/mechanisms for guiding/altering the path of light or otherwise changing the characteristics of light). In some embodiments, one such scan sweeps microscopy specimen 1101 in less than the exposure time of detector 1140. Stated differently, optical elements 1103 and 1113 transform the light from the corresponding illumination sources 1102 and 1112 into a light sheet illuminating microscopy specimen 1101. This may be seen in FIG. 11 by the transformation of laser light beams following the illumination path and depicted as arrows into sheets having a waist (thinnest portion) in the region of microscopy specimen 1101.

Optical focusing units 1106 and 1116 receive the stationary or virtual sheets of laser light from the optical illumination system 1104 and 1114, respectively, and focus the laser sheets in a continuous fashion into microscopy specimen 1101. Optical elements 1103 and 1113 can thus vary the position of a waist of the light sheet across the specimen. More specifically, optical elements 1103 and 1113 spatially align light sheets such that the light sheet from each illumination source 1102 and 1112 illuminates a substantially coincident portion of microscopy specimen 1101. Optical elements 1103 and 1113 may also be temporally synchronized to dynamically vary the position of the waist of the light sheet from each of the illumination sources 1102 and 1112 to move the substantially coincident portion of microscopy specimen 1101. Stated differently, the waists of the light sheets from illumination sources 1102 and 1112 move together such that both illuminate the desired portion of microscopy specimen 1101.

Also shown in FIG. 11 is light focus control unit 1120. Light focus control unit 1120 include electronics 1122 and focusing drivers 1124 and 1126. Focusing driver 1124 controls optical focusing unit 1106, while focusing driver 1126 controls optical focusing unit 1116. Focusing drivers 1124 and 1126 are configured to control optical focusing units 1106 and 1116, respectively, to provide the spatially and temporally synchronized light sheets. For example, focusing drivers 1124 and 1126 may control one or more electrically or otherwise tunable lens(es) (not shown in FIG. 11) within each focusing unit 1106. For example, a tunable lens includes an electrically tunable lens, a TAG Lens, a Varioptic Lens, and/or any other lens with a changeable focus that does not require mechanically replacing the installed lens. Focusing drivers 1124 and 1126 may provide current ramps to the optical focusing units 1106 and 1116. Thus, optical focusing units 1106 and 1116 are controlled to modulate the position of the focus of a thin stationary or virtual sheet of laser light.

Electronic section 1122 provides an image acquisition trigger command in sync with a focusing trigger command. The image acquisition trigger command is provided to detector 1140. In response to the trigger command, detector 1140 starts image acquisition. Focusing trigger command is provided to focusing drivers 1124 and 1126. In response, focusing drivers 1124 and 1126 issue voltage ramps to optical focusing units 1106 and 1116, respectively. In some embodiments, the voltage ramps are within the range [−5 V, 5 V]. Light focus control unit 1120 may thus synchronize optical focusing units 1106 and 1116 with the detector's image acquisition circuits.

Detector 1140 and detection optical system 1130 reside in the optical detection path from microscopy specimen 1101. Detection optical system 1130 guides light from microscopy specimen 1101 to detector 1140. Detector 1140 may be a digital camera and may include a rolling shutter. In other embodiments, detector 1140 may not include a rolling shutter. For example, detectors only having traditional "global shutter" (i.e. when the pixels are exposed all at once) only may also be used as detector 1140. Detectors 1140 having a global shutter and a rolling shutter may also be used. In some embodiments, the variation in focus by optical focusing units 1106 and 1116 can be sufficiently fast that the covering the entire field of view of detector 1140 within the detector's exposure time can be possible. For a detector 1140 having the global shutter only, the temporal synchronization triggers the focus variation at the time of exposure of the pixels. Thus, the global shutter may be considered a special case of the rolling shutter when the number of activated columns of pixels in the camera coincides with the total number of columns of pixels of the camera. As such, unless otherwise specified, a "rolling shutter" can include a rolling shutter that exposes and reads a portion of the pixels for detector 1140 at a time or a rolling shutter that exposes and reads all pixels of detector 1140. In some embodiments, detector 1140 includes a light receiving section (not explicitly shown in FIG. 11) having pixel rows configured to capture the light guided by detection optical system 1130. In addition, detector 1140 may include an imaging control section (not explicitly shown in FIG. 11) configured to control signal readout of the light receiving section. For example, imaging control section may signal readout by rolling readout of each of the pixel rows in the light receiving section. Thus, a rolling shutter may be included in detector 1140.

As discussed above, optical elements 1103 and 1113 for each illumination source 1102 and 1112 are also temporally synchronized with the rolling shutter of digital camera 1140. Thus, image data incident on the rolling shutter and captured by detector 1140 are synchronized with the substantially coincident portion of the microscopy specimen illuminated by light sources 1102 and 1112. In some embodiments, the rolling shutter includes a dual light sheet mode. In the dual light sheet mode, data are read, or captured, from two separate sections of the rolling shutter. In dual light sheet mode embodiments, optical elements 1103 and 1113 and the rolling shutter are temporally synchronized such that the image data includes first data from light incident on a first portion of the rolling shutter and second data from light incident on a second portion of the rolling shutter physically separated from the first portion of the rolling shutter. For example, the rolling readout described above reads two sets of rows of pixels. The sets of rows are physically separated. In some embodiments, each half of the dual light sheet mode of the rolling shutter reads half of the rows of pixels. In some embodiments, an image generated from the image data is provided from a single pass of the substantially coincident portion across at least part of the microscopy specimen.

Also shown is computer system 1150. Computer system 1150 includes a calculation unit or module 1150, a graphic user interface 1154 and an interface to light focus control unit 1120. Calculation unit 1152 performs various functions related to synchronization and/or alignment of illumination units. For example, calculation unit 1152 calculates the interval of signal readout between adjacent pixel rows based on the depth of focus of focused stationary or virtual laser sheets for synchronization of the focus position of the focused stationary or virtual laser sheets and the position of a plurality of pixel rows in the imaging camera. Although depicted as a separate module, calculation unit 1152 may simply be implemented in software. Graphic user interface 1154 allows a user to enter data pertaining to the light source, optical system, parameters of the optical focusing unit(s), and a set of focusing parameters (ranges of the focus ramps) and perform other operations related so system 1100. The imaging control section of detector 1140 controls signal readout of each pixel row, based on the interval of the signal readout calculated by the calculation unit 1152. Electronic section 1122 controls focusing ramps of the optical focusing units 1106 and 1116 in sync with the readout of pixel rows of detector 1140. As described above, optical includes purely optical and derived from optical and physical motion that results in a change in the illumination path. Consequently, the optical focusing units can be implemented as devices producing changes in the position of focus of the light beam and/or change the cross section of the light beam, such as electrically tunable lenses, piezoelectric, other stepper mirrors/motors and/or other components.

Figure 12:
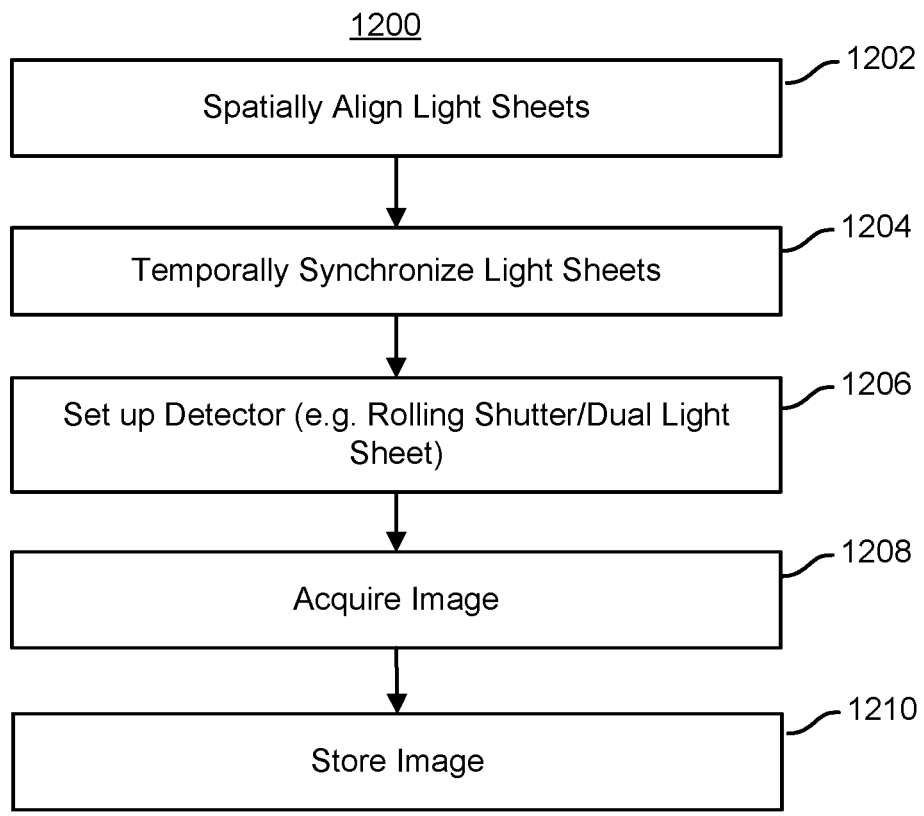
FIG. 12 is a flowchart illustrating an embodiment of a process for capturing image data from a microscopy specimen.

FIG. 12 is a flowchart illustrating an embodiment of process 1200 for capturing image data from a microscopy specimen. Method 1200 is described in the context of system 1100. However, in other embodiments, another SPIM system may be used.

Light sheets generated from illumination sources 1102 and 1112 are spatially aligned, at 1202. Thus, optical elements 1103 and 1113 may be adjusted such that the light sheet from each illumination source 1102 and 1112 illuminates the same region of space. The focal plane of a detection objective for detection optical system 1130 may also be adjusted to coincide with this region in space. At 1202, the focal plane and the light sheets may also be aligned with a portion of microscopy specimen 1101. Thus, a coincident portion of microscopy specimen 1101 will be illuminated by at least part of each of the light sheets from both sources 1102 and 1112. Spatial alignment is discussed further below.

The light sheets are also temporally synchronized at 1204. At 1204, it is ensured that the waists of the light sheets generated from illumination sources 1102 and 1112 move together such that the coincident portion can be moved through microscopy specimen 1101. Stated differently, optical elements 1103 and 1113 may be configured to be capable of dynamically varying the position of the waist of the light sheet to sweep the substantially coincident portion of the microscopy specimen. Further, temporal synchronization may include synchronizing the light sheets with the rolling shutter of detector 1140. This may include setting parameters for calculation unit 1152 and focusing drivers 1124 and 1126. Method 1200 may terminate after 1204, for example if image capture is completed at another time.

Detector 1140 is set up at 1206. For example, the exposure time and readout may be set. Operation of detector 1140 is also configured. For example, detector 1140 may be set to rolling shutter and/or dual light sheet mode. Detector 1140 may also be set to accept an external trigger from computer system 1150 for image capture.

An image is acquired, at 1208. Thus, the commands to trigger image acquisition may be sent to light focus control unit 1120 and to detector 1140. In addition, the command to provide a voltage or current ramp may be sent to focusing drivers 1124 and 1126 at 1208. Further, the current or voltage ramp may be provided to optical focusing units 1106 and 1116 at 1208. Thus, detector 1140, light focusing control unit 1120, detection optical system 1130, optical elements 1103 and 1113 as well as illumination sources 1102 and 1112 cooperate to capture an image of microscopy specimen 1101. The image may then be stored in computer system 1150, at 1210.

Using method 1200 and system 1100, improved uniformity of illumination of the entire microscopy samples may be achieved. Light from illumination sources 1102 and 1112 may be spatially aligned and temporally synchronized to illuminate a common location in space and time (the substantially coincident portion of the optical specimen). Further, axial resolution and optical sectioning offered by light sheet microscopy when it is applied to imaging of mid- to large-sized translucent, opaque and/or densely-labeled specimen may be improved. In addition, the speed of imaging may be improved using the rolling shutter modes, such as dual light sheet readout mode of detector 1140. The method and system described herein may allow for better image quality (e.g. in terms of resolution, signal-to-noise ratio) by providing better light penetration into observation objects, and, in some cases, a mechanism to increase the speed of image acquisition. An image acquisition system is described. The image system illuminates the object with stationary or virtual sheets of focused laser light with focal distances varying along the direction of propagation of the light sheets to acquire an image of the object. In some embodiments, the foci of the laser light sheets are controlled in sync so as to achieve better image quality.

Figure 13:
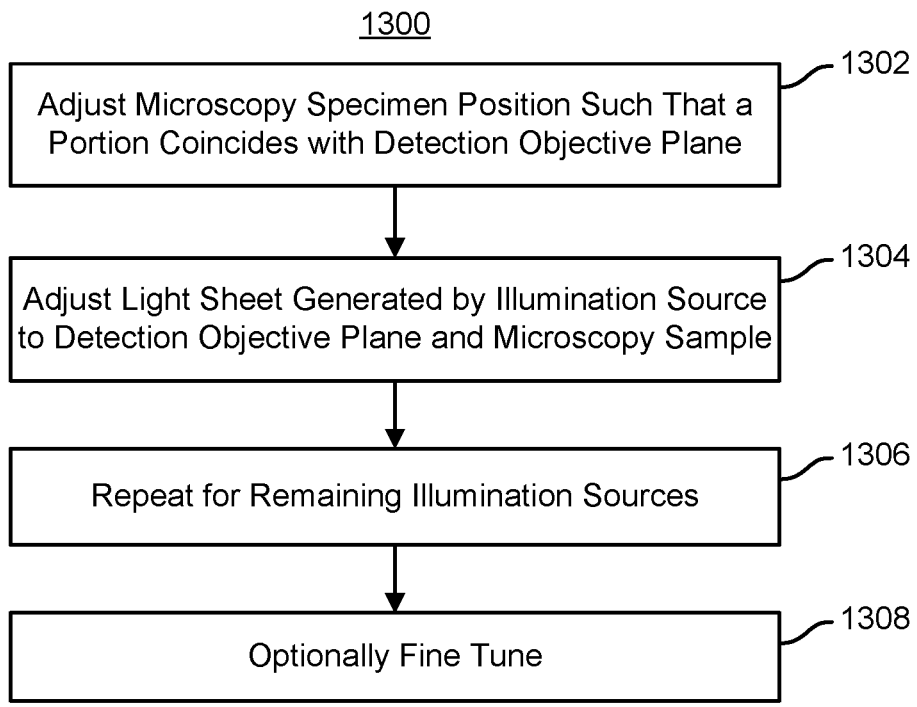
FIG. 13 is a flowchart illustrating an embodiment of a process for aligning light sheets.

FIG. 13 is a flowchart illustrating an embodiment of process 1300 for aligning light sheets. Method 1300 is described in the context of system 1100. The alignment of laser light sheets produced by separate illumination units may be carried out both in manual and automatic manner. Alignment may utilize either specially designed calibration targets or real samples, both in air (or any kind of solution) or directly in the solution in which the imaging is planned to take place. For simplicity, manual alignment is described. Automatic or semiautomatic alignment can be designed by e.g. replacing any or each of the manually executed steps below by their automatic implementations. For example, motors may be used instead of manually turning screws and knobs, image processing algorithms may be utilized instead of a user subjectively assessing the quality of images, and/or other automatic/computer controlled mechanisms may be employed. Separate light sheets emitted by optical focusing units 1106 and 116 are desired to be aligned in order to produce thinnest light sheet and provide the finest axial resolution. Method 1300 may be performed when objective turret has been changed or when illumination objectives are changed. It is also applicable if fine adjustment fails at providing satisfying images, in particular when immersion medium is very different from previous experiment, or if conditions of imaging change in time. For example, microcopy specimen may change its location or/and form inside the chamber, or the sample's and/or medium's refractive indices may change as a result of impregnation of the sample with the medium. FIGS. 14A-14H depict an embodiment of a system for performing SPIM and that is capable of spatially aligning and temporally synchronizing light sheets and a rolling shutter detector during alignment. Components of the system depicted are analogous to those in system 1100. Method 1300 is described in the context of FIGS. 14A-14H.

In general, method 1300 may be considered as a procedure or ensuring that the light sheet plane generated by both illumination sources and corresponding optical elements, the focal plane of the detection objective, and a desired plane of a fluorescent microscopy specimen under observation in the sample chamber substantially coincide. Method 1300 is described in the context iterating through alignment for each illumination source. However, in another embodiment, some or all of the alignment for different illumination sources may be performed in parallel.

Figure 14A:
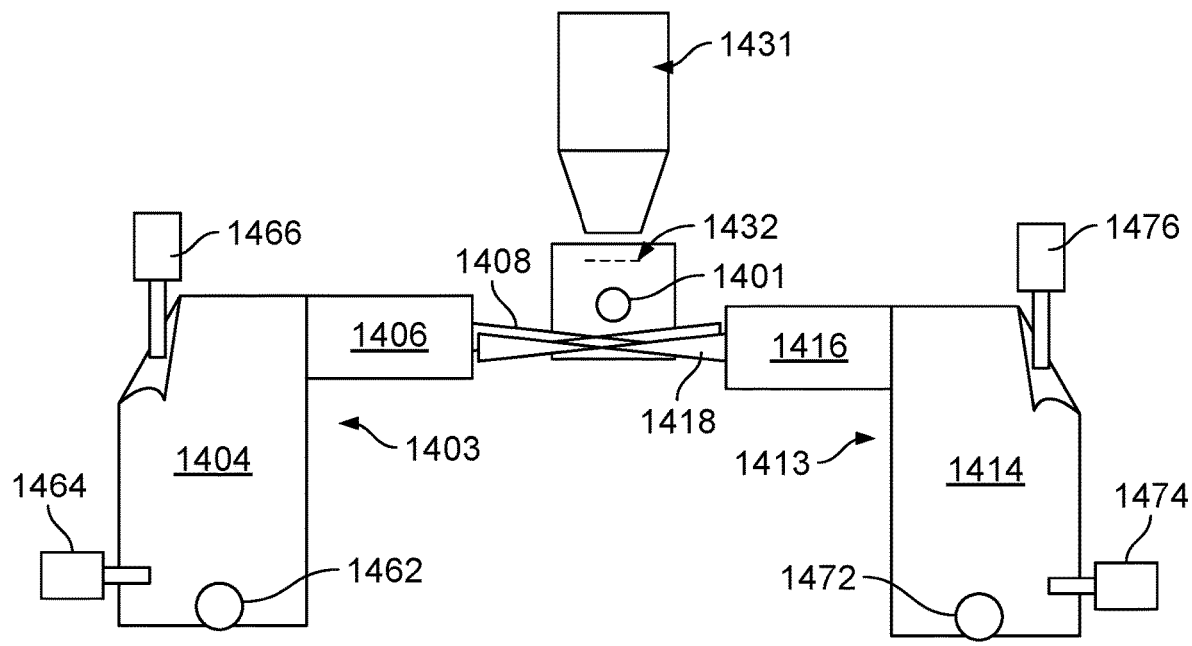
FIGS. 14A-14H depict an embodiment of a system for performing SPIM and that is capable of spatially aligning and temporally synchronizing light sheets and a rolling shutter detector during alignment.

Before the alignment of method 1300, system is in an arbitrary position. This is shown in FIG. 14A. FIG. 14A includes illumination sources (not shown), optical elements 1403 and 1413 including optical illumination systems 14014 and 1414 and optical focusing units 1406 and 1416, detection objective 1431 of detection optical system corresponding to optical elements 1103 having optical illumination systems 1104 and 1114 and optical focusing units 1106 and 1116, detection objective (not labeled) of detection optical system 1130 in FIG. 11. Also shown is focal plane 1432 of detection objective 1431 and microscopy sample 1401, which may be a sample or calibration target. In addition, x adjustments 1464 and 174, y adjustments 1462 and 1472, and z adjustments 1466 and 1476 of optical elements 1403 and 1413, respectively, are depicted. For explanatory purposes, also shown are light sheet 1408 from optical focusing unit 1406 and light sheet 1418 from optical focusing unit 1416.

Figure 14B:
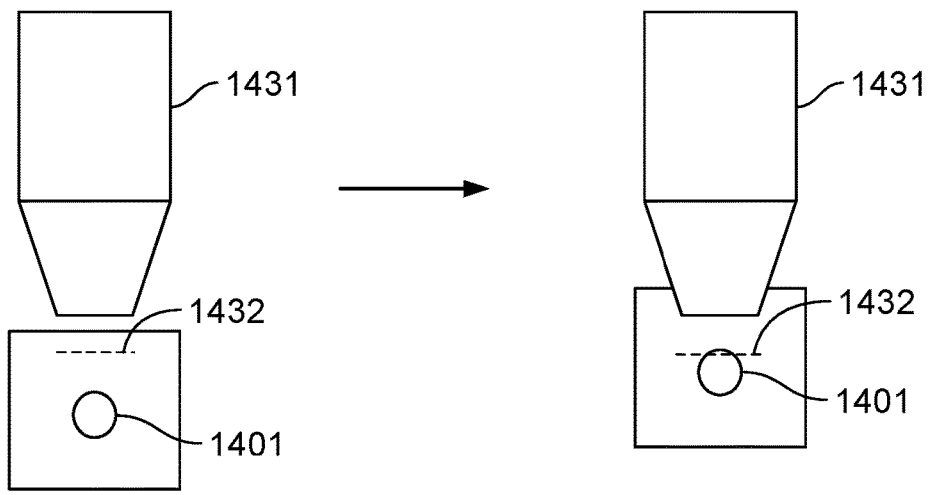

At 1302, position of microscopy specimen 1401 is adjusted to reside in focal plane 1432 of detection objective 1431. In some embodiments, this is performed by switching off the laser light from illumination sources analogous to illumination sources 1102 and 1112. Transmitted light for the microscope may then be turned on. The microscopy specimen 1401 is moved to focal plane 1432 of the detection objective. For example, manual or motorized XYZ adjustments on a mechanical stage support may be adjusted. The image is then observed with eyepieces (not shown) or using the live image captured by a detector such as detector 1140. Such a captured image may be displayed via a graphic user interface such as graphic user interface 1154. In some embodiments, it may be desirable to set focal plane 1432 on the upper part of the microscopy specimen 1401. FIG. 14B indicates the transition of microscopy specimen 1401 from outside of focal plane 1432 of detection objection 1431 to intersecting focal plane 1432 after 1302 is performed.

At 1304, the light sheet generated by an illumination source is aligned with the focal plane of the detection objective and the microscopy sample. As used herein, aligned includes substantially aligned. For example, individual planes need not coincide exactly in order to be considered aligned. In some embodiments, alignment may be achieved as follows. Transmitted illumination for the system may be switched off and one illumination source switched on. For ease of explanation, it is assumed that illumination source for optical elements 1403 is switched on. The illumination may initially be at low power, and then increased until microscopy specimen 1401 is visible/detected. The illumination plane corresponding to optical elements 1403 may then be brought close to or at (i.e. aligned with) focal plane 1432 by a vertical (z) adjustment.

Figure 14C:
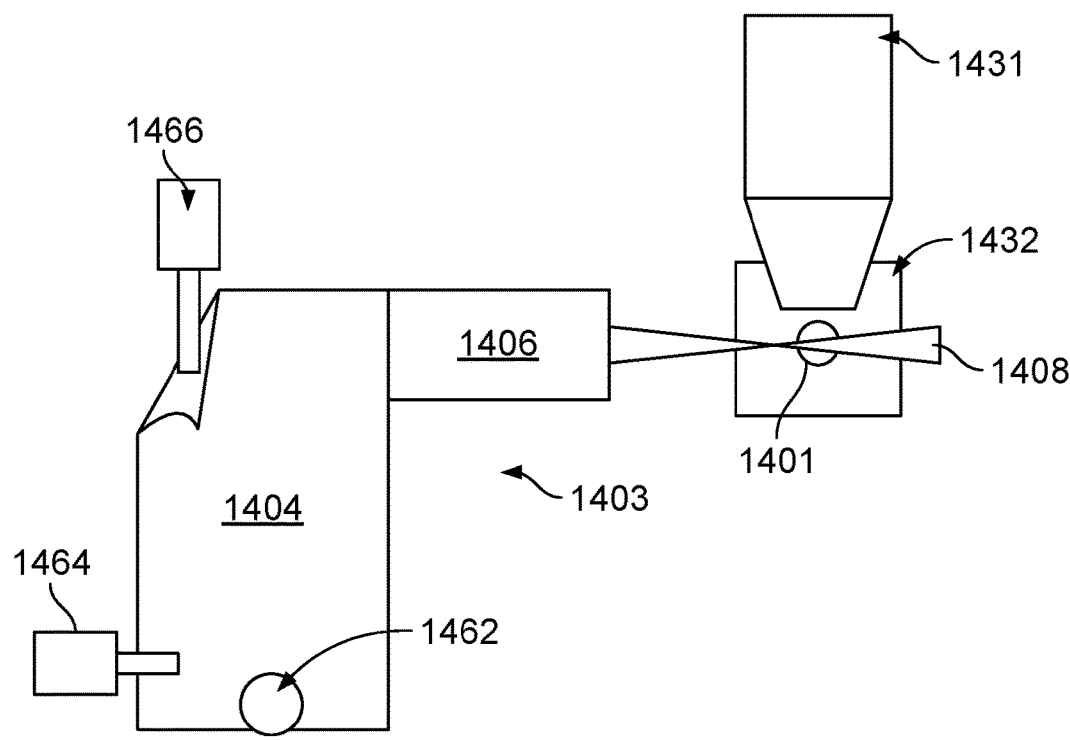

For example, Z adjustment screw 1466 may be turned until the planes are aligned. Fluorescent signal may now be detected with a detector analogous to detector 1140, such as a digital camera. Illumination source power, image exposure time and shift LUT may be adjusted if desired. The Z position of the illumination arm until a focused fluorescent image of the sample is observed. FIG. 14C depicts one portion of the system after the vertical alignment of 1304 is performed. Thus, light sheet 1408 from optical focusing unit 1406 is aligned with focal plane 1432, but may not be perfectly aligned with microscopy sample 1401.

Figure 14D:
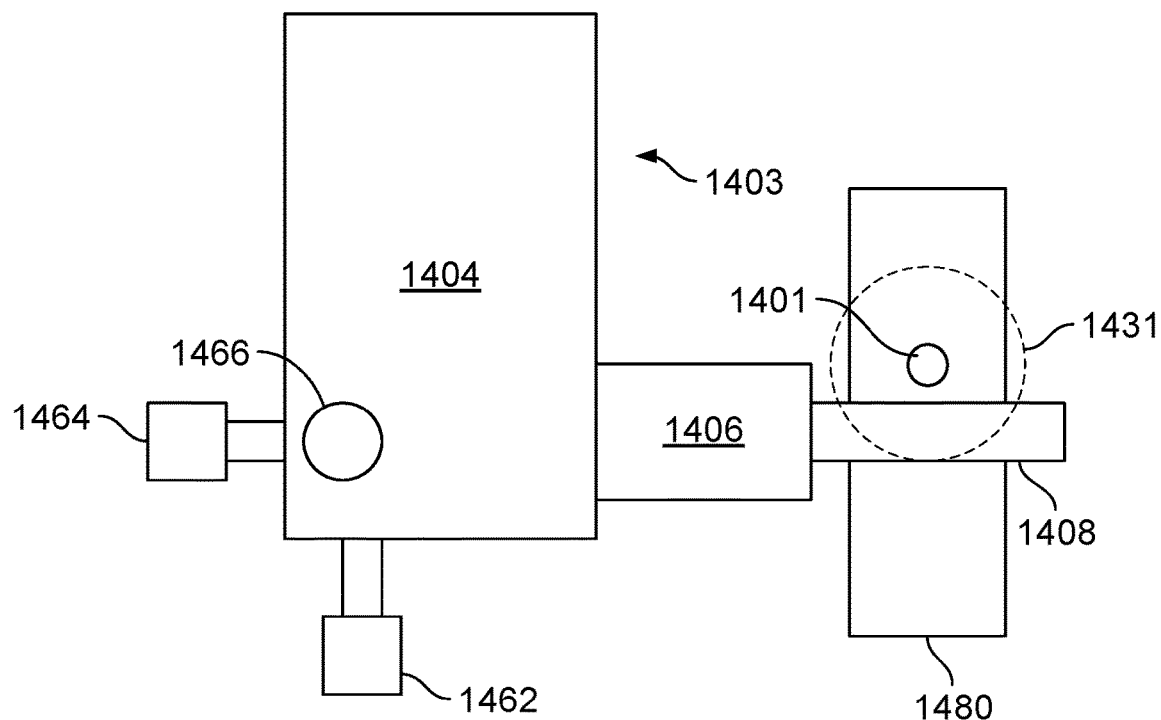
Figure 14E:
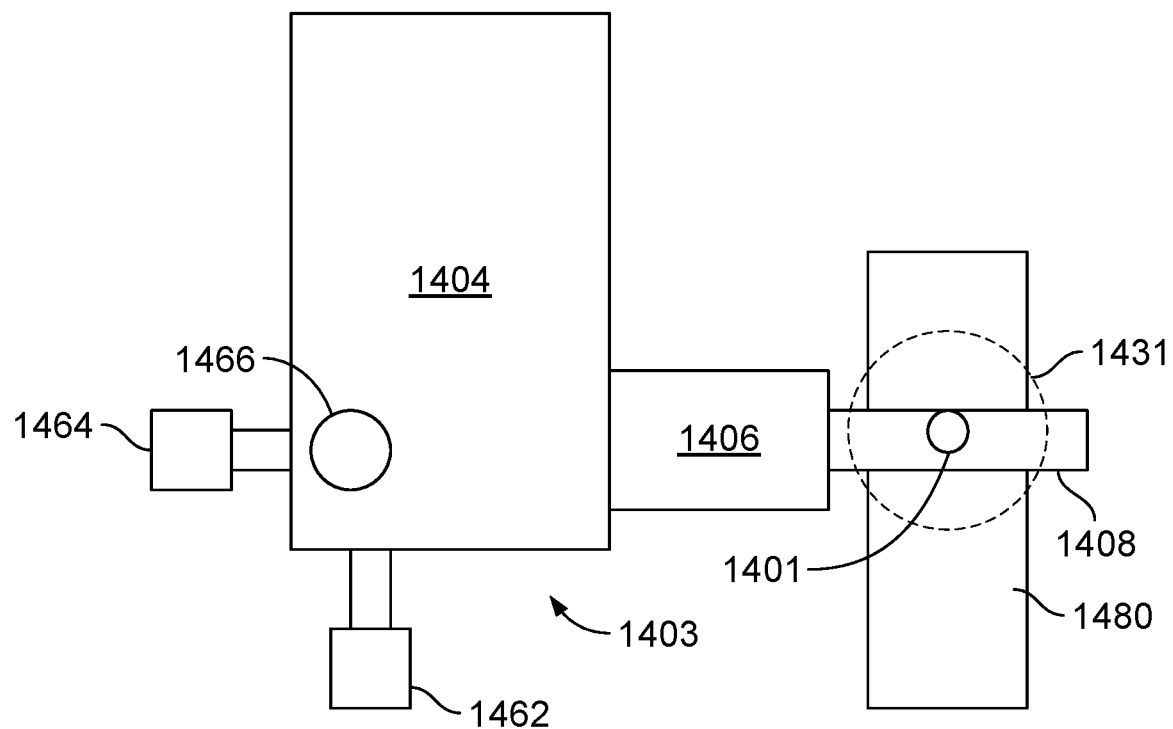
Figure 14F:
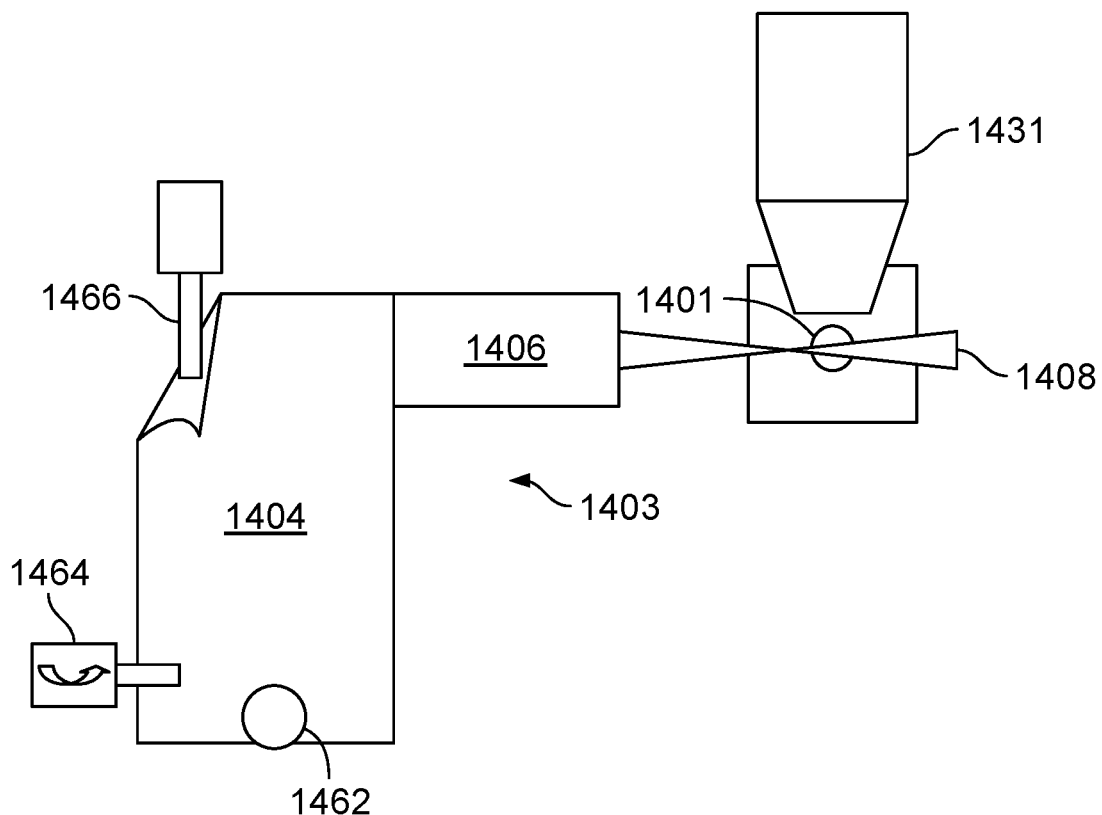
Figure 14G:
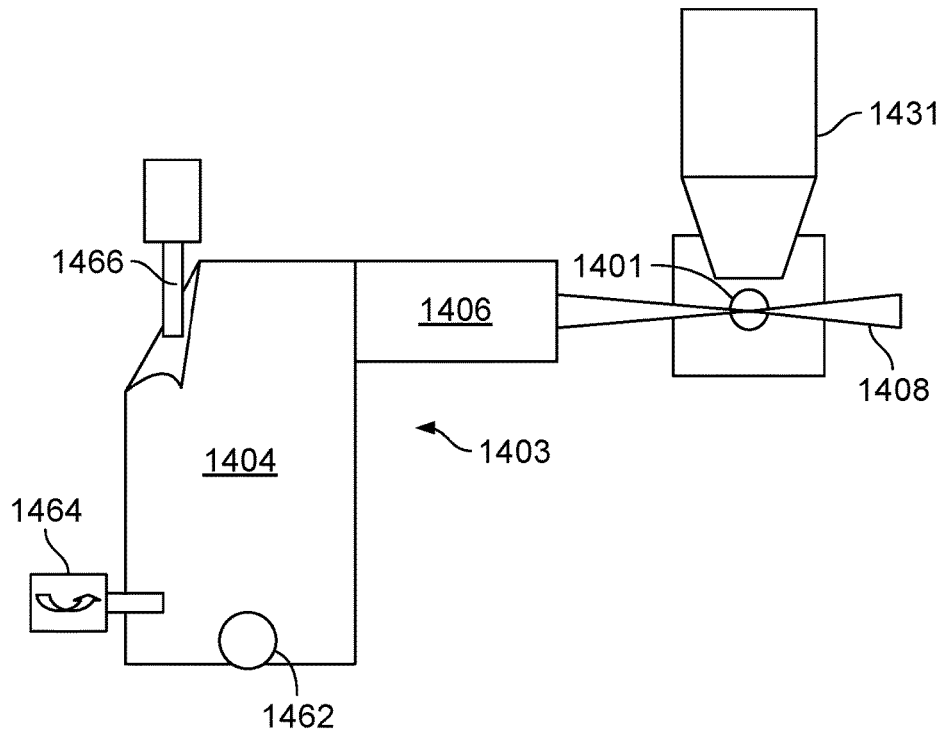
Figure 14H:
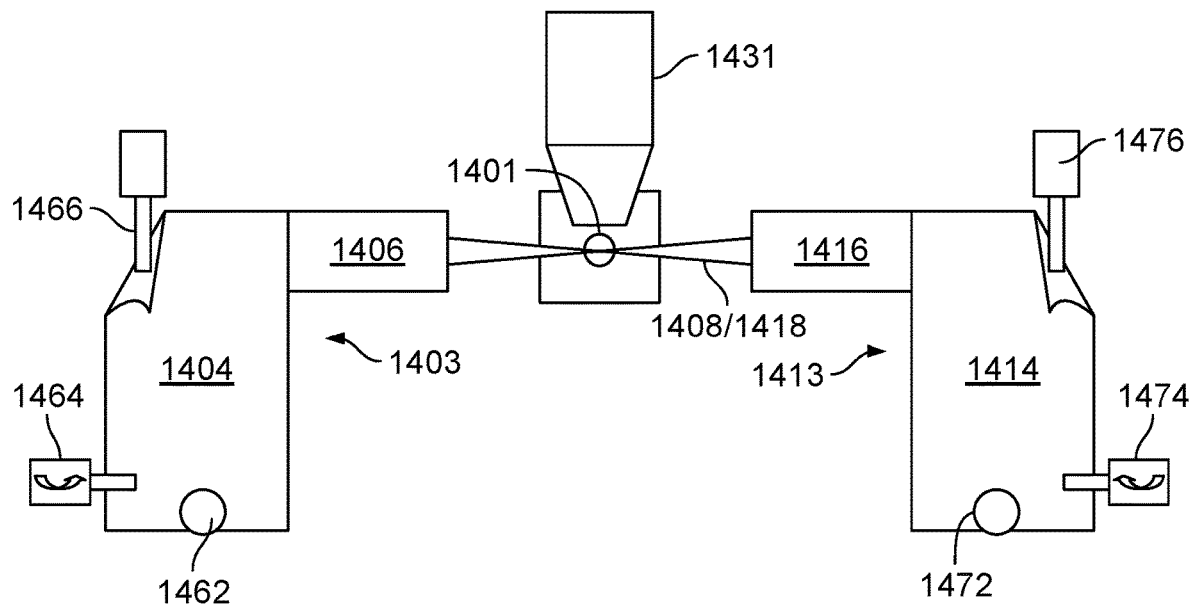

Thus, as part of 1304, the lateral position of light sheet 1408 is adjusted. To do so, X adjustment 1464 and Y adjustment 1462 may be used. The position of light sheet 1408 is adjusted to better intersect microscopy specimen 1401. This is shown in FIG. 14D (before Y adjustment at 1304) and FIG. 14E (after Y adjustment at 1304). Also shown in FIGS. 14D-14E is sample holder 1480. Optical sectioning is desired to be maximized by positioning the minimal thickness region (waist) of light sheet 1408 in the middle of the field of view. In some embodiments, X adjustment precision screw to move the minimal thickness position across the sample. As the optical sectioning is improving, the sharpness increases while out of focus signal decreases. Z adjustment 1466 may be readjusted. The X and Z adjustments may be re-iterate, if desired. The waist may not cover the full field of view. For instance, when using a 10× illumination objective, the focus area is limited to about 200 µm. This is approximately ⅕th of the field of view with a 10× detection objective. Thus the waist region appears as a vertical band of 200 µm sharper than the edges of the image. Adjusting the X position results in moving this band left and right in the image. The position of the waist of light sheet 1408 is adjusted to better intersect microscopy specimen 1401. This is shown in FIG. 14F (before X adjustment at 1304) and FIG. 14G (after X adjustment at 1304). Thus, light sheet 1408 has been aligned with focal plane 1408 of detection objective 1431 and with a desired portion of microscopy sample 1401.

If only one illumination source is used, then method 1300 may terminate. However, multiple illumination sources are desired to be utilized. Thus, the alignment performed at 1304 is repeated for remaining illumination sources, at 1306. In some embodiments 1302 and 1304 may both be repeated for remaining illumination sources at 1306. Thus, light sheet 1418 for optical elements 1413 may also be aligned at 1306. Fine tuning may be performed if desired or needed, at 1308. For example, fine tuning in the Z direction may be performed for successively for both sets of optical elements 1403 and 1413 until images resulting from illumination incident on the sample from both illumination units are super-imposed. Further, microscopy specimen 1401 may be moved vertically to ensure that the desired optical sectioning is achieved.

Figure 15:
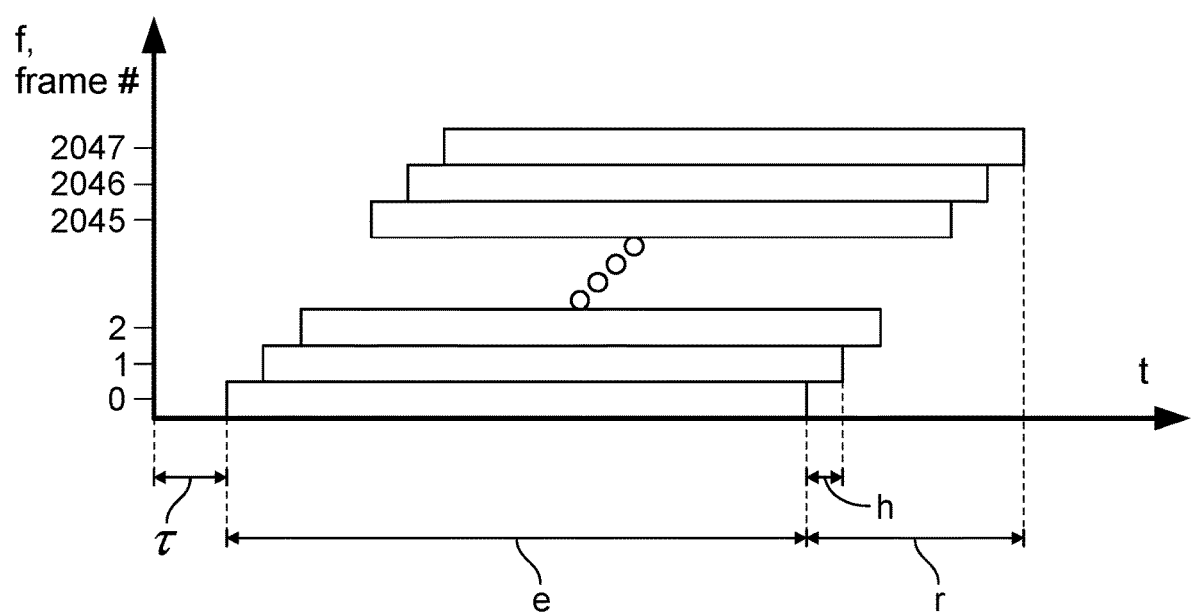
FIG. 15 depicts an exemplary embodiment of pixel rows in a detector using a rolling shutter.

As discussed above with respect to FIGS. 11 and 12, images are desired to be captured for microscopy specimens being investigated. To do so, detector 1140 (e.g. a digital camera) may be employed. Referring to FIG. 11, in system 1100, the microscopy specimen 1101 is either subjected to illumination by a thin stationary sheet of laser light, or scanned by the laser beam illumination. Such illuminations having continuously varying foci as provided by the optical focusing units 1106 and 1116. Light generated from the microscopy specimen 1101 (e.g. due to fluorescence) is guided through the detection optical system 1130 to be imaged by digital camera 1140 which can perform the signal readout by the rolling shutter. In such an embodiment, the interval of the signal readout (h, in seconds, [sec]) between adjacent pixel rows and the period of readout (r, in seconds, [sec]) of the entire set of rows in the light receiving section of the digital camera are calculated by the calculation unit based on the number of rows in the light receiving section of the camera (n, an integer). This can be visualized in FIG. 15.

Figure 16:
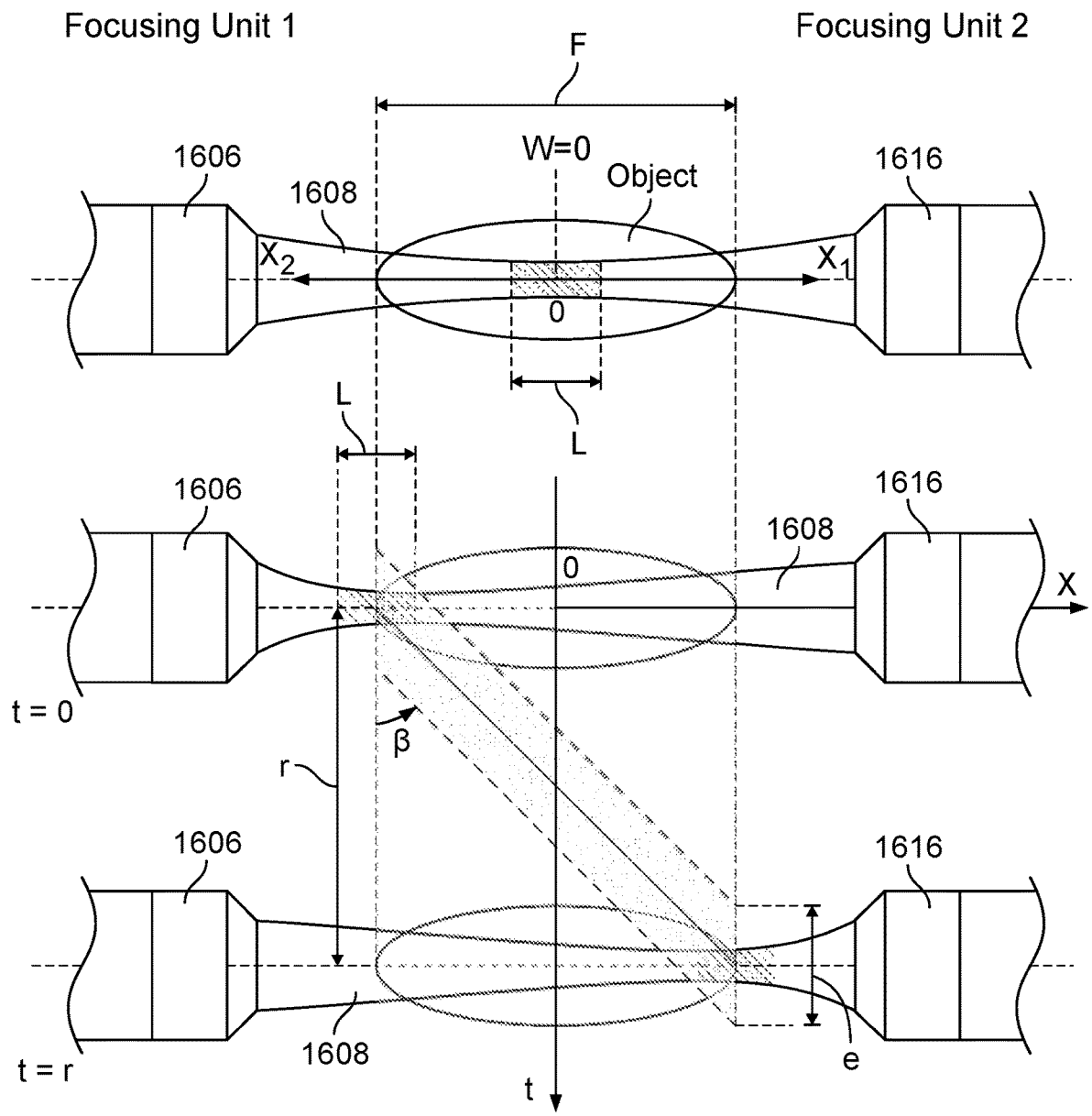
FIG. 16 depicts an embodiment of a portion of the components of a system for performing SPIM that is capable of spatially aligning and temporally synchronizing light sheets and a rolling shutter detector.

For example, FIG. 16 depicts an embodiment of a portion of the components of a system for performing SPIM and that is capable of spatially aligning and temporally synchronizing light sheets and a rolling shutter detector at different times. Shown in FIG. 16 are optical focusing units 1606 and 1616 corresponding to optical focusing units 1106 and 1116, respectively, and light sheet 1608 produced by optical focusing units 1606 and 1616. By equating the waist (L, in micrometers, [µm]) of the light sheet to the height of the exposed set of rows in a digital camera, such as detector 1140, at any given moment of time during readout, the waist can be found as:

$$L = e \cdot \tan\beta = e \cdot \frac{F}{r}$$

The period of readout is expressed in terms of the interval of the signal readout (h, in seconds, [sec]) between adjacent pixel rows and the number n of rows (equal to the number of columns) in the digital camera can be expressed as:

$$r = n \cdot h = e \cdot s = e \cdot \frac{F}{L}$$

Figure 17:
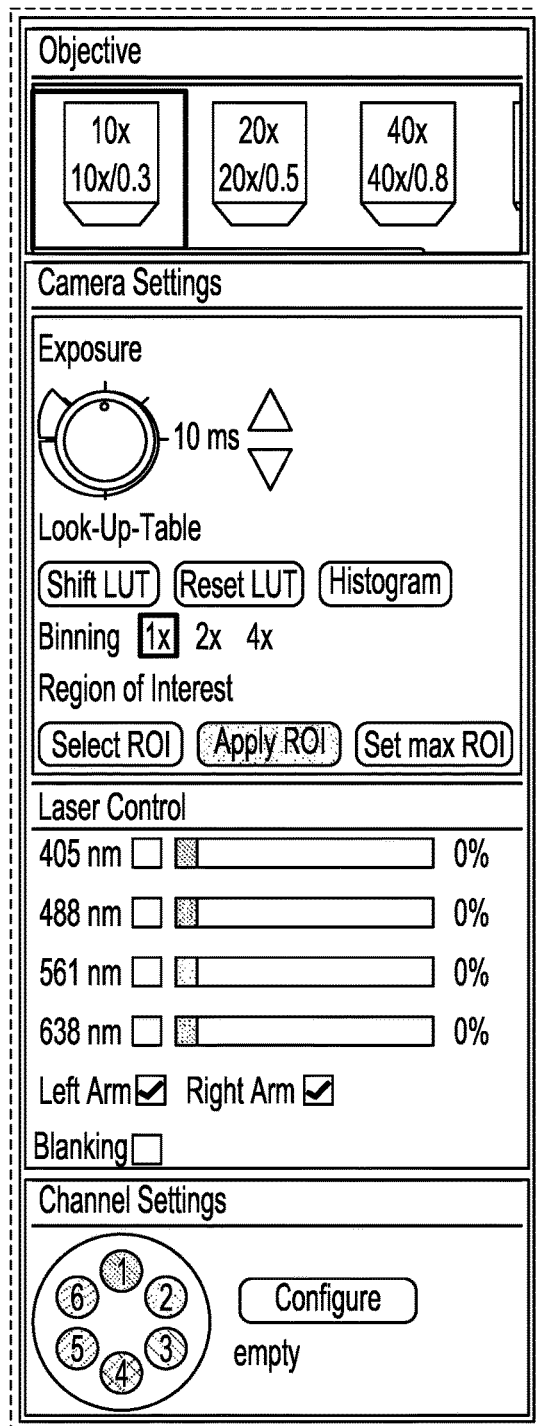
FIG. 17 depicts an exemplary embodiment of a graphic user interface for controlling a system for performing SPIM that is capable of spatially aligning and temporally synchronizing light sheets and a rolling shutter detector.

The parameters may be set by the user of the system through the computer system, such as computer system 150. In some embodiments, this is accomplished via a graphic user interface, such as graphic user interface 1154. For example, FIG. 17 depicts an exemplary embodiment of a graphic user interface 1700 for controlling a system for performing SPIM that is capable of spatially aligning and temporally synchronizing light sheets and a rolling shutter detector. Left arm and right arm controls correspond to optical elements 1103/1403 and 1116/1413 and/or optical focusing units 1606 and 1616. In some embodiments, laser light range may be selected and modified, one or both illumination sources (left arm and right arm in FIG. 17) may be turned on or both may be switched off (e.g. via blanking tick box).

Referring back to FIG. 16, the exposure period and sampling of the field of view are parameters that may be set. The exposure period is e, in seconds, [sec]. The sampling of the field of view (s>0, in positive numbers) is equal to the field of view (F, in micrometers, [µm]) of the digital camera expressed in terms of the waist (L, in micrometers, [µm]). For either of the stationary sheet of laser light or of the scanning laser beams, generated by the illumination optical system:

$$s = \frac{F}{L}$$

The interval of the signal readout and the exposure period of each pixel row are controlled by the imaging control section of the digital camera based on the calculation result.

Figure 18:
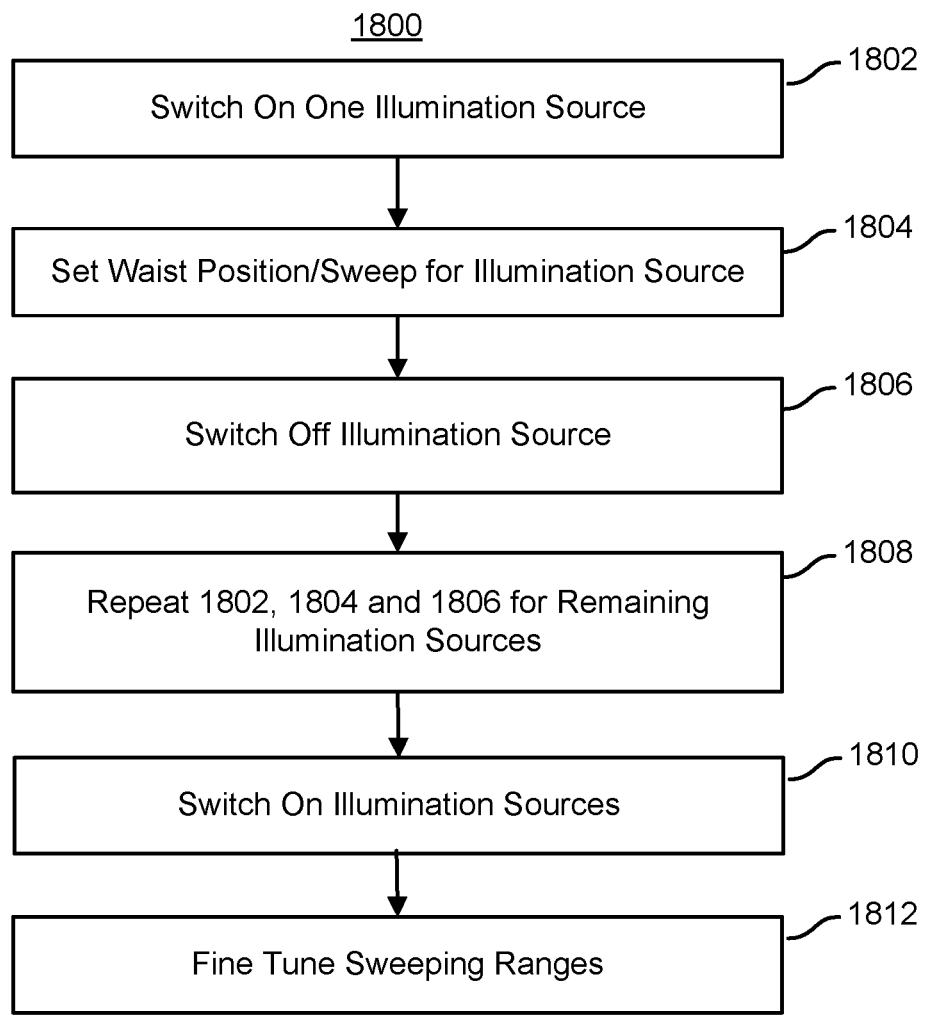
FIG. 18 is a flow chart depicting an exemplary embodiment of a process for temporally synchronizing laser light sheets and a rolling shutter of a detector such as a digital camera.

FIG. 18 depicts an exemplary embodiment of method 1800 for temporally synchronizing laser light sheets and a rolling shutter of a detector such as a digital camera. Method 1800 may be used for manual synchronization and is described in the context of system 1100 depicted in FIG. 11. Detector 1140 is initially set to its default shutter mode. This step may require no user action when operating the graphic user interface software, as the default mode may be activated by default when starting the software.

Illuminate only one illumination source, such as illumination source 1102, at 1802. For example, this may be carried out by the user selecting the tick box for the appropriate arm in graphic user interface 1700.

Figure 19:
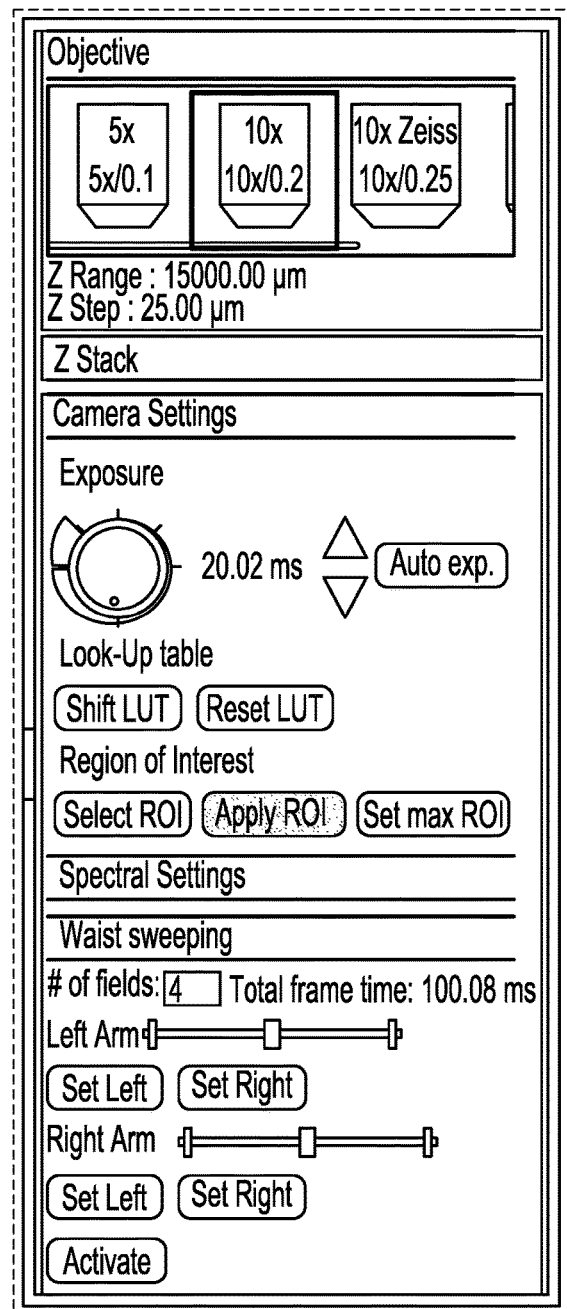
FIG. 19 depicts an exemplary embodiment of a graphic user interface for controlling a system for performing SPIM that is capable of spatially aligning and temporally synchronizing light sheets and a rolling shutter detector.

The waist corresponding to the selected illumination source 1102 is positioned, at 1804. This is carried out by placing the waist of the laser illumination beam (e.g. the light sheet) in the middle of the field of view of detector 1140. This may be accomplished by moving the entire illumination unit by means of precision adjustments, such as that shown in FIGS. 14A-14H. The waist of the laser illumination beam for selected illumination source 1102 is then moved to an edge (e.g. the leftmost edge) of the field of view of detector 1140. This may be accomplished using the slider for the appropriate arm shown in graphic user interface 1900 depicted in FIG. 19. The waist of the laser illumination beam for selected illumination source 1102 is set at the chosen edge while focus sweeping is activated. This may be accomplished via graphic user interface 1154, for example by clicking "Set Left" button on graphic user interface 1900. Thus, the edges of the sweeping range for the light sheet for selected illumination source 1102 are set. The illumination source is then switched off, at 1806.

Light sheets for remaining illumination sources, such as illumination source 1112, are also individually synchronized by repeating 1802, 1804 and 1806, at 1808. All illumination sources, such as both sources 1102 and 1112 are turned on and the sweep of the waist activated for all sources 1102 and 1112, at 1810. The sweeping range is fine tuned for each illumination source 1102 and 1102 by carefully adjusting the edges the sweeping range, at 1812. For example, the thinner sliders of the selected illumination unit's focus sweeping control of graphic user interface 1900 may be used to adjust the edges of the range to obtain the best image quality. Thus, sweeping of light sheets from illumination sources 1102 and 1112 may be synchronized. Both the focus sweeping and the rolling shutter can be aborted and/or reactivated. For example, clicking on "Deactivate" in the focus sweeping control area of the graphic user interface 1900 aborts the sweep and shutter, while clicking on "Activate" causes system 1100 to resume.

Figure 20:
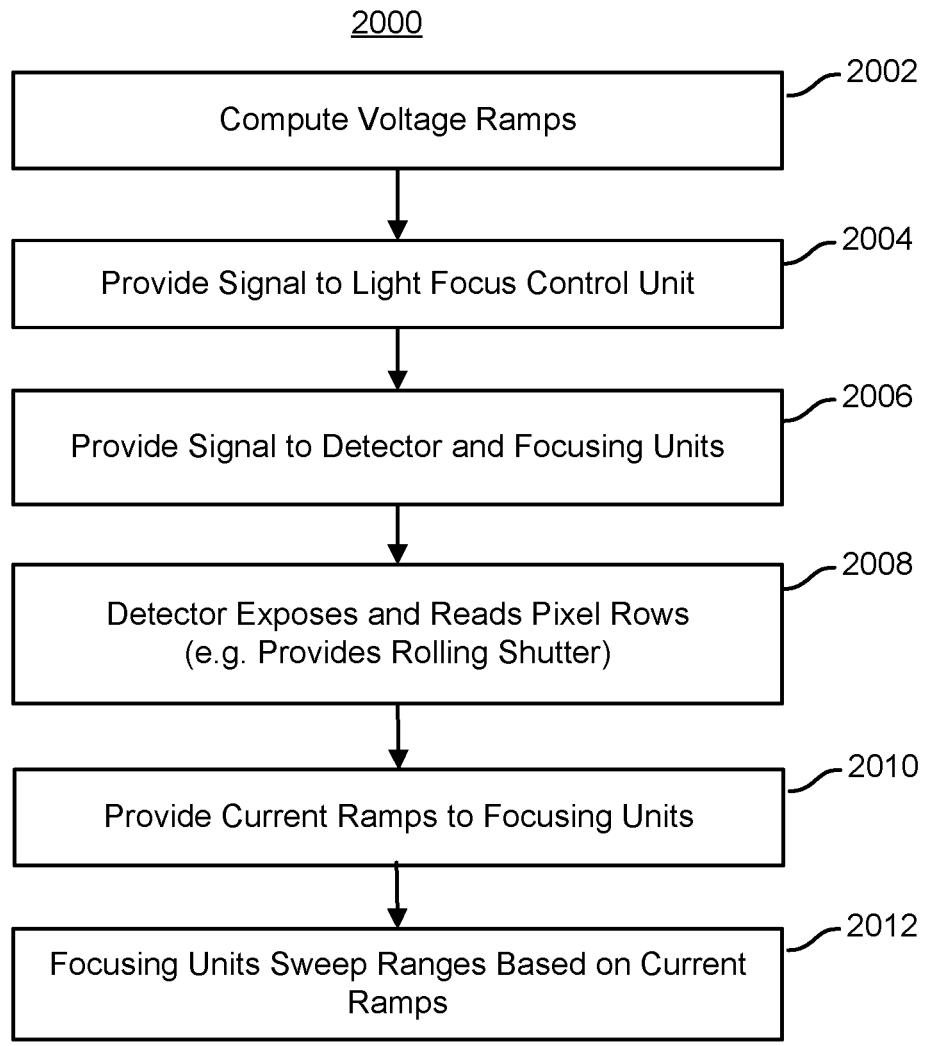
FIG. 20 depicts an exemplary embodiment of method for temporally synchronizing laser light sheets and a rolling shutter of a detector such as a digital camera.

FIG. 20 depicts an exemplary embodiment of method 2000 for temporally synchronizing laser light sheets and a rolling shutter of a detector such as a digital camera. Method 2000 may be used for automatic synchronization and is described in the context of system 1100 depicted in FIG. 11. Automatic synchronization of optical focusing units, such as units 1106 and 1116, is described in the context of electrically tunable lenses. However, automatic synchronization may be performed in an analogous manner for optical focusing units implemented in a different manner, such as embodiments in which changes in the position of focus of the light beam and/or change the cross section of the light beam is achieved, via components such as piezoelectrics, stepper mirrors/motors, and/or other components.

The driving signal voltage ramps (v(t), in Volts, [V]) for optical focusing units 1106 and 1116 may be calculated by the computer system 150 as:

$$v_l(t) = v_l^i + \frac{v_l^f - v_l^i}{r} \cdot t,$$

$$l \in [1, N],$$

where N>1 is the number of optical focusing units (e.g. 1106 and 1116) and the initial (at t=0 seconds) and final (at t=r seconds) voltages of the voltage ramps ($v_l^i, v_l^f$), are set by the user of the system. The initial and final voltages may be set via a graphic user interface such as graphic user interface 1900.

The image acquisition is controlled by computer system 150. In order to acquire an image of a slice at an arbitrary height z in the object, computer system 150 computes the voltage ramps of focus modulation for each of the optical focusing units, at 2002. Computer system 150 sends a command to light focus control unit 120, at 2004. This signal prompts light focus control unit 120 to fire a trigger signal to digital camera 1140 and a set of ramp signals to each of optical focusing units 1106 and 1116 at 2006. Thus, the exposure and readout of the adjacent pixel rows of the digital camera is thus synchronized with the modulation of waists of the stationary light sheets or scanning light beams directed onto the object from several illumination optical systems.

Upon reception of the trigger signal from light focus control unit 120 and after a delay τ set by the computer system 150 (in order to let the adjacent rows of the digital camera be exposed only after the settling period of the optical focusing units), digital camera 1140 exposes adjacent pixel rows during exposure period e, and reads out the adjacent rows during the interval of the signal readout h, at 2008.

The light sheet waist modulation is provided by optical focusing units. Based on the voltage ramps (usually, restricted to the range [-5 V, 5 V]) provided by the computer system 150 to focus control unit 120, focus control unit 120 provides current ramps to optical focusing units 1106 and 1116, at 2010. This may be accomplished using focusing drivers 1124 and 1126 internal to light focus control unit 120. Basically, focusing drivers 1124 and 1126 act as power amplifiers converting the voltage ramps from computer system 150 into current ramps (typically in the range [0, 0.416 mA]), delivered to the optical focusing units.

The optical focusing units transform the current ramps into the ramps of optical power applied to the stationary light sheets or scanning light beams directed onto the object, typically in the range [-2D, +3D], where D stands for Diopters (units of optical power), at 2012. As optical focusing units 1106 and 1116 are built from materials of different physical properties, the rate of variation of the optical power depends both on the current and on its rate of change, which in turn depend on the frequency of image acquisition of the camera, or frame rate (or number of frames per second, fps) of the camera, and on electrical impedance of the optical focusing unit at that frame rate. The frame rate depends on size of the camera's sensitive area, interval of the signal readout r, the exposure period e.

Figure 21:
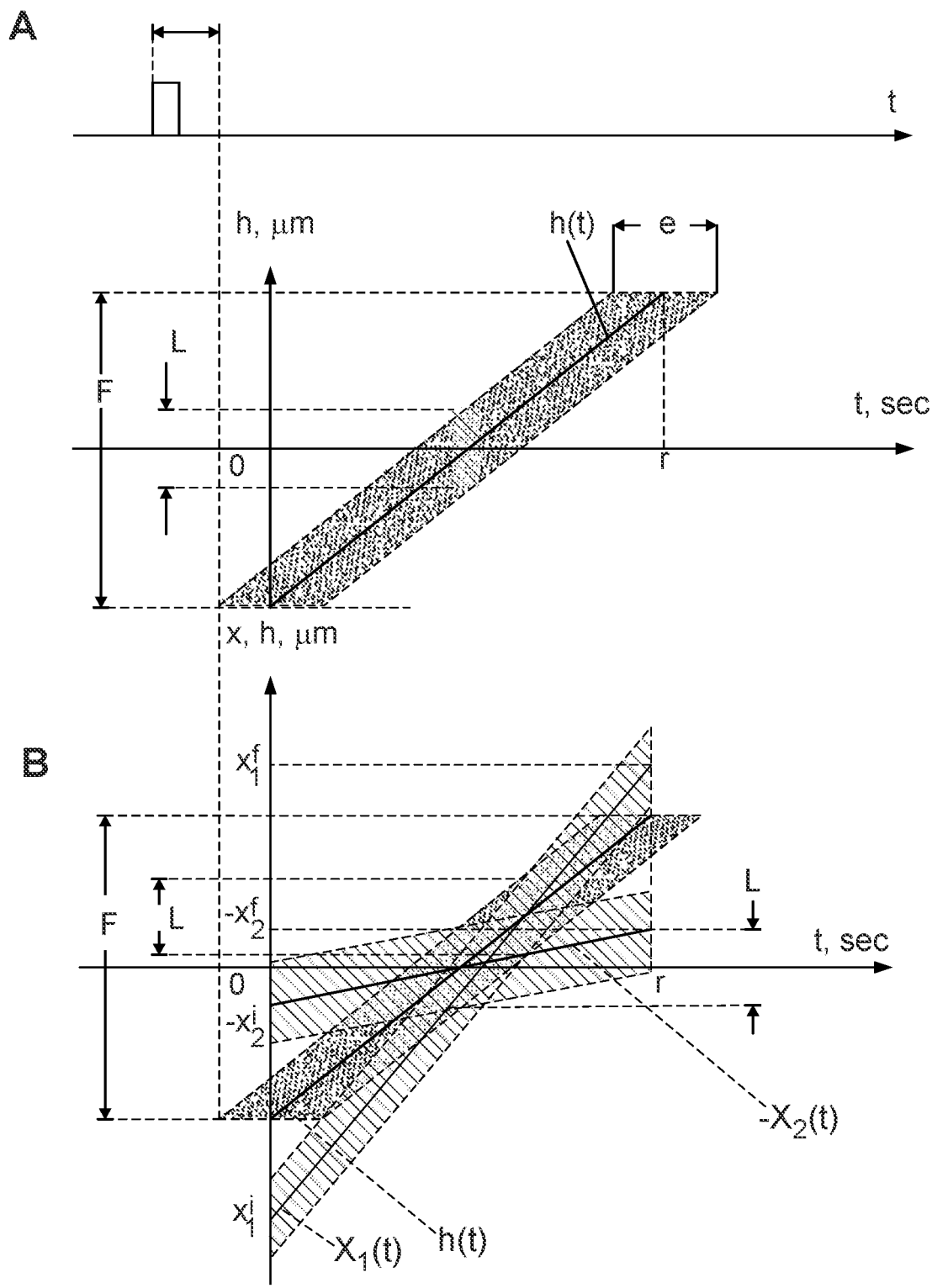
FIG. 21 illustrates an embodiment of the effect a varying optical power has on the waist of a light sheet as a function of time.

This can be seen in FIG. 21, which illustrates the effect a varying optical power has on the position of the waist (x, in micrometers, [μm]) of the stationary light sheets or scanning light beams to change as a function of time:

$$x_l(t) = x_l^i + \frac{x_l^i - x_l^f}{r} \cdot t$$

where the exact values for initial (at t=0 seconds) and final (at t=r seconds) positions of the waist ramps ($w_i^i$, $w_i^f$) depend on the design of the illumination optical systems 1104 and 1114 generating the corresponding stationary light sheets or scanning beams. At the end of exposure and readout of the entire set of rows on the digital camera, the image is released by the camera to the calculation unit.

Although the relation between the voltage ramps provided by computer system 150 and the rates of change of position of waists depends on several parameters such as the frame rate, impedance of the optical focusing unit at that frame rate and design of the illumination optical system, there is an approximately linear relationship between initial and final waist positions and the corresponding values of the initial and end voltages of the voltage ramps. These may be given by:

$$x_l^i = c_l^i \cdot v_l^i,$$

$$x_l^f = c_l^f \cdot v_l^f,$$

where $c_l^i$ and $c_l^f$ are constants for given set of operation (such as fps) or material (such as impedance, optical design) parameters, that can be typically found by calibrating system 1100.

Therefore, a manual method 1800 or automatic procedure 2000 to find a set of the initial and final voltages of the voltage ramps ($v_l^i$, $v_l^f$), such that the location of waists coincides (to within some number of pixel heights) with the position of the center of the exposed set of rows in the light receiving section of the digital camera at any time during image acquisition, can be carried out based on some convenient metric, e.g. on finding the maximum of contrast in the image of the object. The exposure period of digital camera 1140 as well as the initial and final voltages of the voltage ramps can be varied in a by the user through graphic user interface 1154 of computer system 150 in order to find the best contrast based on 2D image or a 3D volume acquisition of slices of a test object (e.g. beads). As an alternative, various widely known optimization techniques (e.g. steepest descent) can be used to automatically find the maximum of contrast in imaging the test object by varying the initial and final voltages $v_l^i$ and $v_l^f$ of the voltage ramps until a set of optimum parameters is found to yield the highest contrast in the image of the test object. Typically, with the exposure and sampling set to constant values based of the desired brightness of the image, the search for initial and final voltages separately for each illumination unit (the other being temporarily switched off) reduces the optimization problem to that of finding two optimum values of initial and final voltages, which is always practically feasible by means of using manual search and/or numeric algorithms, such as the one disclosed in the corresponding chapter below.

Thus, in system 1100, the optical focusing units 1106 and 116 may be arranged so as to provide illumination of microscopy specimen 1101 from different directions. This may aid in ensuring complementary illumination directions and better coverage of microscopy specimen 1101 by illumination than would be impossible if the illumination came from a single direction. Further, waist modulation of light from a single direction ensures uniformity of thickness of the illuminated slice throughout largest possible object slice area. Exposure of a limited set of adjacent pixel rows at a time by using the rolling shutter mechanism allows discarding light emitted by excited fluorescent markers outside of the narrow strip in the object slice thus ensuring higher image contrast. The synchronization of modulation of positions of waists of illumination coming from several directions and of exposure of narrow strip of pixel rows by rolling shutter results in acquiring of an image for which every exposed row may be acquired during the time when waists of several stationary light sheets or of scanning beams are located simultaneously in the same place within the object (the substantially coincident region). This ensures the best image contrast while providing finer and uniform optical sectioning in the widest possible field of view even for thick and/or translucent specimens. As a result, the signal-to-noise ratio in the acquired images improves, in addition to improved capability in rejecting scattered light from parts of the sample situated out of focus of the light sheets or scanning light beams.

Figure 22:
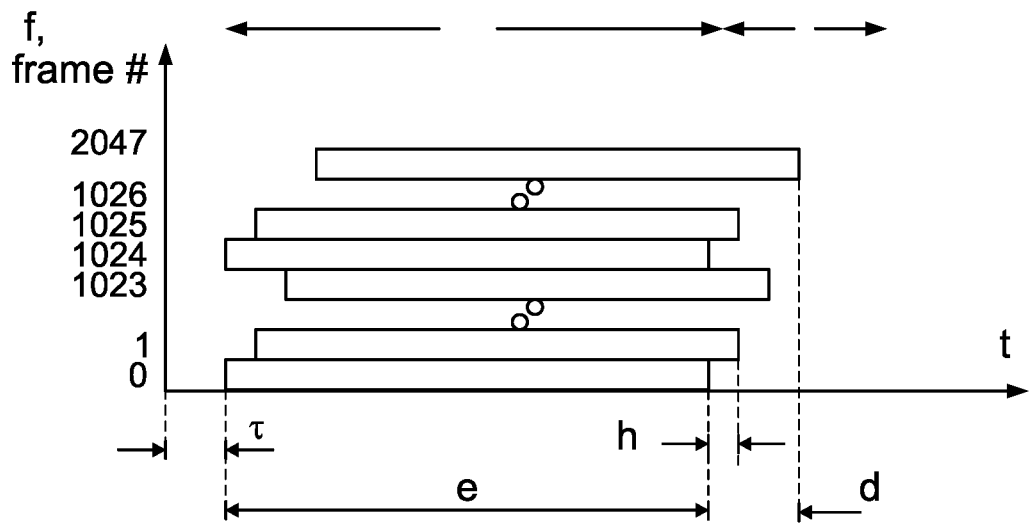
FIG. 22 depicts an exemplary embodiment of pixel rows in a detector using a rolling shutter in a dual light sheet mode.

As discussed above, detector 1140 may also be operated in a dual light sheet mode. In this mode, illumination light output from the light source, and passed through the illumination optical system, the object is either subjected to illumination by a thin stationary sheet of laser light, or scanned by the laser beam illumination, such illuminations having continuously varying foci as provided by the optical focusing units, and the light generated from the object in response thereto is guided through the detection optical system to be imaged by the digital camera which can perform the signal readout by the rolling shutter. In some embodiments, the rolling shutter is operated throughout two halves of the camera simultaneously. Thus, two sets of rows of pixels, in which the sets are physically separated, are exposed and read. In such an embodiment, the interval of the signal readout (h, in seconds, [sec]) between adjacent pixel rows and the period of readout (d, in seconds, [sec]) of the entire set of rows in the light receiving section of the digital camera are calculated by the calculation unit based on the number of rows in the light receiving section of the camera (n, an integer). This may be visualized as shown in FIG. 22.

Figure 23:
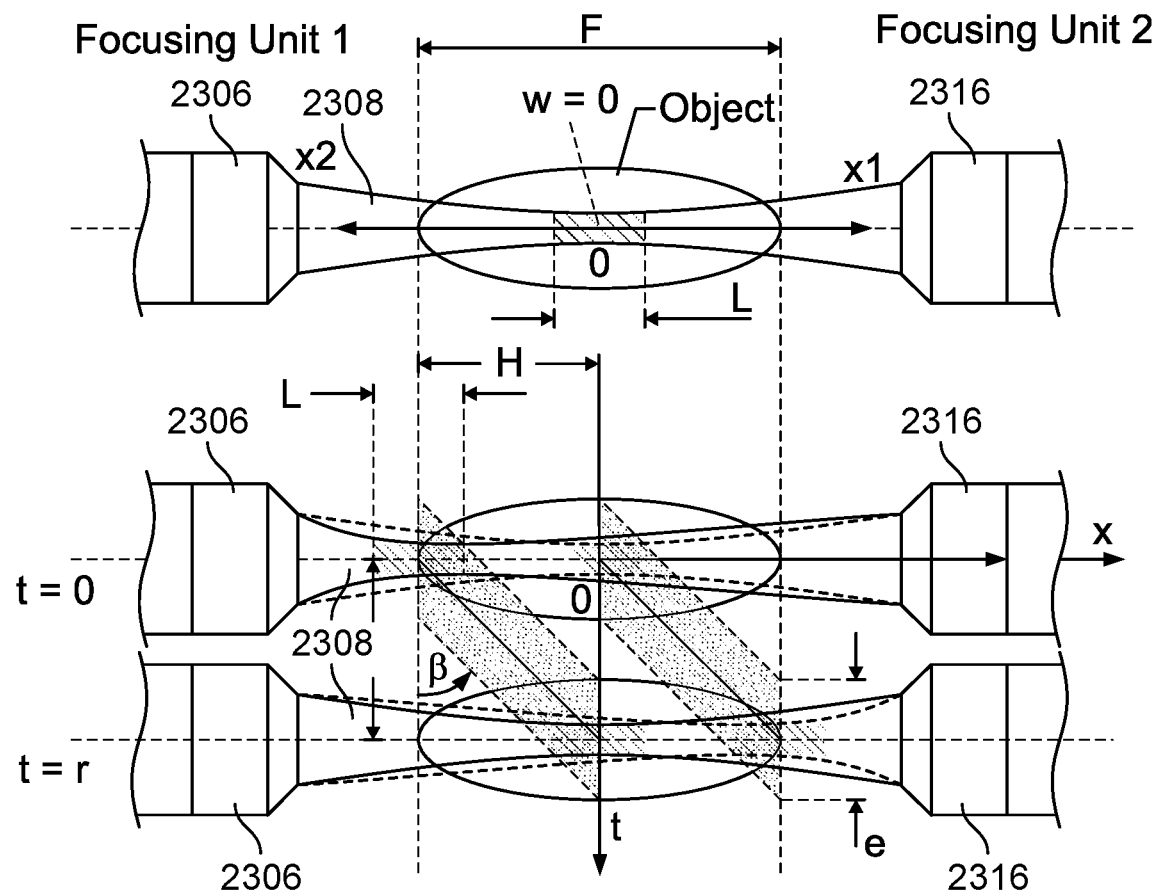
FIG. 23 depicts an embodiment of a portion of the components of a system for performing SPIM that is capable of spatially aligning and temporally synchronizing light sheets and a rolling shutter detector in a dual light sheet mode.

FIG. 23 depicts an embodiment of a portion of the components of a system for performing SPIM that is capable of spatially aligning and temporally synchronizing light sheets and a rolling shutter detector in a dual light sheet mode. Shown in FIG. 23 are optical focusing units 2306 and 2316 corresponding to optical focusing units 1106 and 1116, respectively, and light sheet 2308 produced by optical focusing units 2306 and 2316.

By equating the waist (L, in micrometers, [μm]) of light sheet 2308 to the height of the exposed set of rows in the digital camera 1140 at any given moment of time during readout, the waist can be found as:

$$L = e \cdot \tan\beta = e \cdot \frac{H}{D}$$
$$= e \cdot \frac{F/2}{r/2} = e \cdot \frac{F}{r}$$

Thus, the period of readout is expressed in terms of the interval of the signal readout (h, in seconds, [sec]) between adjacent pixel rows and the number n of rows (equal to the number of columns) in digital camera/detector 1140 as:

$$d = \frac{n}{2} \cdot h = e \cdot \frac{s}{2} = e \cdot \frac{F/2}{L} = \frac{r}{2}$$

where the exposure period and sampling of the field of view are parameters set by the user of the system through the graphic user interface such as graphic user interface 1900.

The exposure period is e, in seconds, [sec]. The sampling of the field of view (s>0, in positive numbers), equal to the field of view (F, in micrometers, [μm]) of the digital camera expressed in terms of the waist (L, in micrometers, [μm]), either of the stationary sheet of laser light or of the scanning laser beams, generated by the illumination optical system is:

$$s = \frac{F}{L}$$

The interval of the signal readout and the exposure period of each pixel row are controlled by the imaging control section of the digital camera based on the calculation result.

The light sheets are temporally synchronized for a rolling shutter of a detector such as a digital camera. This is accomplished in an analogous manner to method 1800. However, in every step requiring the checking of image quality, the image quality is checked separately for the field of view of camera 1140, which is swept by the laser beam incident from the corresponding illumination unit (e.g. left side of the image captured by the camera is checked when the box "Left Arm" is checked in the Laser Control of graphic user interface 1700 and in the Waist (Focus) Sweeping control of graphic user interface 1900).

Figure 24:
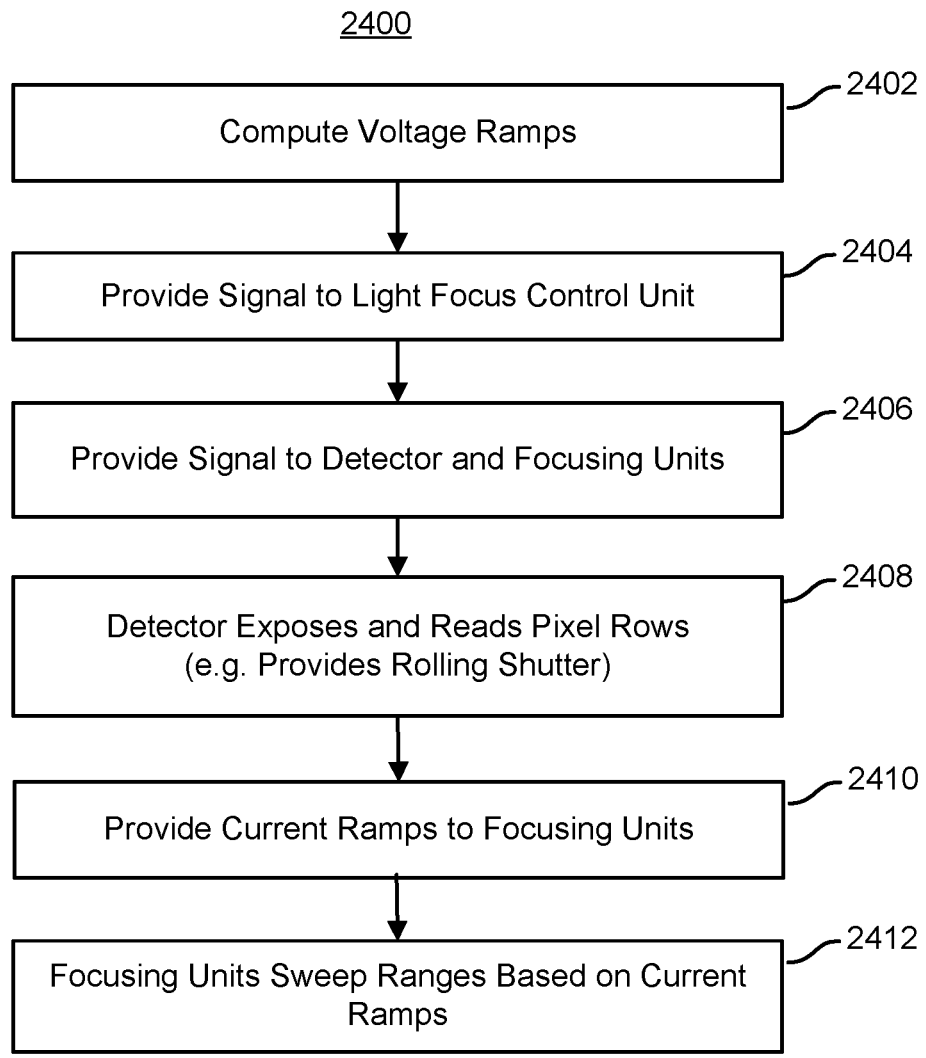
FIG. 24 is a flow chart depicting an exemplary embodiment of a process for temporally synchronizing laser light sheets and a rolling shutter of a detector such as a digital camera in dual light sheet mode.

FIG. 24 depicts an exemplary embodiment of method 2400 for temporally synchronizing laser light sheets and a rolling shutter of a detector such as a digital camera in dual light sheet mode. Method 2400 may be used for automatic synchronization and is described in the context of system 1100 depicted in FIG. 11. Automatic synchronization of optical focusing units, such as units 1106 and 1116, is described in the context of electrically tunable lenses. However, automatic synchronization may be performed in an analogous manner for optical focusing units 1106 and 1116 implemented in a different manner, such as embodiments in which changes in the position of focus of the light beam and/or change the cross section of the light beam is achieved, via components such as piezoelectrics, stepper mirrors/motors, and/or other components.

The driving signal voltage ramps (v(t), in Volts, [V]) are calculated by computer system 150 at 2402. These voltage ramps may be calculated as:

$$v_l(t) = v_l^i + \frac{v_l^f - v_l^i}{d} \cdot t,$$
$$l \in [1, N],$$

where N>1 is the number of optical focusing units (e.g. 1106 and 1116) and the initial (at t=0 seconds) and final (at t=d seconds) voltages of the voltage ramps ($v_l^i$, $v_l^f$) are set by the user of the system through the graphic user interface 1900.

The image acquisition is controlled by computer system 1150. In order to acquire an image of a slice at an arbitrary height z in the object, computer system 1150 computes the voltage ramps of focus modulation for each of the optical focusing units at 2402, and sends a command to light focus control unit 1120 at 2404. This signal prompts light focus control unit 1120 to fire a trigger signal to digital camera 1140 and a set of ramp signals to each of optical focusing units 1106 and 1116, at 2406. Thus, exposure and readout of the adjacent pixel rows of the digital camera is synchronized with the modulation of waists of the stationary light sheets or scanning light beams directed onto the object from several illumination optical systems.

Upon reception of the trigger signal from the light focus control unit 1120 and after a delay τ set by computer system 150 (in order to let the adjacent rows of digital camera 1140 be exposed only after the settling period of optical focusing units 1106 and 1116), digital camera 1140 starts exposing adjacent pixel rows during exposure period e, and reading out the adjacent rows during the interval of the signal readout h, at 2408

The light sheet waist modulation is provided by optical focusing units. Based on the voltage ramps (usually, restricted to the range [−5 V, 5 V]) provided by computer system 150 to the control units 1106 and 1116, focus control unit 1120 provide current ramps to the optical focusing units 1106 and 1116 by using focusing drivers 1124 and 1126 internal to light focus control unit 1120, at 2410. Basically, focusing drivers 1124 and 1126 act as power amplifiers converting the voltage ramps from the calculation units into current ramps (typically in the range [0, 0.416 mA]), delivered to optical focusing units 1106 and 1116.

Optical focusing units 1106 and 1116 transform the current ramps into the ramps of optical power applied to the stationary light sheets or scanning light beams directed onto the object, typically in the range [−2D, +3D], at 2412. As the optical focusing units 1106 and 1116 are built from materials of different physical properties, the rate of variation of the optical power depends both on the current and on its rate of change, which in turn depend on the frequency of image acquisition of the camera, or frame rate (or number of frames per second, fps) of the camera, and on electrical impedance of the optical focusing unit at that frame rate. The frame rate depends on size of the camera's sensitive area, interval of the signal readout d, the exposure period e.

Varying optical power causes the position of the waist (x, in micrometers, [μm]) of the stationary light sheets or scanning light beams to change as a function of time according to:

$$x_l(t) = x_l^i + \frac{x_l^i - x_l^f}{d} \cdot t$$

where the exact values initial (at t=0 seconds) and final (at t=d seconds) positions of the waist ramps ($w_l^i$, $w_l^f$) depend on the design of the illumination optical systems 1104 and 1114 generating the corresponding stationary light sheets or scanning beams. At the end of exposure and readout of the entire set of rows on the digital camera, the image is released by camera 1140 to computer system 150.

Although the relation between the voltage ramps provided by computer system 150 and the rates of change of position of waists depends on several parameters such as the frame rate, impedance of the optical focusing unit at that frame rate and design of the illumination optical system, there is an approximately linear relationship between initial and final waist positions and the corresponding values of the initial and end voltages of the voltage ramps. These may be given by:

$$x_l^i = c_l^i \cdot v_l^i,$$

$$x_l^f = c_l^f \cdot v_l^f,$$

where $c_l^i$ and $c_l^f$ are constants for given set of operation (such as fps) or material (such as impedance, optical design) parameters, that can be typically found by calibrating system 1100.

Therefore, a manual or automatic procedure to find a set of the initial and final voltages of the voltage ramps ($v_I^i, v_I^f$), such that the location of waists coincides (to within some reasonable number of pixel heights) with the position of the center of the exposed set of rows in the light receiving section of the digital camera at any time during image acquisition, can be carried out based on some convenient metric, e.g. on finding the maximum of contrast in the image of the object.

The exposure period of digital camera 1140 as well as the initial and final voltages of the voltage ramps can be varied in a trial-and-error fashion by the user through the graphic user interface software of computer system 150 in order to find the best contrast of a test object (e.g. beads). As an alternative, various widely known optimization techniques (e.g. steepest descent) can be used to automatically find the maximum of contrast in imaging the test object by varying the initial and final voltages $v_I^i$ and $v_I^f$ of the voltage ramps until a set of optimum parameters is found to yield the highest contrast in the image of the test object. Typically, with the exposure and sampling set to constant values based of the desired brightness of the image, the search for initial and final voltages separately for each illumination unit (the other being temporarily switched off) reduces the optimization problem to that of finding two optimum values of initial and final voltages, which is always practically feasible by means of using manual search and/or numeric algorithms.

In addition to the benefits described above for a rolling shutter, use of a dual shutter allows for an increased speed of acquisition of the images. As the period of readout d is twice as small as the period of readout r according to the first aspect of the invention, the frame rate of image acquisition is up to twice as big. The increased acquisition speed may be advantageous in applications requiring fast acquisition of fluorescent images of objects in which the time of life of fluorescent markers is low (like imaging e.g. frog embryos), in applications requiring low photobleaching, in time lapse imaging of big volumetric objects.

Figure 25:
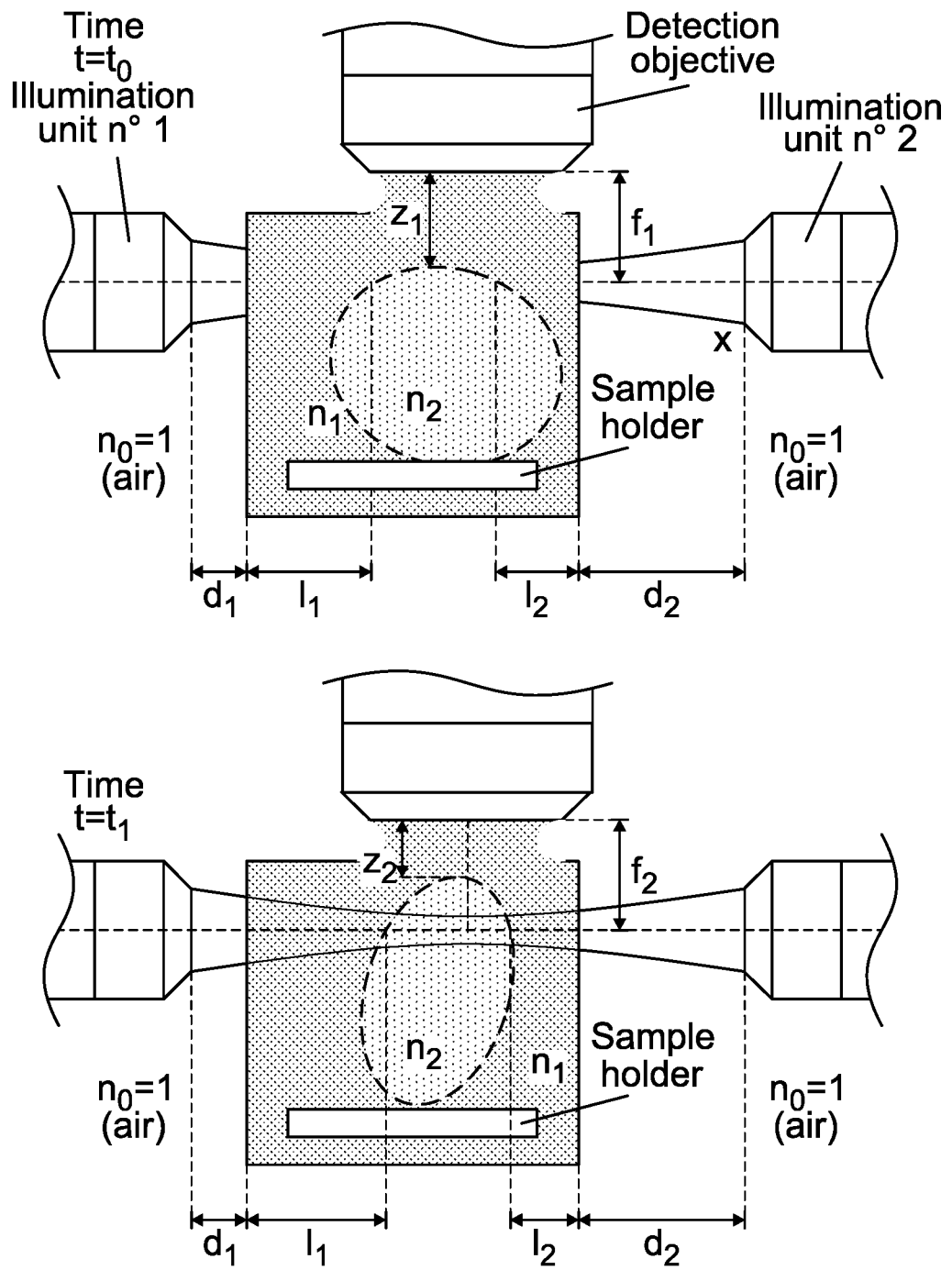
FIG. 25 is a diagram depicting an embodiment of time-variant environmental conditions affecting propagation of light into a microscopy specimen.

In visualizing both fixed and living organisms and cells with light sheet system, and in particular when the system is equipped with the waist (focus) sweeping control of the laser beams incident on the biological samples illumination units, the synchronization of several illumination units may be carried out repeatedly, for each sample individually and at least at the rate of change of conditions in which the sample observation takes place, especially when time-lapse imaging of sampled is involved. The synchronization can be carried out repeatedly as at least one of the conditions below may change during time:

Variations in sample type (live or fixed) and size, related to a variety of possible samples that can be observed with the system and imaging of which call for mounting on sample holder in the sample chamber and hence in individual synchronization;

Time-variant environmental conditions affecting propagation of light from the illumination unit deep into the sample. For example, FIG. 25 is a diagram depicting an embodiment of some such time-variant environmental conditions. These conditions may be related to the environment of samples: characteristics of medium in which the sample is embedded, the time during which the sample resided in the medium prior to imaging, the medium's temperature and its chemical composition, and other conditions;

Time- and space-variant conditions of both fixed and living samples, including its possible drift in a new location within the sample chamber and its change of form (thickness, height, etc.) in time;

Structural conditions of the light sheet system, related to stability of the structure of the system (e.g. the stability of its mechanical, optical, etc. structure).

Figure 26:
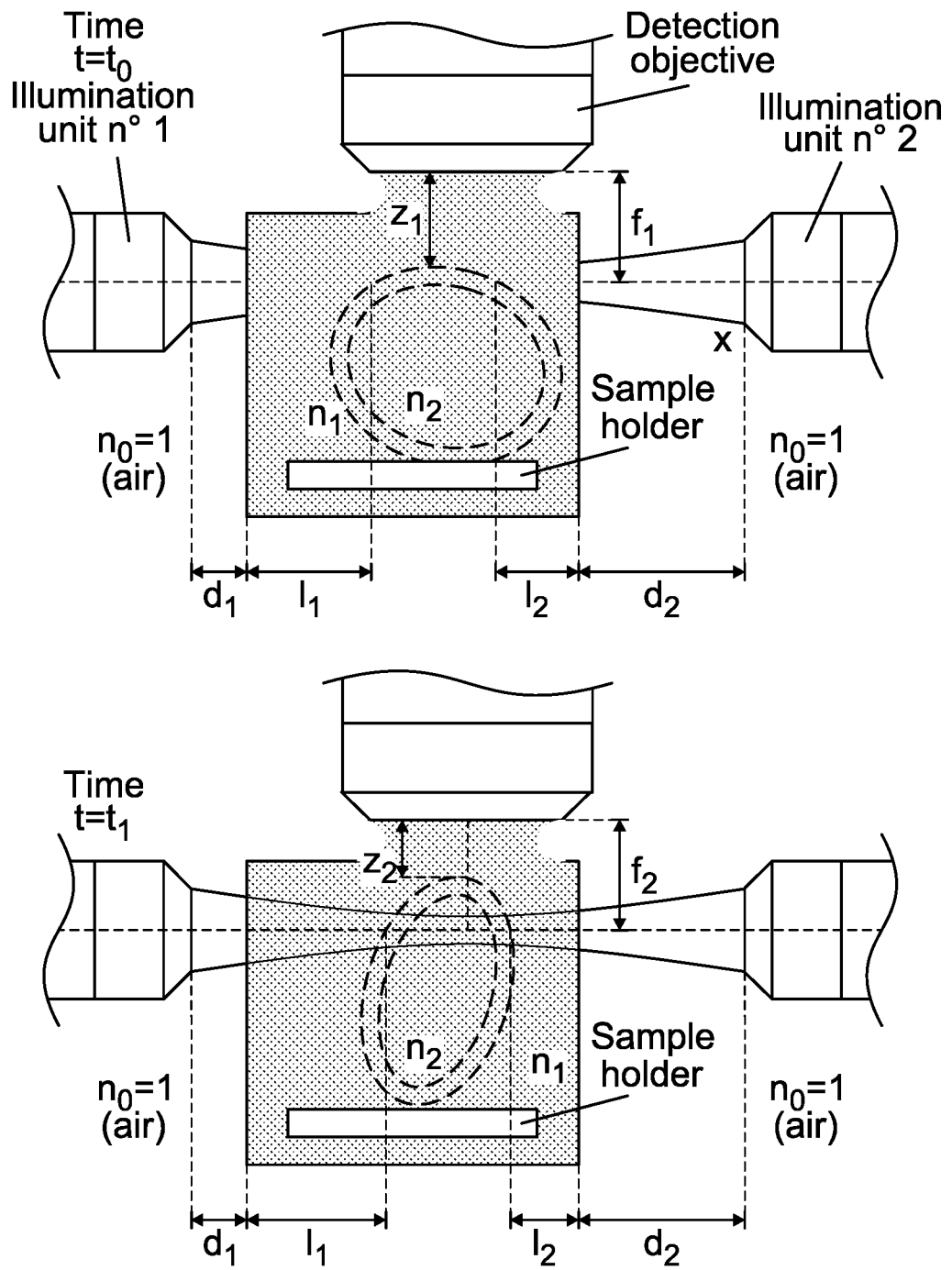
FIG. 26 is a diagram depicting another embodiment of time-variant conditions affecting propagation of light into a microscopy specimen.

In FIG. 25, some of major parameters influencing optical properties of light beams propagating in the sample chamber are shown. The variability of the imaging conditions is described below. FIG. 26 is a diagram depicting an embodiment of time-variant conditions affecting propagation of light into a microscopy specimen. Moreover, when optimum imaging of the selected areas of the samples (e.g. membrane of FIG. 26) is required, the synchronization is carried out by checking the image quality in only the concerned areas of the sample (such as at the edges of the sample), either as the optical parameters (such as refractive index) may vary, or as the light does not penetrate deeply inside the sample (due to e.g. a lack of transparency of the sample).

Samples suited for light-sheet-imaging may vary from small ($\cong 1$ mm in diameter) samples like zebra fish brains to large (up to several centimeters in diameter) samples such as mouse brains. Mere differences in size and composition of the samples and their mounting may call for differences in rate of changes of focus sweeping parameters during time. The refractive index of a substance in which the sample is embedded is defined as the ratio between light speed in vacuum and light speed in the medium (phase velocity of wave propagation). The higher the index, the more the substance slows down light. The light that hits the interface between two substances with different indices is refracted and propagate at a different angle in the second medium. Refractive indices of some typical substances, such as clearing and imaging solutions can vary significantly (up to about 50%) with respect to the refractive index of air. This results in a marked variation of focus sweeping parameters (e.g. ranges of applied ramp voltages) while defining the focus sweeping for different media, and/or in a dependence of these parameters on time of residence of the biological sample in the medium (as there can be required a time in order to the sample to be imaged as the sample get impregnated in the medium so as to give rise to some "settled" refractive index. Any change in position and form both fixed and living samples during time incurs a change in the focus sweeping parameters. The more the refractive indices of the sample and of the imbedding medium differ from the RI(water), the larger should be the range of applicable focus sweeping parameters during the imaging involving the focus sweeping. The ruggedness of the light sheet system and the conditions in which the system operates play a major role in the stability of the given set of synchronization parameters. Presence or not of the anti-vibration table, rate of deformation of the material from which are made the components of the removable optical microscope all influence the rate of change of the set of synchronization parameters, especially when imaging is made with detection objectives having a high Numerical Aperture.

Devising a mathematical model describing the variation in focus sweeping parameters as a function of environmental data and properties of the sample may lead to the unnecessary complexity and may be challenging given the plethora of samples that can be imaged by light-sheet systems and innumerable options of holding the samples, as well as variety of possible values of parameters influencing optical properties of light beams propagating in the sample chamber. It may be much simpler to check the image quality given a slight variation of a limited number of focus sweeping parameters (e.g. ramp voltages and number of fields), which is carried out in this invention by means of either manual (operator-driven) of software-driven (i.e. relying on elements of artificial intelligence) synchronization.

A method to synchronize several focusing units between themselves and the digital camera is described based upon a rolling shutter. It is readily extended to the implementation of system 1100 when operated in a dual light sheet mode.

Figure 27:
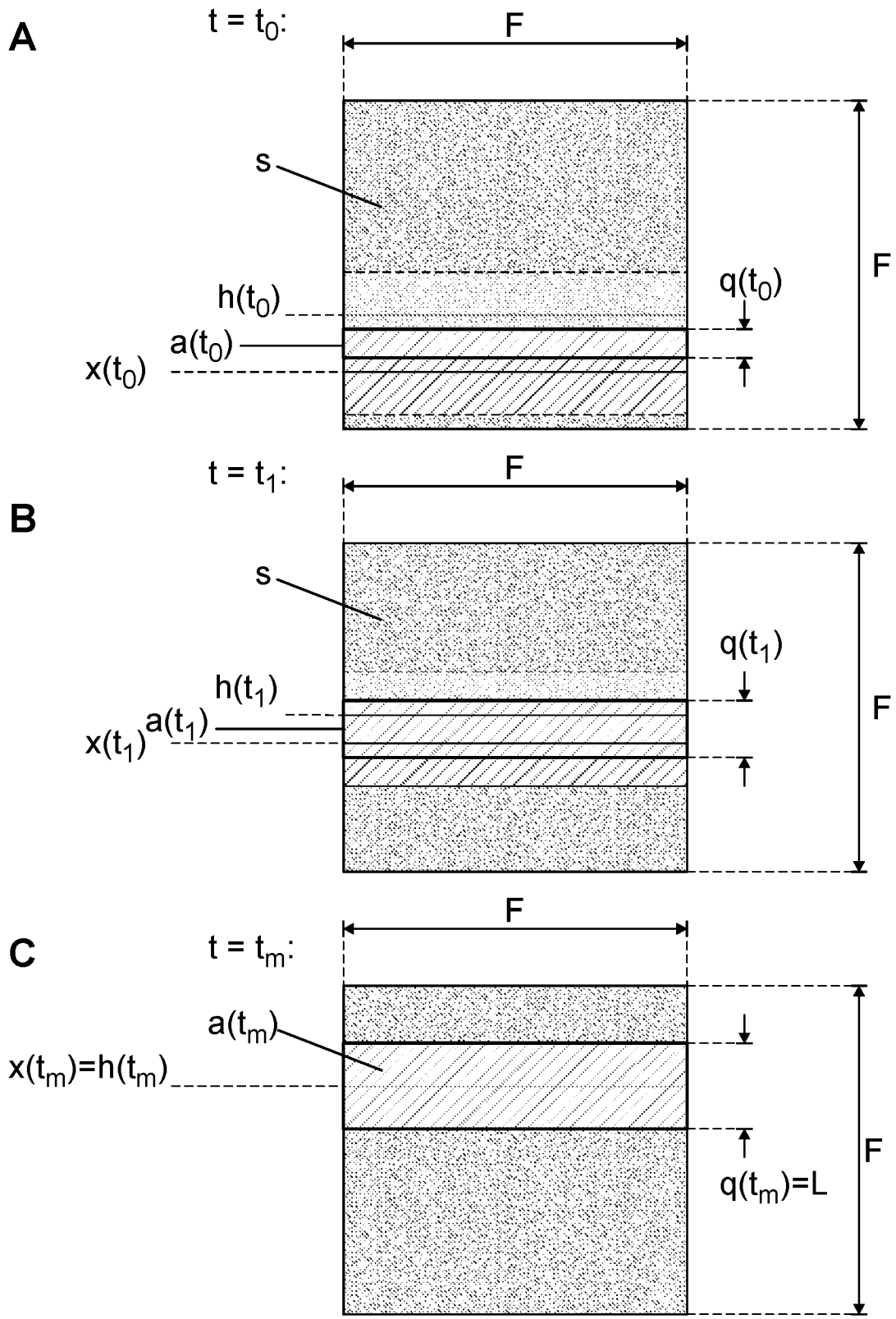
FIG. 27 depicts an exemplary embodiment of pixel rows in a detector using a rolling shutter.
Figure 28:
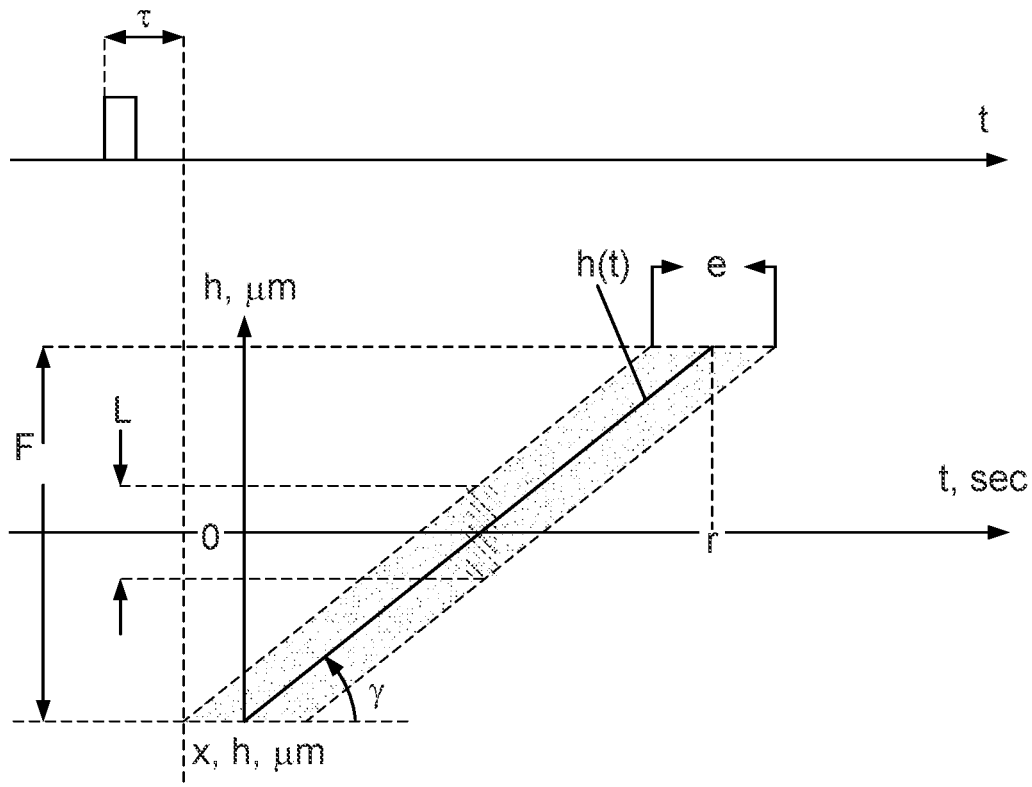
FIG. 28 illustrates an embodiment of the effect a varying optical power has on the waist of a light sheet as a function of time.
Figure 28:
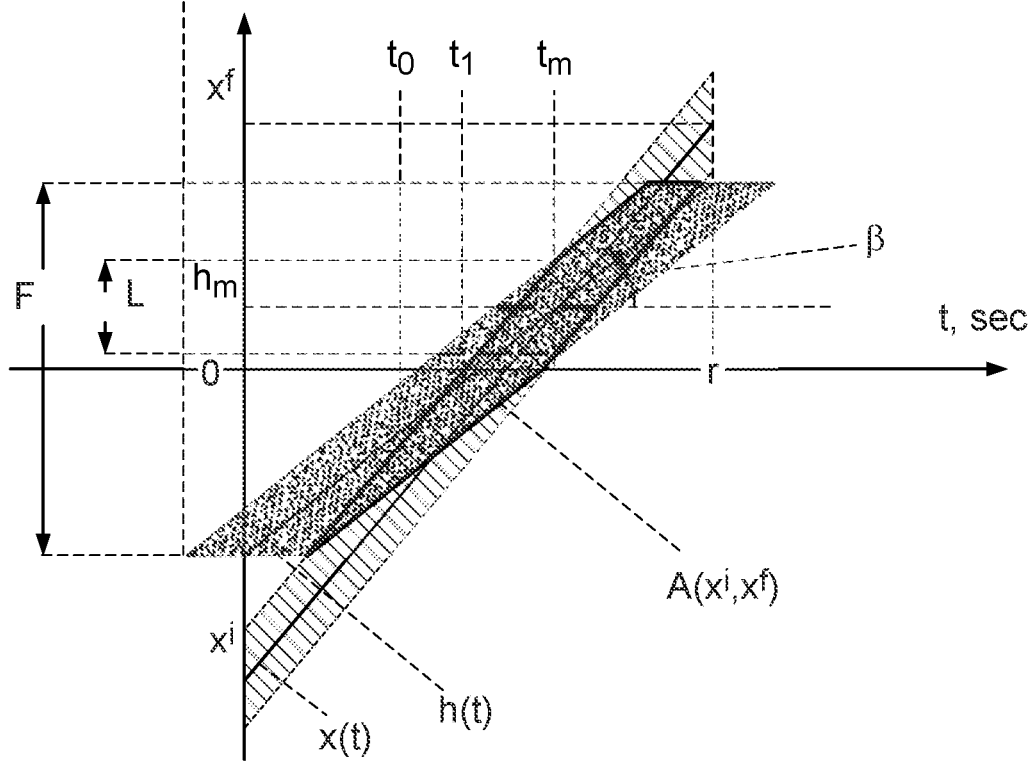

FIG. 27 depicts an exemplary embodiment of pixel rows in a detector using a rolling shutter. FIG. 28 illustrates an embodiment of the effect a varying optical power has on the waist of a light sheet as a function of time. FIG. 28 is an example of exposure timing of the digital camera, where h(t) designates the location of the center of the set of pixel rows, whose central pixels are exposed at time t seconds and of settings ($x^i, x^f$) when synchronizing the location of the waist of the laser light sheet from an optical focusing unit with the locations of the exposed set of pixel rows in the digital camera. The hatched area indicates locations of the waist of the laser light sheet as the focus of the laser light sheet follows the line x(t) from $x^i$ at t=0 to $x^f$ at t=r. The solid area indicates locations of exposed rows of pixels in the digital camera; red polygon delimits the total area (in units of [μm×sec]) of intersection between two spatiotemporal convex polygons, that of exposed rows and that of the rows of the camera within the waist. FIG. 27 indicates relative positions of exposed rows of pixels in digital camera 1140 (solid) that are spanned by the rows inside the waist of the laser light sheet (hatches), at instants t=$t_0$, t=$t_1$ and t=$t_m$ ($t_0 < t_1 < t_m$) shown in FIG. 28. S, the field of view of the digital camera, a(t), the area of intersection of exposed rows and the rows within the waist, and q(t), the height of the intersection area are also shown.

Consider only one optical focusing unit 1106 or 1116 and let a(t) be the area of intersection of exposed rows and the rows within the waist of a laser light sheet passing through the selected optical focusing unit and q(t) the height of the intersection area. These quantities have a proportional relationship, the coefficient of proportionality being L=L(e,r). The height of the set of pixel rows, which are exposed at any instant of time t∈[0,r] given the fixed exposure period e and the period of readout r of the field of view of the digital camera in the object space:

$$a(t) = F \cdot q(t)$$

Given a set of driving voltages {$v^i, v^f$} for the selected optical focusing unit and the corresponding initial and final waist center locations {$x_l^i, x_l^f$}, the total average intensity recorded by digital camera 1140 at an instant of time t is:

$$I(t) = \int_{a(t)} j(s) ds$$

where j(s) (in [#/μm²]) is e.g. the average intensity per elementary area s ⊂ a(t) at a time t∈[0,r]. In a microscopy specimen 1101 with homogeneous population of fluorescent markers, the average intensity is approximately constant throughout the microscopy specimen's support area S=S(z). At a given fixed slice along the z-axis contained in the camera's field of view:

$$j(s) \approx J = \text{const}, s \subset S$$

Then, the total intensity at time t∈[0,r] is given by:

$$I(t) = J \cdot a(t)$$
$$= J \cdot F \cdot q(t)$$

The total intensity in the image recorded by digital camera 1140 during exposure given the initial and final waist center locations $x^i$ and $x^f$, is:

$$G(x^i, x^f) = \int_0^r I(t) dt$$
$$= J \cdot F \cdot \int_0^r q(t) dt$$
$$= J \cdot F \cdot A(x^i, x^f)$$

where $A(x^i, x^f)$ (measured in [μm×sec]) is the total area of intersection between two spatiotemporal convex polygons (shown in FIG. 28) that of exposed rows and that of the rows within the waist. The nonempty intersection of any two convex polygons is always a convex polygon.

Figure 29:
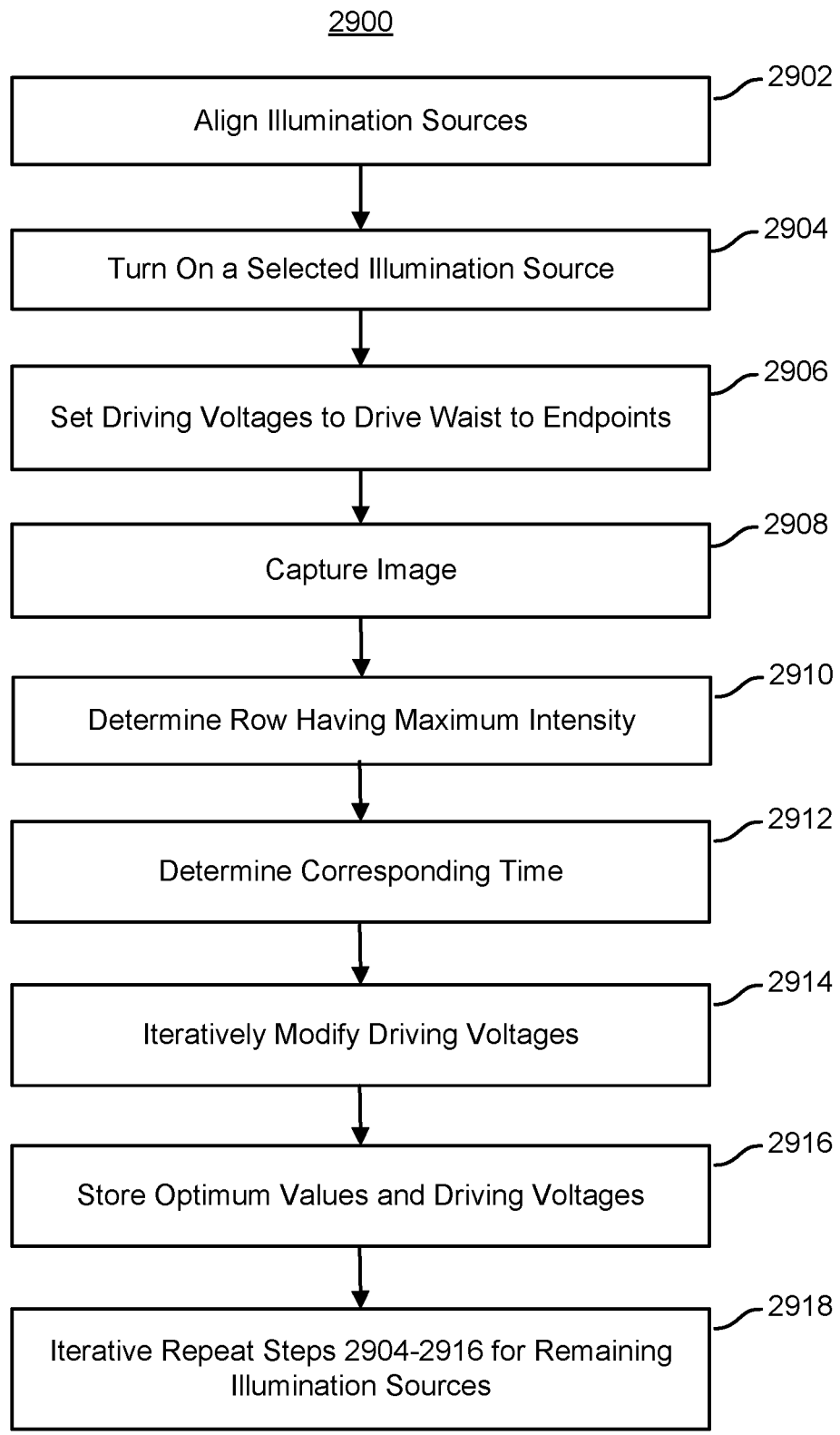
FIG. 29 is a flow chart depicting an exemplary embodiment of a process for determining driving voltages for an embodiment of a system for performing SPIM that is capable of spatially aligning and temporally synchronizing light sheets and a rolling shutter detector.

FIG. 29 is a flow chart depicting an exemplary embodiment of process 2900 for determining driving voltages for an embodiment of a system for performing SPIM that is capable of spatially aligning and temporally synchronizing light sheets and a rolling shutter detector. A more optimal set of focusing unit driving voltages $v^i_1, v^f_1, v^i_2, v^f_2$ may be provided by method 2900. Method 2900 is described in the context of system 1100 depicted in FIG. 11 and FIGS. 27-28. Method 2900 commences after microscopy specimen 1101 has been placed in the field of view of the detection objective for detection optical system 1130.

Light from illumination sources 1102 and 1112 is aligned, at 2902. Alignment at 2902 may be accomplished using process 1300. After alignment at 2902, the range of waist centers of all laser light sheets indexed with l∈[1,N] (where N>1 is the number of optical focusing units, such as 1106 and 1116) spans at least the entire field of view of the digital area, i.e. that at least the following conditions hold true:

$$\min\{x_l^i\} \leq -\frac{F}{2},$$
$$\max\{x_l^f\} \geq \frac{F}{2},$$

This may ensure a nonempty intersection in FIG. 28 between a spatiotemporal convex polygon of exposed rows and a spatiotemporal convex polygon of the rows within the waist;

One illumination source l, such as illumination source 1102, is turned on while the other(s), such as illumination source 1112, remain turned off. At 2906, the driving voltages $v^i$ and $v^f$ are set at their extremum values $v^{min}$ and $v^{max}$, so as to drive the corresponding waists to its extremum locations (the index 1 is omitted for clarity):

$$x^i = x^{min},$$
$$x^f = x^{max};$$

An image is captured, at 2908. This may include firing the external trigger from light control unit 1120 to detector 1140 and recording the image. For example, the image may be stored on computer system 1150. At 2910, in the image, it is determined what the coordinate h($t_m$)=$h_m$ are for the row, central in any set of rows of height L, such that the sum of intensities contained in all the pixels of this set of rows is at maximum among all such sets in the image.

At 2912, the corresponding instant of time $t_m \in [0,r]$ is determined by:

$$t_m = \underset{t \in [0,r]}{\mathrm{argmax}}\{q(t)\}.$$

$$= \frac{h_m + F/2}{\tan\gamma}$$

$$= \frac{h_m + F/2}{F/r}$$

At 2914, the set of driving voltages $v^i$ and $v^f$ are iteratively modified so as to decrement the angle $\beta$ (until it becomes zero) between lines $x(t)$ and time axis (t-axis) until the maximum of the total intensity $G(x^i, x^f)$ is found. This may be implemented by modifying either $x^i$ or $x^f$, while at the same time computing the remaining coordinate ($x^f$ or $x^i$, respectively). Specifically, this may be accomplished by using the relation:

$$h_m - x^i = t_m \cdot \tan\beta$$

$$= t_m \cdot \frac{x^f - h_m}{r - t_m}$$

$x^i$ (when $x^f$ is fixed) or $x^f$ (when $x^i$ is fixed) can be computed as:

$$x^i = h_m - t_m \cdot \tan\beta = h_m - t_m \cdot \frac{x^f - h_m}{r - t_m}, \; x^f \text{ fixed}$$

$$x^f = h_m + (r - t_m) \cdot \tan\beta = h_m + (r - t_m) \cdot \frac{h_m - x^i}{t_m}, \; x^i \text{ fixed}$$

At 2916, the optimum values of $x^i$ and $x^f$ as $(x^i_l, x^f_l)$ are stored:

$$(x^i_l, x^f_l) = \underset{x^i, x^f}{\mathrm{argmax}}\{G(x^i, x^f)\},$$

$$= \underset{x^i, x^f}{\mathrm{argmax}}\{A(x^i, x^f)\}$$

Also at 2916, the corresponding driving voltages $v^i$ and $v^f$ are determined and stored as $(v^i_l, v^f_l)$. The selected illumination source, such as source 1102, may then be switched off.

At 2918, 2904, 2906, 2908, 2910, 2912, 2914 and 2916 are iteratively repeated for remaining illumination source(s). For system 1100, 2904, 2906, 2908, 2910, 2912, 2914 and 2916 are repeated for illumination source 1116. By the end of method 2900, the both temporal and spatial synchronizations between the optical elements 1103 and 1113, the microscope (e.g. detection optical system 1130 and position of microscopy specimen 1101) and digital camera 1140 are achieved. Spatial synchronization of optical elements 1103 and 1113 between themselves and the microscope has been achieved. Temporal synchronization between all optical elements 1103 and 1113 and digital camera 1140 are achieved.

For more optimal synchronization, certain criteria may be met. Instead of a sample with homogeneous average intensity, any fluorescently marked sample can be used, with the corresponding change of criterion for optimization. The choice of the criterion can be implemented both by operator and/or by computer, through e.g. by applying procedures for machine learning and/or artificial intelligence. For example, instead of maximizing the total intensity $G(x^i, x^f)$, the area of maximum contrast can be maximized. In a microscopy specimen 1101 with homogeneous population of fluorescent markers (e.g. a mouse brain embryo), the average contrast is approximately constant throughout the sample's support area $S=S(z)$ at a given fixed slice along the z-axis contained in the camera's field of view. In such a case, the function $j(s)$ (in $[\#/\mu m^2]$) is the contrast in an elementary area $s \subset a(t)$ at time $t \in [0,r]$.

Using the methods and systems described herein, a good quality fluorescent image is expected to have bright details, feature high contrast and sharpness may be achieved. To assess the impact of the varying focal position of the excitation light sheet from the two illumination units in sync with the digital camera's rolling shutter, we expect that these three characteristics are improved.

Figure 30A:
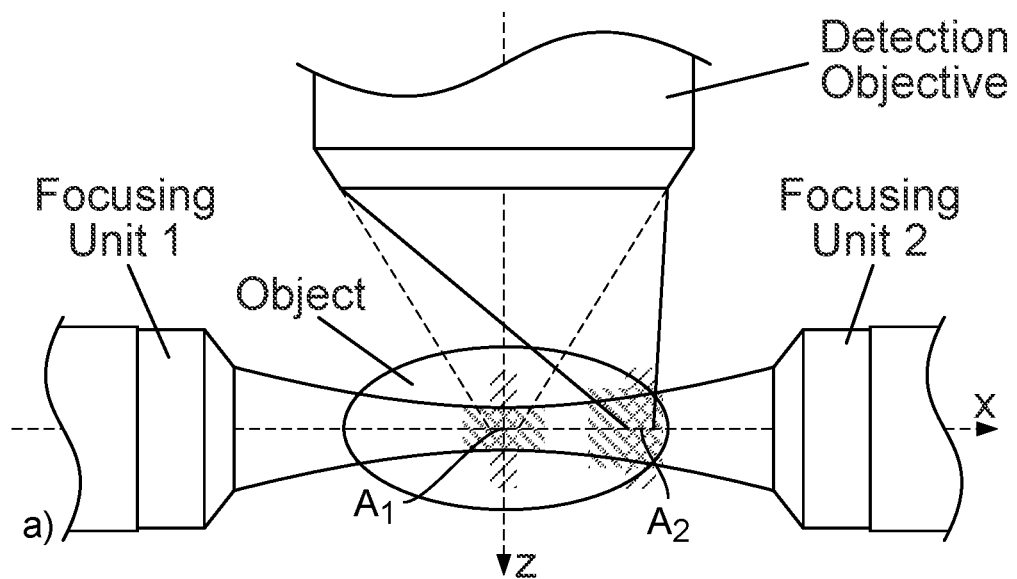
Figure 30B:
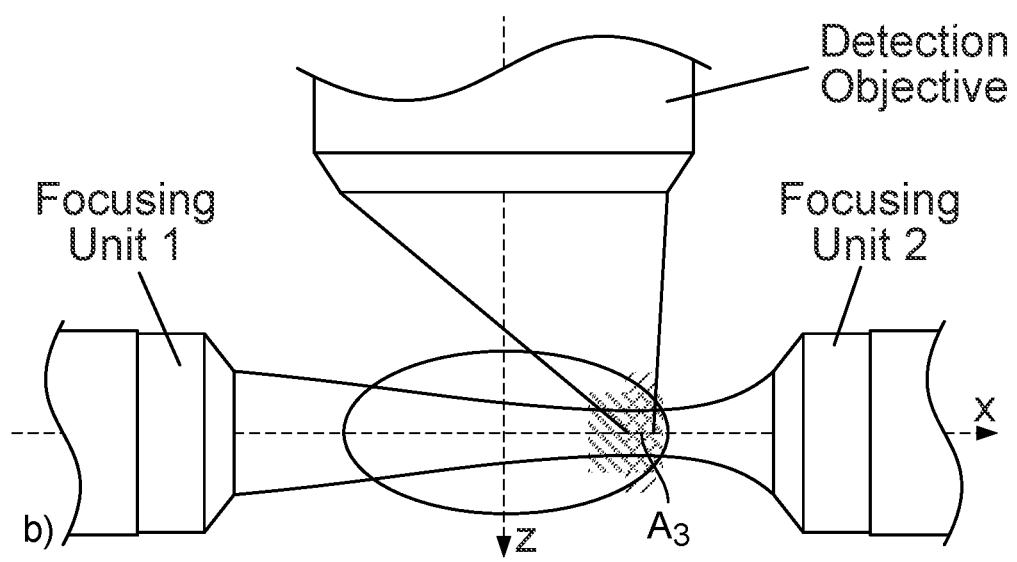
FIG. 30B is a schematic depicting an embodiment of the projections, onto the XZ-plane when the focus sweeping mode was switched off.

FIGS. 30A and 30B are schematics depicting an embodiment of the projections, onto the XZ-plane (spanned by the excitation x-axis and detection z-axis), of the volumes filled by the excitation light sheet and by the emission light captured by detection objective when the focus sweeping mode was switched on and off, respectively. $A_1$, $A_2$, schematic representations of projections onto the XZ-plane, when the light sheet is focused at the center of the field of view of the detection objective, when imaging is made of the center ($A_1$) and of the side ($A_2$) of the field of view, with focus sweeping mode switched off; $A_3$, a typical projection corresponding to imaging of the side of the field of view, in the waist sweep on mode When the laser light sheet waist sweep is on, the volume of intersection between the light sheet and the light detection cone is approximately the same throughout the width of the sample (i.e. $A_1 \cong A_3$ in FIG. 30A) and the depth of the light sheet is at its minimum (about 2 μm), thus delivering increased (e.g. maximum) power density to fluorophores located in the light sheet's slice. The image in the waist-sweep-on mode may be much brighter with respect to the waist-sweep-off mode image. The level of fluorescence may be determined by computing the corrected total cell fluorescence (CTCF), which is the difference between the integrated intensity of the entire image and the product of the image area and the mean level of the intensity in the low-intensity areas of the image.

As the sectioning power of light sheet may be at or near its maximum throughout the microscopy specimen 1101, the specimen's regions lacking fluorophores produce correspondingly darkest pixels in the images. In contrast, regions within the sample with the highest fluorophore density will give rise to the brightest pixels. Hence, due to maintaining the light sheet at its smallest depth, the full dynamic range of the digital camera 1140 is filled, with clear transitions between pixel areas corresponding to low- and high-density fluorophore areas within the sample. Finally, the sharpness is increased as a result of lesser volume of fluorophores being excited within the focal depth of the detection objective (as $A_1 \cong A_3 < A_2$ in FIGS. 30A-30B).

To compare contrast and sharpness of images, a recently developed image quality ranking method may be used. Specifically, root-mean square contrast standard deviation (StDev) of the pixel intensities and image Entropy based on a histogram of the images were calculated. In the calculation, only intensities higher than the mean intensity are taken into consideration. In terms of both the StDev and Entropy values, images obtained in the waist-sweep-on mode may outrank those obtained when the waist sweep was switched off. The power spectrum analysis for captured images also indicates that the images obtained with the waist sweep switched on have higher sharpness when analyzing the standard deviations of the frequency power spectra calculated while discarding both 2% and 40% frequencies in the lower part of the spectrum.

High resolution imaging of cell migration in 3D collagen gels represents a widespread approach in studies of cancer invasion. This approach requires long-term live imaging with good axial resolution typically achieved by laser scanning confocal microscopy, which, in turn, suffers from rather high phototoxicity when large volumes are being analyzed. LSFM allows for reducing or minimizing phototoxicity and is thus a method of choice for this type of experiment. Focus sweeping can further improve the data quality by significantly increasing lateral dimensions of analyzed volumes while maintaining high acquisition speed by eliminating or minimizing the necessity of lateral stitching. A typical experiment to access improvements in image quality by focus sweeping mode may be modeled. For example, human fibrosarcoma cells (HT1080 cell line) were plated in 1.7 mg/ml collagen gel on cover slips at final concentration 160 000 cells/ml. After gel polymerization samples were incubated in complete growth media for 24 hours, fixed with 3.7% formaldehyde and stained with AlexaFluor488-falloidin to visualize actin cytoskeleton. Imaging was performed in waist-sweep-off and waist-sweep-on modes and substacks of 512×512×512 pixels located at waist position and at a distance of 500 um right and left of the center were analyzed.

The image in the waist-sweep-on mode may feature brighter areas over a globally darker background contrary to the waist-sweep-off mode image. Specifically, when calculated by arbitrarily selecting the same 10 areas of captured images, the corrected total cell fluorescence (CTCF) of a waist-sweep-on mode image may be calculated to be 145.4e6 a.u., whereas the CTCF of a waist-sweep-off mode image may be negative (CTCF=−15.8e6 a.u.). Thus, in the waist sweep off mode, the useful fluorescent signal from localized stained structures in a thin plane (orthogonal to the detection axis) is overshadowed by an integrated value of fluorescent signals arising from stained structures in several slices spanned by the thicker laser light sheet waist.

For data collected to compare contrast and sharpness of the images according to the recently developed image quality ranking method, root-mean square contrast standard deviation (StDev) of the pixel intensities and image Entropy were calculated based on the histogram of the images in which only intensities higher than the mean intensity were taken into consideration. In terms of both the StDev and Entropy values, images obtained in the waist-sweep-on mode outranked those obtained when the waist sweep was switched off. A power spectrum analysis may also show that the images obtained with the waist sweep switched on have higher sharpness when analyzing the standard deviations of the frequency power spectra calculated while discarding both 2% and 40% frequencies in the lower part of the spectrum.

By synchronizing the modulation of the position of waists of two laser light sheet beams and of the activated pixel rows of the digital camera, deeper penetration of the excitation deep into samples, such as mouse brain embryos, may be achieved while securing high levels of brightness, contrast and sharpness of the resulting images. The alignment and synchronization may be achieved either manually or automatically, based on maximizing the average intensity level inside images while varying the range of voltages supplied to electrically tunable lenses inside the light sheet illumination units, given the ratio between widths of the set of activated rows in the digital camera and that of the field of view within the sample. There may be a tradeoff between the desired frame rate of image acquisition and the homogeneity of the image quality metrics such as the image's brightness, contrast and sharpness throughout the field of view of the digital camera: an increase in homogeneity is offset by a linear decrease in the frame rate of image acquisition. Since both high speed and high values of image quality metrics may be accommodated given the ever growing speed of today's computers, the method of synchronized modulation of laser beam waists may find broad range of applications in studying transparent or opaque fluorescently marked samples in light sheet microscopy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for illuminating a microscopy specimen, comprising:
   a plurality of illumination sources, each of the plurality of illumination sources configured to emit a light that travels along an illumination path to illuminate the microscopy specimen placed on an optical detection path of an optical microscope; and
   optical elements in the illumination path of each of the plurality of illumination sources, the optical elements being configured to at least in part transform the light from each of the plurality of the illumination sources into a light sheet illuminating the microscopy specimen and to vary a position of a waist of the light sheet from each of the plurality of illumination sources that illuminates the microscopy specimen;
   wherein the optical elements for each of the plurality of illumination sources are configured to spatially align the light sheet from each of the plurality of illumination sources to illuminate a substantially coincident portion of the microscopy specimen; and
   wherein the optical elements for each of the plurality of illumination sources are temporally synchronized to dynamically vary the position of the waist of the light sheet from each of the plurality of illumination sources to sweep the substantially coincident portion of the microscopy specimen.

2. The system of claim 1, further comprising:
   a detector in the optical detection path, the detector including a shutter and wherein the optical elements for each of the plurality of illumination sources and the shutter are temporally synchronized such that image data incident on the shutter and captured by the detector are synchronized with the substantially coincident portion of the microscopy specimen.

3. The system of claim 1, further comprising:
   a detector in the optical detection path, the detector including a rolling shutter and wherein the optical elements for each of the plurality of illumination sources and the rolling shutter are temporally synchronized such that image data incident on the rolling shutter and captured by the detector are synchronized with the substantially coincident portion of the microscopy specimen.

4. The system of claim 3, wherein the rolling shutter provides a dual light sheet mode and wherein the optical elements for each of the plurality of illumination sources and the rolling shutter are temporally synchronized such that the image data includes first data from light incident on a first portion of the rolling shutter and second data from light incident on a second portion of the rolling shutter physically separated from the first portion of the rolling shutter.

5. The system of claim 3, wherein an image generated from the image data is provided from a single pass of the substantially coincident portion across at least part of the microscopy specimen.

6. The system of claim 3, wherein the optical elements include a tunable lens configured to vary the focal distance to dynamically vary the position of the waist of the light sheet of each of the plurality of illumination sources.

7. The system of claim 6, wherein the tunable lens is an electrically tunable lens.

8. The system of claim 6, further comprising:
a plurality of focusing drivers, each of the plurality of focusing drivers coupled to the tunable lens of the optical elements of each of the plurality of illumination sources, each of the plurality of focusing drivers configured to drive the tunable lens for each of the plurality of illumination sources to be temporally synchronized with the rolling shutter and to vary the position of the waist of the light sheet from each of the plurality of illumination sources to sweep the substantially coincident portion of the microscopy specimen.

9. The system of claim 8, wherein the tunable lens includes a cylindrical lens.

10. The system of claim 1, wherein the optical elements include at least one of purely optical components and at least one component for mechanically adjusting position of a portion of the optical elements.

11. A system for illuminating a microscopy specimen, comprising:
a plurality of illumination sources, each of the plurality of illumination sources configured to emit a light that travels along an illumination path to illuminate the microscopy specimen placed on an optical detection path of an optical microscope;
optical elements in the illumination path of each of the plurality of illumination sources and configured to at least in part transform the light from each of the plurality of the illumination sources into a light sheet illuminating the microscopy specimen, the optical elements including an electrically tunable lens configured to vary a focal distance to dynamically vary a position of a waist of the light sheet of each of the plurality of illumination sources, the optical elements for each of the plurality of illumination sources being configured to spatially align the light sheet from each of the plurality of illumination sources and temporally synchronize the waist of the light sheet from each of the plurality of illumination sources to illuminate a substantially coincident portion of the microscopy specimen, the substantially coincident portion of the microscopy specimen being scanned across at least a portion of the microscopy specimen;
a detector in the optical path, the detector including a rolling shutter, wherein the optical elements for each of the plurality of illumination sources and the rolling shutter are temporally synchronized such that image data incident on the rolling shutter and captured by the detector are synchronized with the substantially coincident portion of the microscopy specimen, such that an image generated from the image data is provided from a single pass of the substantially coincident portion across the at least the portion of the microscopy specimen; and
a plurality of focusing drivers, each of the plurality of focusing drivers coupled to the electrically tunable lens of the optical elements each of the plurality of illumination sources, the focusing drivers configured to drive the electrically tunable lens for each of the plurality of illumination sources to be temporally synchronized with the rolling shutter and to vary the position of the waist of the light sheet from each of the plurality of illumination sources to sweep the substantially coincident portion of the microscopy specimen.

12. A method for illuminating a microscopy specimen, comprising:
spatially aligning a light sheet provided by each of a plurality of illumination sources, each of the plurality of illumination sources configured to emit a light that travels along an illumination path to illuminate the microscopy specimen placed on an optical detection path of an optical microscope, the spatially aligning including
spatially synchronizing optical elements in the illumination path of each of the plurality of illumination sources such that the light sheet from each of the plurality of illumination sources illuminates a substantially coincident portion of the microscopy specimen, the optical elements being configured to at least in part transform the light from each of the plurality of the illumination sources into the light sheet and to vary a position of a waist of the light sheet;
adjusting a focal plane of a detection objective to coincide with at least a portion of the substantially coincident portion of the microscopy specimen; and
temporally synchronizing the optical elements for each of the plurality of illumination sources to dynamically vary the position of the waist of the light sheet from each of the plurality of illumination sources to sweep the substantially coincident portion of the microscopy specimen.

13. The method of claim 12 wherein the spatially synchronizing further includes:
aligning one of the plurality of illumination sources to coincide with the focal plane of the detection objective;
centrally aligning the waist of the one of the plurality of illumination sources in a field of view of the optical detection path; and
repeating the aligning and centrally aligning for each of a remaining ones of the plurality of illumination sources.

14. The method of claim 13, further comprising:
temporally synchronizing the optical elements for each of the plurality of illumination sources to dynamically vary the position of the waist of the light sheet from each of the plurality of illumination sources to sweep the substantially coincident portion of the microscopy specimen.

15. The method of claim 14, wherein a detector resides in the optical detection path and the detector includes a shutter, the method further comprising:
calibrating the optical elements for each of the plurality of illumination sources and the shutter such that image data incident on the shutter and captured by the detector are synchronized with the substantially coincident portion of the microscopy specimen.

16. The method of claim 14, wherein a detector resides in the optical detection path and the detector includes a rolling shutter, the method further comprising:

calibrating the optical elements for each of the plurality of illumination sources and the rolling shutter such that image data incident on the rolling shutter and captured by the detector are synchronized with the substantially coincident portion of the microscopy specimen.

17. The method of claim 16, wherein the rolling shutter provides a dual light sheet mode and wherein the calibrating further includes:

synchronizing the optical elements and the rolling shutter such that the image data includes first data from light incident on a first portion of the rolling shutter and second data from light incident on a second portion of the rolling shutter physically separate from the first portion of the rolling shutter.

18. The method of claim 16, wherein the optical elements include an electrically tunable lens configured to vary the focal distance to dynamically vary the position of the waist of the light sheet of each of the plurality of illumination sources and wherein the temporally synchronizing further includes:

setting a current range for the electrically tunable lens for each of the plurality of illumination sources to dynamically vary the position of the waist of the light sheet from each of the plurality of illumination sources to sweep the substantially coincident portion of the microscopy specimen.

\* \* \* \* \*

UNITED STATES PATENT AND TRADEMARK OFFICE
CERTIFICATE OF CORRECTION

PATENT NO. : 11,156,822 B2
APPLICATION NO. : 16/378060
DATED : October 26, 2021
INVENTOR(S) : Igor Lyuboshenko It is certified that error appears in the above-identified patent and that said Letters Patent is hereby corrected as shown below:

In the Specification

In Column 1, Line(s) 31 & 32, after "Sep. 8, 2017", delete ", which is incorporated herein by reference for all purposes" and insert --.--, therefor.

In Column 1, Line(s) 51, after "which is", delete "all of which are".

In Column 1, Line(s) 52, after "purposes", insert --.--.

In Column 17, Line(s) 15, before "1%", insert --~--.

In Column 38, Line(s) 33, after "mode", insert --.--.

In the Claims

In Column 42, Line(s) 44, Claim 13, after "claim 12", insert --,--.

Signed and Sealed this
Twenty-fifth Day of October, 2022

*Katherine Kelly Vidal*

Katherine Kelly Vidal
*Director of the United States Patent and Trademark Office*